United States Patent
Hu et al.

(10) Patent No.: US 12,483,918 B2
(45) Date of Patent: Nov. 25, 2025

(54) SIDELINK FEEDBACK ENHANCEMENT

(71) Applicant: Apple Inc., Cupertino, CA (US)

(72) Inventors: Haijing Hu, Los Gatos, CA (US);
Chunxuan Ye, San Diego, CA (US);
Dawei Zhang, Saratoga, CA (US);
Haitong Sun, Cupertino, CA (US);
Huaning Niu, San Jose, CA (US);
Seyed Ali Akbar Fakoorian, San Diego, CA (US); Wei Zeng, Saratoga, CA (US); Yushu Zhang, Beijing (CN);
Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 61 days.

(21) Appl. No.: 17/770,099

(22) PCT Filed: Jun. 27, 2021

(86) PCT No.: PCT/CN2021/102589
§ 371 (c)(1),
(2) Date: Apr. 19, 2022

(87) PCT Pub. No.: WO2023/272411
PCT Pub. Date: Jan. 5, 2023

(65) Prior Publication Data
US 2024/0306021 A1    Sep. 12, 2024

(51) Int. Cl.
*H04W 24/10* (2009.01)
*H04W 92/18* (2009.01)

(52) U.S. Cl.
CPC ............ *H04W 24/10* (2013.01); *H04W 92/18* (2013.01)

(58) Field of Classification Search
None
See application file for complete search history.

(56) References Cited

U.S. PATENT DOCUMENTS

| 2007/0207742 A1* | 9/2007 | Kim | H04B 17/336 |
| | | | 455/67.11 |
| 2014/0133311 A1* | 5/2014 | Choi | H04W 40/20 |
| | | | 370/238 |

(Continued)

FOREIGN PATENT DOCUMENTS

| CN | 112640346 A | 4/2021 |
| EP | 3820223 A1 | 5/2021 |

(Continued)

OTHER PUBLICATIONS

International Preliminary Report on Patentability dated Jan. 11, 2024 in connection with Application Serial No. PCT/CN2021/102589.

(Continued)

*Primary Examiner* — Andre Tacdiran
(74) *Attorney, Agent, or Firm* — Eschweiler & Potashnik, LLC; Matthew W Glause

(57) ABSTRACT

A user equipment (UE) associated with a wireless communication network is disclosed. The UE comprises one or more processors configured to form a sidelink group with one or more other UEs associated with the wireless communication network. In some aspects, the one or more processors are further configured to receive a sidelink (SL) groupcast message from a select UE of the one or more other UEs of the sidelink group, the SL groupcast message comprising a SL channel state information (CSI) request and a transmission of a SL channel state information reference signal (CSI-RS). In some aspects, the one or more processors are further configured to process the SL groupcast message; and selectively provide an SL CSI report derived based on a measured SL CSI, to the select UE, in response to processing the SL groupcast message.

20 Claims, 15 Drawing Sheets

(56) References Cited

U.S. PATENT DOCUMENTS

| | | | |
|---|---|---|---|
| 2019/0174479 A1* | 6/2019 | Yamazaki | H04L 5/0057 |
| 2020/0245408 A1 | 7/2020 | Zhao et al. | |
| 2021/0051505 A1* | 2/2021 | Xu | H04W 24/10 |
| 2021/0051681 A1* | 2/2021 | Manolakos | H04L 1/0031 |
| 2021/0083819 A1 | 3/2021 | Taherzadeh Boroujeni et al. | |
| 2021/0105055 A1 | 4/2021 | Chae et al. | |
| 2022/0200685 A1* | 6/2022 | Yoshioka | H04B 7/0658 |
| 2022/0386315 A1* | 12/2022 | Yang | H04L 1/0026 |
| 2023/0108591 A1* | 4/2023 | Liao | H04B 7/0452 370/329 |
| 2024/0205720 A1* | 6/2024 | Lee | H04B 17/318 |

FOREIGN PATENT DOCUMENTS

| | | |
|---|---|---|
| WO | 2020153998 A1 | 7/2020 |
| WO | 2020204630 A1 | 10/2020 |

OTHER PUBLICATIONS

3GPP; "Reply LS on cast type indication"; TSG-RAN WG1 meeting # 101; R1-2003350; May 25, 2020.

European extended Search Report dated Nov. 22, 2022 in connection with Application Serial No. 21908072.8.

Device to Device Communication in LTE; Whitepaper; http://www.rohde-schwarz.com/appnote/1MA264; Jun. 11, 2021.

A Tutorial on 5G NR V2X Communications; IEEE Communications Surveys & Tutorials journal; DOI 10.1109/COMST.2021.3057017; Jun. 14, 2021.

3rd Generation Partnership Project; Technical Specification Group Radio Access Network; NR; Radio Resource Control (RRC) protocol specification (Release 16); 3GPP TS 38.331 V16.4.0 (Mar. 2021).

3GPP NR Sidelink Transmissions Toward 5G V2X; Special Section On Communication and Fog/Edge Computing Towards Intelligent Connected Vehicles (ICVS); Feb. 28, 2020.

LG Electronics NR Sidelink enhancement; 3GPP TSG RAN Meeting #90e RP-202846 Electronic Meeting, Dec. 7-11, 2020.

Nokia Bell Labs; Sidelink: Unlocking the full potential of device communication with 5G; https://www.bell-labs.com/institute/blog/sidelink-unlocking-full-potential-device-communication-5g/#gref; Jul. 7, 2020.

LTE; 5G; Overall description of Radio Access Network (RAN) aspects for Vehicle-to-everything (V2X) based on LTE and NR (3GPP TR 37.985 version 16.0.0 Release 16); ETSI TR 137 985 V16.0.0 (Jul. 2020).

6G; NR; Multiplexing and channel coding (3GPP TS 38.212 version 16.5.0 Release 16); ETSI TS 138 212 V16.5.0 (Apr. 2021).

5G; NR; Physical layer procedures for control (3GPP TS 38.213 version 15.13.0 Release 15); ETSI TS 138 213 V15.13.0 (Apr. 2021).

5G; NR; Physical layer procedures for control (3GPP TS 38.213 version 16.5.0 Release 16); ETSI TS 138 213 V16.5.0 (Apr. 2021).

5G; NR; Physical layer procedures for data (3GPP TS 38.214 version 15.12.0 Release 15); ETSI TS 138 214 V15.12.0 (Apr. 2021).

5G; NR; Physical layer procedures for data (3GPP TS 38.214 version 16.5.0 Release 16); ETSI TS 138 214 V16.5.0 (Apr. 2021).

5G; NR; Radio Resource Control (RRC); Protocol specification (3GPP TS 38.331 version 15.13.0 Release 15); ETSI TS 138 331 V15.13.0 (Apr. 2021).

5G; NR; Radio Resource Control (RRC); Protocol specification (3GPP TS 38.331 version 16.4.1 Release 16); ETSI TS 138 331 V16.4.1 (Apr. 2021).

LG Electronics Inc. (Rapporteur) Summary of MAC open issues for NR sidelink 3GPP TSG-RAN WG2 #109-3, R2-2003757; Apr. 30, 2020.

PCT Search Report dated Mar. 15, 2022 in connection with PCT Application No. PCT/CN2021/102589.

PCT Written Opinion dated Mar. 23, 2022 in connection with PCT Application No. PCT/CN2021/102589.

\* cited by examiner

SIDELINK FEEDBACK ENHANCEMENT

This application is a National Phase entry application of International Patent Application No. PCT/CN2021/102589 filed Jun. 27, 2021, entitled "SIDELINK FEEDBACK ENHANCEMENT", the contents of which are herein incorporated by reference in their entirety.

FIELD

The present disclosure relates to the field of 5G New Radio (NR) sidelink communications including a system and method for enhancing feedback in 5G NR sidelink communications.

BACKGROUND

Vehicle-to-everything (V2X), referring to Vehicle-to-vehicle (V2V) and vehicle-to-Infrastructure (V2I) communications, is a wireless technology aimed at enabling data exchanges between a vehicle and its surroundings. New radio (NR) vehicle-to-everything V2X aims to support unicast, groupcast and broadcast communication over the sidelink. In some embodiments, the sidelink refers to a communication mechanism/communication link between 2 devices (e.g., two user equipments (UEs)) without going through a base station (e.g., eNodeB, gNodeB etc.). The V2X communications are sometimes referred to as 5G NR sidelink communications or sidelink communications.

Featuring direct communications between two user equipments (UEs) without signal relay through a base station, 3GPP sidelink transmissions have manifested their crucial roles in the Long-Term Evolution (LTE) Advanced (LTE-A) for public safety and vehicle-to-everything (V2X) services. With this successful development in LTE-A, the evolution of sidelink transmissions continues in 3GPP New Radio (NR), which renders sidelink an inevitable component as well as downlink and uplink. Targeting at offering low latency, high reliability and high throughput V2X services for advanced driving use cases, a number of new sidelink functions not provided in the LTE-A are supported in NR, including the feedback channel, grant-free access, enhanced channel sensing procedure, and new control channel design.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
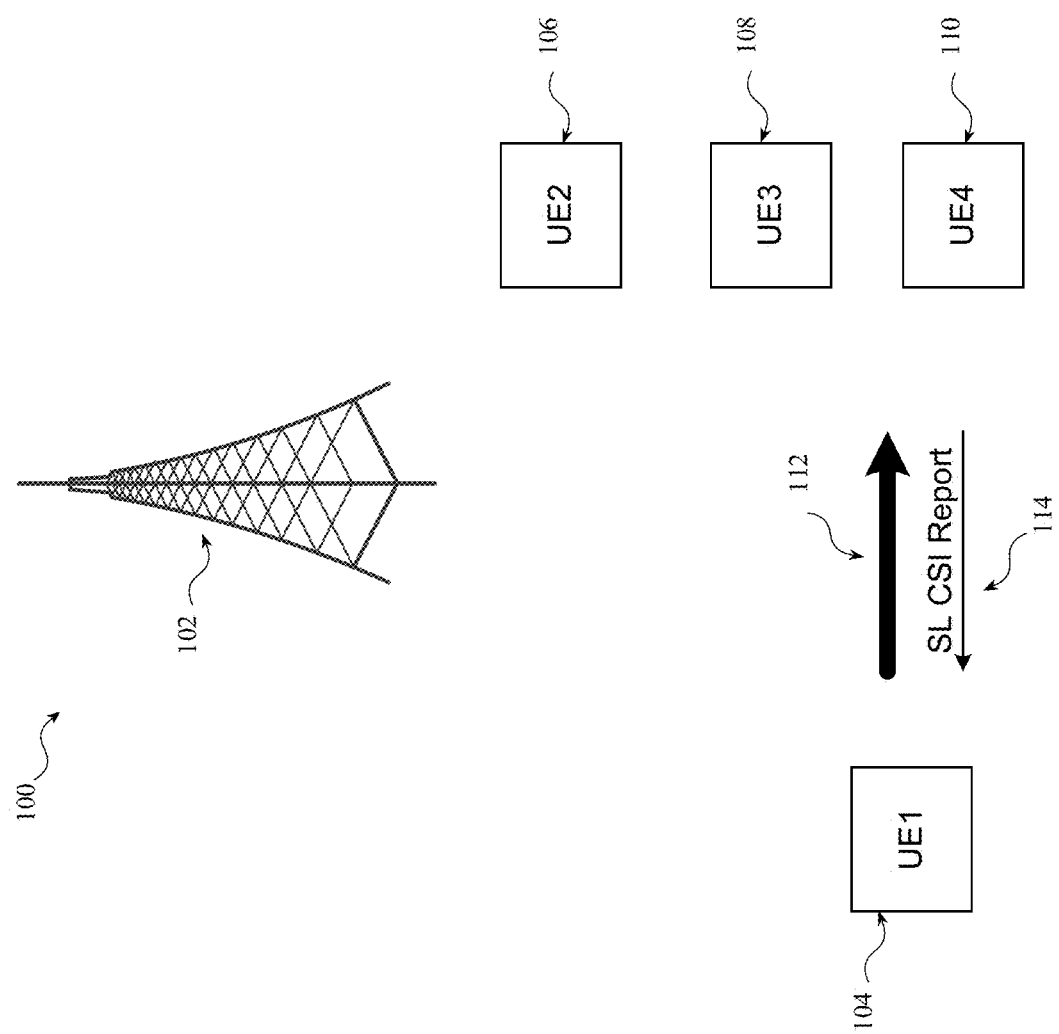
FIG. 1 illustrates a simplified block diagram of a wireless communication network that facilitates sidelink (SL) communications, according to one aspect of the disclosure.

In one aspect of the disclosure, a user equipment (UE) associated with a wireless communication network is disclosed. The UE comprises one or more processors configured to form a sidelink group with one or more other UEs associated with the wireless communication network and receive a sidelink (SL) groupcast message from a select UE of the one or more other UEs of the sidelink group. In some aspects, the SL groupcast message comprises a SL channel state information (CSI) request and a transmission of a SL channel state information reference signal (CSI-RS). The one or more processors are further configured to process the SL groupcast message; and selectively provide an SL CSI report derived based on a measured SL CSI, to the select UE, in response to processing the SL groupcast message.

In one aspect of the disclosure, a user equipment (UE) associated with a wireless communication network is disclosed. The UE comprises one or more processors configured to form a sidelink group with one or more other UEs associated with the wireless communication network; and send a sidelink (SL) groupcast message to the one or more other UEs of the sidelink group that forms a set of Rx UEs. In some aspects, the SL groupcast message comprises a SL channel state information (CSI) request and a transmission of a SL channel state information reference signal (CSI-RS). In some aspects, the one or more processors are further configured to receive an SL CSI report from a select Rx UE of the set of Rx UEs, in response to sending the SL groupcast message.

In one aspect of the disclosure, a user equipment (UE) associated with a wireless communication network is disclosed. The UE comprises one or more processors configured to receive an inter-UE coordination request signal from a select UE associated with the wireless communication network. In some aspects, the inter-UE coordination request signal comprises an inter-UE coordination request that requests the UE to determine a set of preferred resources or a set of non-preferred resources for a sidelink (SL) transmission from the select UE, a SL channel state information (CSI) request and a transmission of a SL channel state information reference signal (CSI-RS). In some aspects, the one or more processors are further configured to determine the set of preferred resources or the set of non-preferred resources, in response to processing the inter-UE coordination request; and determine an SL CSI for the select UE, in response to processing the SL CSI request. Further, in some aspects, the one or more processors are configured to send an inter-UE coordination response signal comprising an SL CSI report derived based on the SL CSI and an inter-UE coordination response that comprises the set of preferred resources or the set of non-preferred resources to the select UE.

In one aspect of the disclosure, a user equipment (UE) associated with a wireless communication network is disclosed. The UE comprises one or more processors configured to send an inter-UE coordination request signal to a select UE associated with the wireless communication network. In some aspects, the inter-UE coordination request signal comprises an inter-UE coordination request that requests the select UE to determine a set of preferred resources or a set of non-preferred resources for a sidelink (SL) transmission from the UE's, a SL channel state information (CSI) request and a transmission of a SL channel state information reference signal (CSI-RS). In some aspects, the one or more processors are further configured to receive an inter-UE coordination response signal comprising an SL CSI report and an inter-UE coordination response comprising the set of preferred resources or the set of non-preferred resources from the select UE, in response to sending the inter-UE coordination request signal.

In one aspect of the disclosure, a user equipment (UE) associated with a wireless communication network is disclosed. The UE comprises one or more processors configured to receive a sidelink transmission signal from a select UE associated with the wireless communication network. In some aspects, the sidelink transmission signal comprises a sidelink data transmission from the select UE, a SL channel state information (CSI) request and a transmission of a SL channel state information reference signal (CSI-RS). In some aspects, the one or more processors are further configured to determine whether a current resource or a reserved resource associated with the select UE has a collision associated therewith, based on the sidelink data transmission; and determine an SL CSI of the select UE, in response to the SL CSI request. In some aspects, the one or more processors are further configured to send an inter-UE coordination signal comprising a collision indicator indicative of a status of the collision and an SL CSI report derived based on the determined SL CSI to the select UE, based on the determination regarding the collision of the current resource or the reserved resource associated with the select UE.

In one aspect of the disclosure, a user equipment (UE) associated with a wireless communication network is disclosed. The UE comprises one or more processors configured to send a sidelink transmission signal to a select UE associated with the wireless communication network. In some aspects, the sidelink transmission signal comprises a sidelink data transmission to the select UE, a SL channel state information (CSI) request and a transmission of a SL channel state information reference signal (CSI-RS). In some aspects, the one or more processors are further configured to receive an inter-UE coordination signal comprising a collision indicator indicative of a status of a collision of a current resource or a reserved resource associated with the UE and a SL CSI report, from the select UE, in response to sending the sidelink transmission signal, based on a determination, at the select UE, regarding the collision.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects. However, it will be apparent to those skilled in the art having the benefit of the present disclosure that the various aspects may be practiced in other examples that depart from these specific details. In certain instances, descriptions of well-known devices, circuits, and methods are omitted so as not to obscure the description of the various aspects with unnecessary detail.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As indicated above, 3GPP sidelink transmissions have crucial roles for public safety and vehicle-to-everything (V2X) services. Several physical channels and reference signals are defined for new radio (NR) sidelink. Some of the physical channels include physical sidelink shared channel (PSSCH), physical sidelink control channel (PSCCH) and physical sidelink feedback channel (PSFCH). The PSSCH is transmitted by a transmitting UE, and the PSSCH conveys sidelink transmission data, to a receiving UE over sidelink. When the sidelink transmission data/traffic to be sent to the receiving UE arrives at the transmitting UE, the transmitting UE should first send the PSCCH, which carries the information the receiving UE requires in order to be able to receive and demodulate the PSSCH. In some aspects, the PSCCH is similar to the physical downlink control channel (PDCCH) in cellular traffic over Uu. Further, the PSFCH is transmitted by the receiving UE over sidelink to the transmitting UE, in response to the PSSCH. In some aspects, the PSFCH conveys the HARQ acknowledgement (ACK) and the negative ACK (NACK) (e.g., using 1 bit information over 1 resource block (RB).

In some aspects, the PSCCH conveys a part of Sidelink Control Information (SCI) to be decoded by any receiving UE for channel sensing purpose. In some aspects, the SCI includes the reserved time-frequency resources for transmissions, demodulation reference signal (DMRS) pattern and antenna port, etc. The SCI payloads/contents are separated into 2 parts or stages, that is, SCI stage 1 and SCI stage 2. The SCI stage 1 is carried in PSCCH and the SCI stage 2 is carried in PSSCH. In some aspects, the payload/contents of the SCI stage 1 include Priority, PSSCH frequency resource assignment, PSSCH time resource assignment, Resource reservation period, DMRS pattern, SCI stage 2 format, beta_offset indicator, Number of DMRS port, MCS, MCS table index, PSFCH overhead indication and Reserved bits. In some aspects, a single SCI stage 1 format is configured per resource pool. A resource pool is a set of resources assigned to the sidelink operation. It consists of subframes and resource blocks within.

There are 2 different formats for SCI stage 2, that is, SCI stage 2 format A and SCI stage 2 format B. In some aspects, the SCI stage 2 format A is utilized for unicast communications, groupcast hybrid automatic repeat request (HARQ) option 1 and 2, broadcast communications. Further, the SCI stage 2 format B is utilized for groupcast HARQ option 1. In unicast, the communication is between a single transmitting UE and a single receiving UE. In groupcast, a transmitting UE provides data in a common transmission to be utilized by a predefined group of receiving UEs. In broadcast, the transmitting UE transmits data to be utilized by all receiving UEs in the network. In HARQ option 1, the receiving UE provides only HARQ Ack feedback. In other words, in HARQ option 1, the receiving UE provides an Ack when data is successfully received and does not provide a Nack when data is not successfully received. Further, in HARQ option 2, receiving UE provides an Ack when data is successfully received and also provides a Nack when data is not successfully received. In some aspects, the payload/contents of the SCI stage 2 format A include HARQ process number, New data indicator, Redundancy version, Source ID, Destination ID, HARQ feedback enabling/disabling indicator, Cast type indicator and CSI request. Further, the payload/contents of the SCI stage 2 format B include HARQ process number, New data indicator, Redundancy version, Source ID, Destination ID, HARQ feedback enabling/disabling indicator, Zone ID and Communication range requirement.

In some aspects, the PSFCH uses a sequence-based short format (in code-domain). In some aspects, the PSFCH utilizes the sequence of physical uplink control channel (PUCCH) format 0. The PSFCH format repeats in 2 consecutive symbols in time domain. In some aspects, a second last symbol and third last symbol of a slot constitutes the PSFCH. In some aspects, a first symbol of the PSFCH is used for automatic gain control (AGC) training. Further, in some aspects, a last symbol of the slot (that comes right after the PSFCH transmission) and also a fourth last symbol of the slot are used for GAP (i.e., transmit (Tx)/receive (Rx) switch). In frequency domain, the PSFCH occupies one physical resource block (and the whole sub-channel is not used). Each PSFCH is mapped to a time domain resource, a frequency domain resource and a code domain resource. The slot offset of the time domain resource of the PSFCH from a corresponding PSSCH is 2 or 3. The slot offset is preconfigured per resource pool. The frequency domain resource of the PSFCH is determined by the corresponding PSSCH starting sub-channel index and slot index. Code domain resource for PSFCH is explored for groupcast HARQ feedback option 2, where predefined code domain resources (e.g., predefined sequences) are utilized by receiving UEs for PSFCH (i.e., for providing HARQ Ack and HARQ Nack). In some aspects, different code-domain resources (or sequences) may be utilized by different receiving UEs for PSFCH.

In sidelink communications, different resource allocation modes for UE transmissions (in particular, sidelink transmissions) are defined. For example, a Mode 1 where the gNodeB (i.e., a base station) allocates the resources (e.g., time-frequency resources) to be utilized for sidelink transmissions (i.e., PSCCH/PSSCH) from a UE and a Mode 2 where UE (e.g., a transmit (Tx) UE) performs autonomous resource selection for sidelink transmissions (i.e., PSCCH/PSSCH) from the UE. In some aspects, inter-UE coordination in Mode 2 is feasible, and is beneficial (e.g., reliability, etc.). In inter-UE coordination, a transmit (Tx) UE relies on information from a receiving (Rx) UE to determine the resources to be utilized for a sidelink transmission (i.e., transmission over sidelink) from the Tx UE's to the Rx UE. Different types of inter-UE coordination are defined, in particular, a Type 1 inter-UE coordination and Type 2 inter-UE coordination. In Type 1 inter-UE coordination, a Rx UE sends to a Tx UE, a set of resources preferred (or available) or not preferred (or not available) for the Tx UE's sidelink transmission. In Type 1 inter-UE coordination, the Rx UE sends the set of resources to the Tx UE, before any sidelink data transmission from the Tx UE has occurred (or before the Tx UE reserves any resources for the sidelink transmission).

Further, in Type 2 inter-UE coordination, an Rx UE sends to a Tx UE, a set of resources (e.g., current resources utilized by the Tx UE or reserved resources of the Tx UE) where a resource conflict is detected or a potential resource conflict is detected, or provide an indication of a resource conflict on the current resource or a potential resource conflict on the reserved resource. In some aspects, the current resource comprises a resource that is utilized by the Tx UE for the transmission of the sidelink data. Further, the reserved resource comprises a resource that is reserved by the Tx UE for future transmission of sidelink data from the Tx UE. In Type 2 inter-UE coordination, the Rx UE sends the set of resources/the indication to the Tx UE, after a sidelink data transmission from the Tx UE (to the Rx UE) has occurred using a current resource (and/or when the Tx UE has reserved resources for future transmissions). In such aspects, the Rx UE informs the Tx UE of a resource conflict that has occurred in the current resource and/or a potential (or future) resource conflict that could occur in one or more of the reserved resources.

In sidelink communications, channel state information (CSI) reporting is defined where an Rx UE reports to the Tx UE, a sidelink (SL) CSI (or information derived based on the SL CSI) indicative of a quality of the communication channel between the Tx UE and the Rx UE. In some aspects, the SL CSI is determined at the Rx UE based on some reference signals, for example, channel state information reference signals (CSI-RS) provided to the Rx UE from the Tx UE. In some aspects, the SL CSI can comprise an SL channel quality indicator (CQI) or an SL rank indicator (RI). Further, in some aspects, the SL CSI may comprise a SL precoding matrix index (PMI). In some aspects, the SL CSI (or the information derived based on the SL CSI) is utilized at the Tx UE, to adjust one or more parameters associated with the transmissions from the Tx UE (e.g., a modulation and coding scheme (MCS), channel quality indicator (CQI) etc.), in order to improve the communication/channel quality.

In current implementations, the SL CSI reporting is supported only in SL unicast communications, via, a medium access control (MAC) control element (CE). More particularly, in current implementations, SL CSI reporting is provided by the Rx UE, when the Tx UE provides unicast communication to the Rx UE. Therefore, disclosed herein are systems, circuitries, and techniques that allows reporting SL CSI in sidelink (SL) groupcast communications. In particular, the disclosed systems, circuitries, and techniques allows a UE in a group to determine when to send SL CSI reporting during SL groupcast communications (or upon receiving a groupcast message). Further, the disclosed systems, circuitries, and techniques supports multiple UEs in a group to send SL CSI reporting during SL groupcast communications. Furthermore, disclosed herein are systems, circuitries, and techniques that supports SL CSI reporting together with inter-UE coordination.

FIG. 1 illustrates a simplified block diagram of a wireless communication network 100 that facilitates sidelink (SL) communications, according to one aspect of the disclosure.

In some aspects, the wireless communication network 100 supports SL channel state information (CSI) reporting during sidelink groupcast communications. The wireless communication network 100 comprises base station 102 and a plurality of user equipments (UEs), UE1 104, UE2 106, UE3 108 and UE4 110. In other aspects, however, the wireless communication network 100 can comprise more or less UEs than illustrated above. In some aspects, the base station 102 is equivalent to an eNodeB in LTE systems, gNodeB in 5G new radio (NR) systems or a network device associated with any other generations (past, present or future) of cellular technologies. In some aspects, the UE1 104, the UE2 106, the UE3 108 and the UE4 110 may comprise a mobile phone, tablet computer, an internet of things (IoT) device, a vehicle-to-everything (V2X) UE, etc. In some aspects, each of the UEs, that is, the UE1 104, the UE2 106, the UE3 108 and the UE4 110 are configured to communicate with the base station 102 over a communication medium (e.g., air). In some aspects, each of the UEs, that is, the UE1 104, the UE2 106, the UE3 108 and the UE4 110 are also configured to communicate with one another over sidelink (i.e., without going through the base station 102). In some aspects, each of the UEs, that is, the UE1 104, the UE2 106, the UE3 108 and the UE4 110 are configured to perform unicast, groupcast or broadcast communications with other UEs in the wireless communication network 100 over sidelink.

In order to facilitate SL groupcast communications, a plurality of UEs associated with the wireless communication network 100 are configured to form a sidelink group. In this particular aspect, the UEs, that is, the UE1 104, the UE2 106, the UE3 108 and the UE4 110 are configured to form the sidelink group. However, in other aspects, more or less UEs can be configured to form the sidelink group. In some aspects, the UEs are configured to form the sidelink group based on higher layer signaling (e.g., from the base station or from the UE's own higher layer signaling). Further, there could be multiple sidelink groups with the wireless communication network 100, in other aspects. In some aspects, each UE within a sidelink group is aware of the existence of the other UEs within the sidelink group. For example, the UE1 104 is aware of the existence of the UEs, the UE2 106, the UE3 108 and the UE4 110 within the sidelink group. Further, each UE within a sidelink group is configured to perform groupcast communications (i.e., a common transmission) to all the other UEs within the sidelink group. For example, the UE1 104 is configured to perform groupcast communications (i.e., a common transmission) to the UEs, the UE2 106, the UE3 108 and the UE4 110. During groupcast communications, a UE within the sidelink group that performs SL groupcast transmission is referred to herein as the Tx UE and the UEs within the sidelink group that receives the SL groupcast transmissions from the Tx UE is referred to herein as the Rx UEs. During groupcast communications, all the UEs within the sidelink group other than the Tx UE forms the Rx UEs. In some aspects, each UE within the sidelink group has an identifier associated therewith, for example, a group member ID.

In some aspects, a Tx UE within the sidelink group may need to know a channel condition (e.g., channel quality) of a SL communication channel between the Tx UE and the Rx UEs within the sidelink group, before performing actual SL groupcast data transmissions. More particularly, a Tx UE within the sidelink group may need to receive a SL channel state information (CSI) report comprising an SL CSI (or information derived based on the SL CSI) from the Rx UEs within the sidelink group. In some aspects, such information may be utilized by the Tx UE to adjust one or more parameters associated with the Tx UE (e.g., MCS, CQI etc.) for transport block (TB) retransmissions or new TB transmissions. For purposes of explanation, in FIG. 1, the UE1 104 forms the Tx UE and the UEs, the UE2 106, the UE3 108 and the UE4 110 forms the Rx UEs. However, it is to be noted that each of the UEs within the sidelink group can form (or act as) Tx UEs and Rx UEs at different instances. For the ease of reference, the UE1 104 is hereinafter referred to as the Tx UE 104, and the UE2 106, the UE3 108 and the UE4 110 are hereinafter referred to as the Rx UE 106, the Rx UE 108 and the Rx UE 110, respectively. In order to receive the SL CSI report, in some aspects, the Tx UE 104 is configured to provide a sidelink (SL) groupcast message 112 to a set of Rx UEs, that is, the Rx UE 106, the Rx UE 108 and the Rx UE 110 over sidelink. In some aspects, the set of Rx UEs comprises all the other UEs (other than the Tx UE) within the sidelink group. In this aspect, the set of Rx UEs comprises 3 Rx UEs. However, in other aspects, the set of Rx UEs may comprise more or less Rx UEs. In some aspects, the SL groupcast message 112 comprises a common message/signal that is to be received by all the Rx UEs (i.e., the Rx UE 106, the Rx UE 108 and the Rx UE 110) within the sidelink group.

In some aspects, the SL groupcast message 112 comprises a SL channel state information (CSI) request and a transmission of a reference signal, for example, a SL channel state information reference signal (CSI-RS). In some aspects, the SL groupcast message 112 is sent via PSCCH/PSSCH. In some aspects, the SL CSI request is provided by setting a CSI request field in SCI stage 2 of the PSSCH. In some aspects, the SCI stage 2 can comprise an SCI format 2-A, an SCI format 2-B or new format, for example, an SCI format 2-C. Further, CSI-RS is provided as part of PSSCH. In some aspects, the Tx UE 104 is configured to receive an SL CSI report (e.g., an SL CSI report 114) from an Rx UE 110 within the sidelink group (over sidelink), in response to providing the sidelink groupcast message 112. In some aspects, the Rx UE 110 is configured to provide the SL CSI report, based on some predefined associations/thresholds (e.g., when some predefined conditions related to the predefined associations/thresholds are satisfied at the Rx UE), further details of which are provided below. In some aspects, the SL CSI report is derived at an Rx UE 110, based on an SL CSI (e.g., SL CQI/SL RI) measured/determined at the Rx UE 110. For example, in some aspects, the SL CSI report comprises a value of the measured SL CSI or an information derived based on the measured SL CSI. In some aspects, the SL CSI can include a SL channel quality indicator (CQI) and/or a SL rank indicator (RI). In some aspects, the SL CSI is measured/determined at the Rx UEs (e.g., the Rx UE 110) based on processing a reference signal, for example, the CSI-RS within the SL groupcast message 112. In this aspect, the Tx UE 104 is shown to receive a single SL CSI report (i.e., the SL CSI report 114) from the RX UE 110 only. However, in other aspects, the Tx UE 104 may receive one or more SL CSI reports respectively from one or more Rx UEs of the set of Rx UEs over the sidelink. Further, in some aspects, the Tx UE 104 may not receive SL CSI reports from any of the Rx UEs (e.g., when the predefined conditions are not satisfied at any of the Rx UEs).

In some aspects, an Rx UE (e.g., the Rx UE 110) may be configured to provide the SL CSI report (e.g., the SL CSI report 114) to the Tx UE (e.g., the Tx UE 104) via layer 1 signaling (or physical layer or L1 signaling). Alternately, in other aspects, an Rx UE (e.g., the Rx UE 110) may be configured to provide the SL CSI report (e.g., the SL CSI report 114) to the Tx UE (e.g., the Tx UE 104) via medium access control (MAC) control element (CE). In some aspects, the Rx UE is configured to provide the SL CSI report to the Tx UE via unicast communications (via MAC CE or physical layer signaling). Alternately, in other aspects, the Rx UE is configured to provide the SL CSI report to the Tx UE via groupcast communications (via MAC CE or physical layer signaling).

During groupcast communications, since each of the Rx UEs (i.e., Rx UE 106, the Rx UE 108 and the Rx UE 110) within the sidelink group receives the SL groupcast message 112 from the Tx UE 104, each of the Rx UEs may report a corresponding SL CSI to the Tx UE 104. However, at least in some aspects, the TX UE (e.g., the Tx UE 104) may need to receive SL CSI report only from a specific set of Rx UEs (for example, one or two Rx UEs of the set of Rx UEs within the sidelink group), rather than from all the Rx UEs within the sidelink group. For example, in vehicle platooning, a Tx UE needs to adjust its modulation and coding scheme (MCS) to fit the channel condition to the farthest Rx UE. Therefore, in such aspects, the Tx UE may only need to receive SL CSI report from the farthest Rx UE. Therefore, disclosed herein are some mechanisms (based on some predefined associations/thresholds) that allows the Tx UE 104 to receive the SL CSI report from only a specific set of Rx UEs. More specifically, such mechanisms allow the Rx UEs (i.e., the Rx UE 106, the Rx UE 108 and the Rx UE 110) to determine when to report the SL CSI (i.e., when to send a corresponding SL CSI report) to the Tx UE 104, upon receiving the SL groupcast message 112 from the Tx UE 104.

In order to facilitate the receipt of SL CSI only from the specific set of Rx UEs within the sidelink group, at the Tx UE 104, in a first aspect, a first mechanism comprising a semi-static SL CSI feedback determination procedure is disclosed. In the semi-static SL CSI feedback determination procedure, upon receiving the SL groupcast message 112 from the Tx UE 104, each of the Rx UEs within the sidelink group is configured to determine when to provide the SL CSI report (e.g., the SL CSI report 114), based on one or more SL CSI reporting associations (that forms the predefined associations) configured for the respective Rx UE. In order to facilitate the semi-static SL CSI feedback determination procedure, therefore, SL CSI reporting associations are defined for each of the UEs in a sidelink group. In particular, each UE within the sidelink group (i.e., UE1 104, the UE2 106, the UE3 108 and the UE4 110) is configured with one or more SL CSI reporting associations. In some aspects, the one or more SL CSI reporting associations associated with a UE allows the UE (e.g., when it forms an Rx UE during groupcast communications) to determine when to provide an SL CSI report to a Tx UE from which a SL groupcast message (e.g., the SL groupcast message 112) is received. More particularly, upon receiving the SL groupcast message 112, an Rx UE (e.g., the Rx UE 110 in FIG. 1) within the sidelink group may provide the SL CSI report to the Tx UE 104, based on the one or more SL CSI reporting associations configured for the Rx UE 110. Although not shown in FIG. 1, in other aspects, a plurality of Rx UEs associated with a sidelink group may be configured to provide respective SL CSI reports to the Tx UE 104, in response to receiving the SL groupcast message 112, based on the one or more SL CSI reporting associations configured for the respective plurality of Rx UEs.

In some aspects, each SL CSI reporting association of the one or more SL CSI reporting associations configured for any select UE comprises a paired association between the select UE and another UE within the sidelink group. In some aspects, the another UE can comprise any UE within the sidelink group that is different from the select UE. In some aspects, the paired association between the select UE and the another UE comprises a UE-UE pair comprising the select UE and the another UE. In some aspects, the paired associations (or the SL CSI reporting associations) are formed between two UEs, where one UE needs to receive an SL CSI report from the other UE. Therefore, the paired association within each SL CSI reporting association of any select UE is formed between two UEs (i.e., the select UE and the another UE), where one UE (which could be the select UE or the another UE) needs to receive an SL CSI report from the other UE (which could be the select UE or the another UE). In some aspects, a first UE of the paired association (i.e., the select UE or the another UE) is designated as a transmit (Tx) UE (hereinafter referred to as a designated Tx UE) and a second UE of the paired association (i.e., the select UE or the another UE) is designated as a receive (Rx) UE (hereinafter referred to as a designated Rx UE).

In some aspects, the designated Tx UE comprises a UE that needs to (or is configured to) receive an associated SL CSI report and the designated Rx UE comprises a UE that needs to (or is configured to) provide the associated SL CSI report. In some aspects, within a paired association of an SL CSI reporting association configured for a select UE, the select UE forms the designated Tx UE and the another UE forms the designated Rx UE. Alternately, in other aspects, within the paired association of the SL CSI reporting association configured for the select UE, the another UE of the paired association forms the designated Tx UE and the select UE of the paired association forms the designated Rx UE. More specifically, in some aspects, within the one or more SL CSI reporting associations configured for a select UE, the select UE may comprise the designated TX UE in paired associations associated with a first set of SL CSI reporting associations and/or the select UE may comprise the designated Rx UE in paired associations associated with a second set of SL CSI reporting associations.

In one example aspect, if UE1 104 needs to receive an SL CSI report from UE4 110, then a first paired association (or a first SL CSI reporting association) for UE1 104 comprising UE1 104 as the designated Tx UE and UE4 110 as the designated Rx UE is formed, which can be depicted as (Tx=UE1, Rx=UE4). Further, if UE1 104 needs to provide an SL CSI report to UE3 108, then a second paired association (or a second SL CSI reporting association) for UE1 104 comprising UE3 108 as the designated Tx UE and UE1 104 as the designated Rx UE is formed, which can be depicted as (Tx=UE3, Rx=UE1). Therefore, in the above example, UE1 forms the designated Tx UE in the first paired association and the UE1 forms the designated Rx UE in the second paired association. Further, in some aspects, a same SL CSI reporting association may be associated with more than one UE. For example, the first SL CSI reporting association defined above, that is (Tx=UE1, Rx=UE4), corresponds to an SL CSI reporting association for UE1 104 as well as for UE4 110. Similarly, the second SL CSI reporting association defined above, that is (Tx=UE3, Rx=UE1), corresponds to an SL CSI reporting association for UE1 104 as well as for UE3 108.

In some aspects, an Rx UE (e.g., the Rx UE 110) is configured to provide the SL CSI report 114 to the Tx UE 104, when the Tx UE 104 from which the SL groupcast message (e.g., the SL groupcast message 112) is received corresponds to the designated Tx UE in the paired association in any SL CSI reporting configuration of the one or more SL CSI reporting associations configured for the Rx UE 110. More particularly, the Rx UE (e.g., the Rx UE 110) is configured to provide the SL CSI report 114 to the Tx UE 104, when a select SL CSI reporting association of the one or more SL CSI reporting associations configured for the Rx UE 110 comprises a paired association between the Tx UE 104 and the Rx UE 110, and when the Tx UE 104 corresponds to the designated Tx UE in the paired association. In some aspects, an Rx UE (e.g., the Rx UE 110) is configured not to provide the SL CSI report 114 to the Tx UE 104, when the Tx UE 104 from which the SL groupcast message (e.g., the SL groupcast message 112) is received does not correspond to the designated Tx UE in the paired association in any SL CSI reporting association of the one or more SL CSI reporting associations configured for the Rx UE 110. Therefore, based on the first SL CSI reporting association configured for UE4 110, that is (Tx=UE1, Rx=UE4), if UE4 110 receives a sidelink groupcast message from UE1 104, then UE4 110 is configured to provide an SL CSI report to UE1 104, since UE1 104 corresponds to the designated Tx UE in the first SL CSI reporting association configured for UE4 110. In some aspects, an Rx UE (e.g., the Rx UE 110) is configured to identify/check the correspondence of the Tx UE 104 with the designated Tx UE in the paired association associated with any of the one or more SL CSI reporting associations configured for the Rx UE 110, based on a group member ID (e.g., an identifier) of the Tx UE 104 that is indicated to the Rx UE 110 as part of the SL groupcast message 112. In some aspects, the group member ID is included in the sidelink control information (SCI) stage 2 associated with the PSSCH.

In some aspects, information regarding SL CSI reporting associations configured for all the UEs with the sidelink group are available to each of the UEs within a sidelink group. However, in other aspects, only information regarding one or more SL CSI reporting associations configured for a specific UE are available to the respective UE. In some aspects, the SL CSI reporting associations of all the UEs are configured/determined by a group lead (i.e., a select UE within the sidelink group that is designated as the group lead). In some aspects, the information regarding the SL CSI reporting associations (of all the UEs or of the respective UE) are provided to the respective UEs by the group lead. In some aspects, the information regarding the SL CSI reporting associations may be stored in a memory associated with the respective UEs or dynamically indicated by the group lead. In some aspects, each of the Rx UEs (i.e., the Rx UE 106, the Rx UE 108 and the Rx UE 110) is configured to determine the one or more SL CSI reporting associations associated with the respective Rx UE (based on the information stored in the memory or based on the dynamic indication from the group lead), upon receiving the sidelink groupcast message 112.

Figure 2:
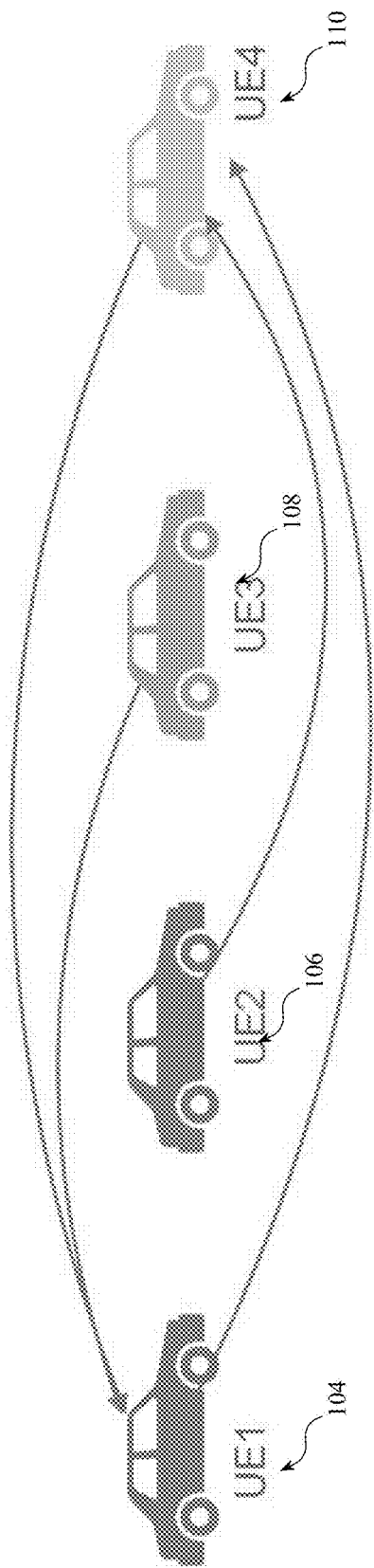
FIG. 2 illustrates an example aspect of defining sidelink (SL) channel state information (CSI) associations between UEs within a sidelink group, according to one aspect of the disclosure.

In some aspects, each paired association (comprising the designated Tx UE and the designated Rx UE as explained above) is defined/configured between two UEs (that forms a set of UEs) within the sidelink group based on a distance between the two UEs. For example, in some aspects, each paired association comprises two UEs within the sidelink group that are farthest from each other (or have the largest distance from each other). More specifically, in some aspects, the set of UEs (that forms the designated Tx UE and the designated Rx UE) within each paired association comprises two UEs, where one UE is farthest (or is at a largest distance) with respect to the other UE within the sidelink group. However, in other aspects, the paired association may be formed based on other criteria. FIG. 2 illustrates an example aspect of defining SL CSI reporting associations (i.e., paired associations) between UEs within a sidelink group (to facilitate the semi-static SL CSI feedback determination procedure described above). In some aspects, the UE1 104, UE2 106, UE3 108 and UE4 110 in FIG. 2 may correspond to the Tx UE 104, the Rx UE 106, the Rx UE 108 and the Rx UE 110 in FIG. 1, respectively. In this example of FIG. 2, the SL CSI reporting associations (or paired associations) are formed between a set of UEs within the sidelink group that have the farthest (largest) distance from one another (from a Tx UE's perspective). In particular, in this example, the SL CSI reporting associations are defined such that each UE (i.e., a Tx UE) within the sidelink group receives SL CSI report only from a corresponding farthest UE within the sidelink group. Therefore, in this example, the paired associations are defined between each UE (that forms the designated Tx UE) and another UE (that forms the designated Rx UE) within the sidelink group that is farthest from the respective UE (i.e., the designated Tx UE). More specifically, in this example, within each paired association, the designated Rx UE comprises a specific UE within the sidelink group that is farthest from the designated Tx UE. In FIG. 2, the UEs that forms the paired associations with one another are shown as connected via arrows. In some aspects, the mapping based on distance (to form the paired association) may be performed only in one direction (e.g., from a Tx UE's perspective) and not in the other direction.

Accordingly, in this example, the SL CSI reporting associations are defined as follows: (Tx=UE1 104, Rx=UE4 110) that comprises an SL CSI reporting association A, (Tx=UE2 106, Rx=UE4 110) that comprises an SL CSI reporting association B, (Tx=UE3 108, Rx=UE1 104) that comprises an SL CSI reporting association C and (Tx=UE4 110, Rx=UE1 104) that comprises an SL CSI reporting association D. In the above mapping, each UE (i.e., UE1, UE2, UE3 or UE4) is configured to receive SL CSI from a single UE (i.e., from the farthest UE). However, in other aspects, mapping can be done differently, such that a UE can receive SL CSI from more than one UE. In such aspects, a same UE (e.g., the UE1) may form the designated Tx UE in more than one SL CSI reporting association.

Based on the SL CSI reporting associations defined above, it can be seen that the Tx UE 104 (or the UE1 104) in FIG. 1 is configured with the SL CSI reporting associations A, C and D, the Rx UE 106 (or the UE2 106) is configured with the SL CSI reporting association B, the Rx UE 108 (or the UE3 108) is configured with the SL CSI reporting association C and the Rx UE 110 (or the UE4 110) is associated with the SL CSI reporting associations A, B and D. However, in other aspects, the SL CSI reporting associations may be defined differently. Further, in other aspects, each UE within the sidelink group may be associated with more or less SL CSI reporting associations than defined with respect to FIG. 2. Therefore, based on the above paired associations in FIG. 2, when the Tx UE 104 sends the SL groupcast message 112, although, each of the Rx UEs, Rx UE 106, the Rx UE 108 and the Rx UE 110 receives the SL groupcast message 112, only Rx UE 110 provides the SL CSI report 114. This is because the Tx UE 104 correspond to the designated Tx UE only in the SL CSI reporting association A, which is associated with only the Rx UE 110 (among the Rx UEs, Rx UE 106, the Rx UE 108 and the Rx UE 110).

Referring back to FIG. 1, in another aspect of the disclosure, a second mechanism comprising a dynamic SL CSI feedback determination procedure is disclosed, in order to facilitate the receipt of SL CSI only from the specific set of Rx UEs within the sidelink group, at the Tx UE 104 (instead of receiving SL CSI from all the Rx UEs within the sidelink group). In the dynamic SL CSI feedback determination procedure, upon receiving the SL groupcast message 112 from the Tx UE 104, each of the Rx UEs within the sidelink group is configured to determine when to provide a corresponding SL CSI report (e.g., the SL CSI report 114), based on a CSI threshold (e.g., the predefined threshold indicated above). In some aspects, the CSI threshold comprises a threshold value (e.g., a predefined threshold value) for the SL CSI. Additionally or alternately, each of the Rx UEs within the sidelink group is configured to determine when to provide the corresponding SL CSI report (e.g., the SL CSI report 114), based on a distance threshold (e.g., the predefined threshold indicated above), upon receiving the SL groupcast message 112 from the Tx UE 104. In some aspects, the distance threshold comprises a threshold value (e.g., a predefined threshold value) for a distance between a Tx UE (e.g., the Tx UE 104) and a corresponding Rx UE (e.g., the Rx UE 110). In order to facilitate the dynamic SL CSI feedback determination procedure, therefore, the CSI threshold and/or the distance threshold are defined/configured for each UE within the sidelink group. In some aspects, each UE within the sidelink group is configured with a same CSI threshold. Alternately, in other aspects, different UEs within the sidelink group may be configured with a respective CSI threshold. In some aspects, the CSI threshold is configured per resource pool. Alternately, in some aspects, the CSI threshold is configured per group configuration (i.e., each UE within a sidelink group uses a same CSI threshold).

In some aspects, the CSI threshold are preconfigured and stored in a memory associated with each of the UEs in the sidelink group. Alternately, in other aspects, the CSI threshold may be dynamically indicated to the UEs (e.g., the Rx UEs) via SCI (e.g., SCI stage 2), for example, as part of the SL groupcast message 112. In some aspects, the CSI threshold may depend on the data priority (e.g., of the data that is groupcasted). For example, for a data with higher priority, the CSI threshold may be smaller and for a data with lower priority, the CSI threshold may be larger. Further, in some aspects, the CSI threshold may depend on a distance between the Tx UE and the Rx UE. For example, for longer distance, the CSI threshold is larger and for shorter distance, the CSI threshold is smaller. In such aspects, therefore, each of the Rx UE within the sidelink group may be associated with a respective CSI threshold.

Similarly, in some aspects, the distance threshold is (pre)configured per resource pool or configured per group configuration (i.e., each UE within a sidelink group uses a same distance threshold). In some aspects, the distance threshold may depend on the data priority (e.g., of the data that is groupcasted). Therefore, in some aspects, multiple distance thresholds may be used depending on the data priority level. In some aspects, the distance threshold is preconfigured and stored in a memory associated with each of the UEs in the sidelink group. Alternately, in other aspects, the distance threshold may be dynamically indicated to the UEs (e.g., the Rx UEs) as the communication range requirement as part of the SCI stage format 2B. In some aspects, the distance threshold may be dynamically indicated to the UEs (e.g., the Rx UEs) as part of other SCI stage 2 formats, for example, by modification of the SCI stage format 2A or using a new SCI stage 2 format (e.g., SCI format 2-C) to include the communication range requirement.

In some aspects, where only a CSI threshold (e.g., a predefined CSI threshold) is defined for an Rx UE, the Rx UE (e.g., the Rx UE 110 in FIG. 1) is configured to provide the SL CSI report (e.g., the SL CSI report 114) to the Tx UE (e.g., the Tx UE 104), when the SL CSI measured at the Rx UE is lesser than the CSI threshold. In some aspects, the SL CSI is measured at the Rx UE based on a reference signal (e.g., the CSI-RS) provided to the Rx UE as part of the SL groupcast message 112. Further, the Rx UE (e.g., the Rx UE 110 in FIG. 1) is configured not to provide the SL CSI report to the Tx UE (e.g., the Tx UE 104), when the SL CSI measured at the Rx UE is larger/greater than the CSI threshold. Although not shown in FIG. 1, in other aspects, a plurality of Rx UEs associated with a sidelink group may be configured to provide the respective SL CSI report to the Tx UE 104, in response to receiving the SL groupcast message 112, based on the CSI threshold configured for the respective Rx UE. Alternately, in some aspects, where only a distance threshold (e.g., a predefined distance threshold) is defined/configured for an Rx UE, the Rx UE (e.g., the Rx UE 110 in FIG. 1) is configured to provide the SL CSI report to the Tx UE (e.g., the Tx UE 104), when a distance between the Tx UE and the Rx UE is larger than the distance threshold. Further, the Rx UE (e.g., the Rx UE 110 in FIG. 1) is configured not to provide the SL CSI report to the Tx UE (e.g., the Tx UE 104), when the distance between the Tx UE and the Rx UE is lesser than the distance threshold. Although not shown in FIG. 1, in other aspects, a plurality Rx UEs associated with the sidelink group may be configured to provide the respective SL CSI report to the Tx UE 104, in response to receiving the SL groupcast message 112, based on the distance threshold configured for the respective Rx UE.

Further, in the aspects where both the CSI threshold and the distance threshold are configured for an Rx UE, the Rx UE (e.g., the Rx UE 110 in FIG. 1) is configured to provide the SL CSI report to the Tx UE (e.g., the Tx UE 104), when the SL CSI measured at the Rx UE is lesser than the CSI threshold and when a distance between the Tx UE and the Rx UE is larger than the distance threshold. Further, the Rx UE (e.g., the Rx UE 110 in FIG. 1) is configured not to provide the SL CSI report to the Tx UE (e.g., the Tx UE 104), when the SL CSI measured at the Rx UE is larger/greater than the CSI threshold and when the distance between the Tx UE and the Rx UE is lesser than the distance threshold. Although not shown in FIG. 1, in other aspects, a plurality Rx UEs associated with the sidelink group may be configured to provide the respective SL CSI report to the Tx UE 104, in response to receiving the SL groupcast message 112, based on the CSI threshold and the distance threshold configured for the respective Rx UE.

In some aspects, the Rx UE (e.g., the Rx UE 110 in FIG. 1) is configured to determine the distance between the Tx UE (e.g., the Tx UE 104 in FIG. 1) and the Rx UE, based on a Zone ID of the Tx UE. In some aspects, the Rx UE is configured to receive the Zone ID of the Tx UE in an SCI (e.g., SCI stage 2) received from the Tx UE. In some aspects, the SCI may be received at the Rx UE as part of the sidelink groupcast message (e.g., the SL groupcast message 112) received from the Tx UE. In some aspects, the Zone ID is included in SCI format 2B. Alternately, in other aspects, the SCI stage format 2A is modified to include the Zone ID or a new SCI stage 2 format (e.g., SCI format 2-C) is used to include the Zone ID.

Referring back to FIG. 1, the Rx UEs may be configured to report the SL CSI (or provide the SL CSI report) differently in different aspects. In some aspects, the Rx UEs are configured to report the SL CSI using a reduced number of bits (for example, less than 4-bits). For example, Rx UE 110 may be configured to provide the SL CSI report (e.g., the SL CSI report 114) using a 1-bit indication, using a half-bit indication or using more than 1-bit indication. In some aspects, using lesser number of bits for SL CSI reporting reduces the network overhead (or reduce the use of system resources). While using 1-bit indication, the Rx UE may be configured to provide a first value (e.g., a first sequence in code domain) to indicate to the Tx UE to increase a modulation and coding scheme (MCS)/CQI and provide a second value (e.g., a second sequence in code domain) to indicate to the Tx UE to decrease the MCS/CQI. Further, while using half-bit indication, the Rx UE is configured to provide only a single value, either to indicate to the Tx UE to increase or decrease the MCS. For example, in some aspects, the Rx UE may be configured to provide a first value (e.g., a first sequence in code domain) to indicate to the Tx UE to decrease the MCS/CQI and provide no value to indicate to the Tx UE to increase the MCS/CQI. Alternately, in some aspects, the Rx UE may be configured to provide a first value (e.g., a first sequence in code domain) to indicate to the Tx UE to increase the MCS/CQI and provide no value to indicate to the Tx UE to decrease the MCS/CQI. In some aspects, the sequences (or cyclic shift values) referred to above comprises code domain resources. In code domain, a predefined set of sequences or cyclic shift values are defined, each of which can be utilized to convey information via physical layer signaling.

Furthermore, while using more than 1-bit indication, the Rx UE may be configured to provide more than two different values to the Tx UE, each value having an increased level of indication (or multiple levels of indication) related to the MCS (or CQI). For example, each value (e.g., a sequence in code domain) may indicate to the Tx UE whether to increase or decrease the MCS (or CQI) and to what value the MCS (or CQI) is to be increased or decreased. In case of 2-bit indication, 4 different values or sequences are used, in case of 3-bit indication, 8 different values or sequences are used and so on.

In some aspects, the Rx UE (e.g., the RX UE 110 in FIG. 1) is configured to provide the SL CSI (i.e., 1-bit indication, half-bit indication or more than 1-bit indication) via physical layer signaling. In some aspects, the Rx UE (e.g., the RX UE 110 in FIG. 1) is configured to report the SL CSI as a sequence based SL CSI feedback. In the sequence based SL CSI feedback, one or more predefined sequences (e.g., the code domain sequences) are utilized by the Rx UE to indicate to the Tx UE whether to increase or decrease a modulation and coding scheme (MCS) or CQI, as already explained above. In some aspects, the sequence based SL CSI feedback is separately encoded with physical sidelink feedback channel (PSFCH) resources which are utilized for hybrid automatic repeat request (HARQ) Ack/Nack feedback. In other words, a resource (which can include a set of time, frequency and code domain resources) for the sequence based SL CSI feedback is separate/different from the PSFCH resources. In some aspects, the resource for the sequence based SL CSI feedback is frequency division multiplexed (FDM) and/or code division multiplexed (CDM) with physical sidelink feedback channel (PSFCH) resources.

When the resource for the sequence based SL CSI feedback is FDM with the PSFCH resources, the sequence based SL CSI feedback uses the same time-domain resources and code-domain resources as the PSFCH (i.e., the sequence based SL CSI feedback and the PSFCH overlap in both time-domain and code-domain) but uses different frequency domain resources compared to the PSFCH. When the resource for the sequence based SL CSI feedback is CDM with the PDFCH resources, the sequence based SL CSI feedback uses the same time-domain resources and frequency-domain as the PSFCH (i.e., the sequence based SL CSI feedback and the PSFCH overlap in both time-domain and frequency-domain) but uses different code-domain resources (for example, different sequences) compared to the PSFCH. Further, when the resource for the sequence based SL CSI feedback is both FDM and CDM with the PSFCH resources, the sequence based SL CSI feedback uses the same time-domain resources as the PSFCH (i.e., the sequence based SL CSI feedback and the PSFCH overlap in time-domain) but uses different frequency domain resources and different code-domain resources (for example, different sequences) compared to the PSFCH.

In some embodiments, the Rx UE (e.g., the Rx UE 110) is configured to determine the resource for the sequence based SL CSI feedback (that is FDM/CDM with PSFCH) based on a source ID of the Tx UE (e.g., the Tx UE 104) from which the SL groupcast message 112 is received and the corresponding PSCCH/PSSCH resources. More particularly, once the PSCCH/PSSCH resources for the Tx UE are identified, then the Rx UE can determine the PSFCH resources based on a predefined association between the PSCCH/PSSCH and the PSFCH. Typically, PSFCH occupies the second last and third last symbols of a slot. Once the PSFCH resources are determined/identified, the resource for the sequence based SL CSI feedback can be identified (from a set of resources that are FDM and/or CDM with the PSFCH resources). In some aspects, the resource for the sequence based SL CSI feedback may be determined based on some predefined relation with respect to the PSFCH resources. In some aspects, all the UEs within a sidelink group uses a same time/frequency and code domain resource to provide the respective sequence based SL CSI feedback. In other words, all the UEs within the sidelink group use a same resource (that is FDM/CDM with PSFCH) for sequence based SL CSI feedback. Therefore, in this example, each of the Rx UEs (i.e., the Rx UE 106, the Rx UE 108 and the Rx UE 110) within the sidelink group may use a same time frequency and code domain resource (i.e., a same resource) to provide the respective sequence based SL CSI feedback to the Tx UE 104. In such aspects, the Tx UE 104 may detect the energy of the corresponding resource to determine whether or not to increase (or decrease, in other aspects) the MCS/CQI in transport block (TB) retransmissions or new TB transmissions.

Alternately in other aspects, each of the UEs within a sidelink group uses an individual (or different/separate) time/frequency/code domain resource (each of those resources being FDM/CDM with PSFCH) to provide the respective sequence based SL CSI feedback. In other words, all the UEs within the sidelink group use different resources for sequence based SL CSI feedback. Therefore, in this example, each of the Rx UEs (i.e., the Rx UE 106, the Rx UE 108 and the Rx UE 110) within the sidelink group may use an individual (or different) time/frequency/code domain resource to provide the respective sequence based SL CSI feedback to the Tx UE 104. In some aspects, a group member ID of the UE (e.g., the Rx UE) is utilized by the Rx UE to determine the corresponding resource for providing the sequence based SL CSI feedback. In such aspects, the Tx UE 104 may detect all the corresponding resource from all the Rx UEs to determine whether or not to increase the MCS/CQI or decrease MCS/CQI in transport block (TB) retransmissions or new TB transmissions.

Further, in some aspects, the sequence based SL CSI feedback is jointly encoded with physical sidelink feedback channel (PSFCH) resources which are utilized for hybrid automatic repeat request (HARQ) Ack/Nack feedback. In other words, the sequence based SL CSI feedback uses the same resources as the PSFCH or the sequence based SL CSI feedback is provided using the PSFCH resources. In some aspects of joint encoding, 2-bit information is provided, 1 bit for PSFCH and 1 bit for SL CQI. In some aspects, the 2-bit information is provided using 4 cyclic shift values (or 4 sequences), each sequence indicative of the PSFCH (i.e., Ack or Nack) and the MCS/CQI (i.e., whether to increase or decrease MCS/CQI). For example, a first sequence for Ack/increase MCS, a second sequence for Ack/decrease MCS, a third sequence for Nack/increase MCS and a fourth value for Nack/decrease MCS. Further, in other aspects of joint encoding, 3-bit information is provided, 1 bit for PSFCH and 2 bits for SL CQI, or 1 bit of PSFCH, 1 bit of SL CQI and 1 bit of SL rank indicator (RI). In some aspects, the 3-bit information is provided using 8 cyclic shift values (or 8 sequences), each sequence indicative of the PSFCH (i.e., Ack or Nack) and an increased/more accurate level of indication of the MCS/CQI (e.g., whether to increase or decrease MCS/CQI and by what value the MCS/CQI is to be increased or decreased).

Figure 3:
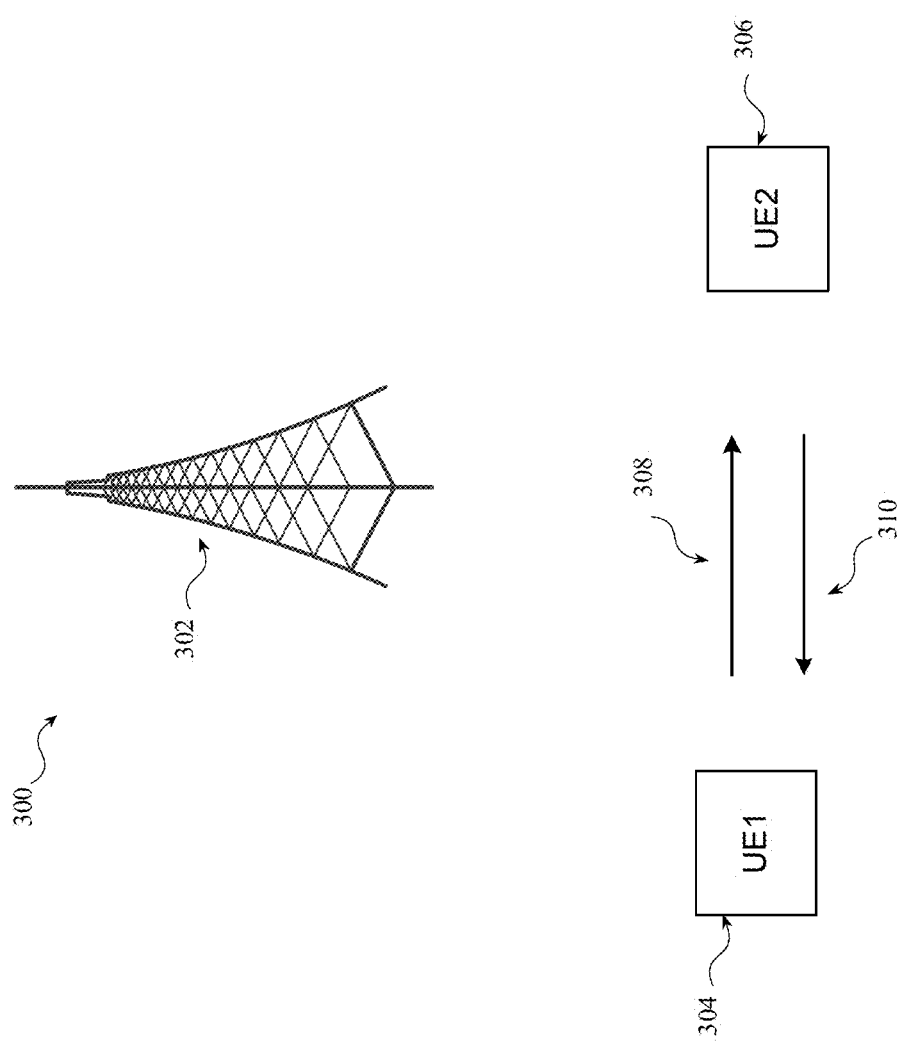
FIG. 3 illustrates a simplified block diagram of a wireless communication network that facilitates sidelink communications, according to another aspect of the disclosure.

FIG. 3 illustrates a simplified block diagram of a wireless communication network 300 that facilitates sidelink communications, according to one aspect of the disclosure. In some aspects, the wireless communication network 300 facilitates sidelink (SL) channel state information (CSI) reporting along with sending inter-UE coordination information. The wireless communication network 300 comprises base station 302 and user equipments (UEs), UE1 304 and UE2 306. In other aspects, however, the wireless communication network 300 can comprise more UEs than illustrated above. In some aspects, the base station 302 is equivalent to an eNodeB in LTE systems, gNodeB in 5G new radio (NR) systems or a network device associated with any other generations (past, present or future) of cellular technologies. In some aspects, the UE1 304 and the UE2 306 may comprise a mobile phone, tablet computer, an internet of things (IoT) device, a vehicle-to-everything (V2X) UE, etc. In some aspects, each of the UEs, that is, the UE1 304 and the UE2 306 are configured to communicate with the base station 302 over a communication medium (e.g., air). In some aspects, each of the UEs, that is, the UE1 304 and the UE2 306 are also configured to communicate with one another over sidelink (i.e., without going through the base station 302). In some aspects, each of the UEs, that is, the UE1 304 and the UE2 306 are configured to perform unicast, groupcast or broadcast communications with other UEs in the wireless communication network 300 over sidelink.

In inter-UE coordination, a transmit (Tx) UE relies on information from a receiving (Rx) UE to determine/modify the resources to be utilized for the Tx UE's data transmission. In some aspects, a UE that is configured to perform data transmission is referred to as the Tx UE and a UE that is configured to perform data reception is referred to as the Rx UE. In this example, the UE1 304 comprise the Tx UE and the UE2 306 comprise the Rx UE. Therefore, in this example aspect, the UE1 304 is referred to as the Tx UE 304 and the UE2 306 is referred to as the Rx UE 306. However, in other aspects, the UE1 304 can comprise the Rx UE and the UE2 306 can comprise the Tx UE. In some aspects, the wireless communication network 300 facilitates Type-1 inter-UE coordination, where the Rx UE provides information on a set of preferred resources or a set of non-preferred resources for a sidelink transmission from the Tx UE, prior to receiving any sidelink data transmission from the Tx UE at the Rx UE. In some aspects, the set of preferred resources comprises one or more resources that may be utilized (or are available) for performing sidelink data transmission from the Tx UE. Further, in some aspects, the set of non-preferred resources comprises one or more resources that may not be utilized (or are not available) for performing sidelink data transmission from the Tx UE.

In Type-1 inter-UE coordination, the Tx UE 304 is configured to provide/send an inter-UE coordination request signal 308 to the Rx UE 306 over sidelink. In some aspects, the inter-UE coordination request signal 308 comprises an inter-UE coordination request that requests the Rx UE 306 to determine a set of preferred resources or a set of non-preferred resources for a sidelink (SL) transmission (e.g., SL data transmission) from the Tx UE, for example, to the Rx UE 306 or to a different UE (e.g., within the wireless communication network 300). In some aspects, the inter-UE coordination request included in the inter-UE coordination request signal 308 comprises a Type 1 inter-UE coordination request. In some aspects, the Type 1 inter-UE coordination request is provided to the Rx UE 306, before the Tx UE 304 performs any sidelink data transmission (e.g., to the Rx UE 306 or to the different UE). In some aspects, the inter-UE coordination request signal 308 further comprises a SL channel state information (CSI) request and a transmission of a SL channel state information reference signal (CSI-RS). In some aspects, the inter-UE coordination request is provided to the Rx UE 306 via physical sidelink control channel (PSCCH)/physical sidelink shared channel (PSSCH). Further, the SL CSI request is provided to the Rx UE 306 in a sidelink control information (SCI) stage 2. Furthermore, the SL CSI-RS is provided to the Rx UE 306 via PSSCH.

Upon receiving the inter-UE coordination request signal 308, the Rx UE 306 is configured to determine the set of preferred resources or the set of non-preferred resources, in response to processing the inter-UE coordination request. Further, the Rx UE 306 is configured to determine an SL CSI for the Tx UE 304, in response to processing the SL CSI request. Further, the Rx UE 306 is configured to send an inter-UE coordination response signal 310 comprising an SL CSI report derived based on the SL CSI, to the Tx UE 304. In some aspects, the SL CSI report comprises a value of the SL CSI or an information derived based on the SL CSI. In some aspects, the inter-UE coordination response signal 310 further comprises an inter-UE coordination response (or inter-UE coordination information) that comprises the set of preferred resources or the set of non-preferred resources. Therefore, in such aspects, the Rx UE 306 is configured to send the SL CSI report together with the inter-UE coordination response, to the Tx UE 304, as part of the inter-UE coordination request signal 308. In some aspects, when the inter-UE coordination response comprises the set of preferred resources, the Rx UE 306 is configured to send both the inter-UE coordination response and the SL CSI report to the Tx UE 304 via a sidelink control information (SCI) stage 2 format. Alternately, in other aspects, when the inter-UE coordination response comprises the set of non-preferred resources, the Rx UE 306 is configured to send the inter-UE coordination response to the Tx UE 304 via physical sidelink shared channel (PSSCH) and send the SL CSI report to the Tx UE 304 via a sidelink control information (SCI) stage 2 format. Since the set of non-preferred resources may comprise a large set of resources, sending the information of the set of non-preferred resources via the SCI stage 2 format may not be feasible. Further, in some aspects, the Rx UE 306 may be configured to send the inter-UE coordination response and the SL CSI to the Tx UE 304 via a medium access control (MAC) control element (CE).

Figure 4:
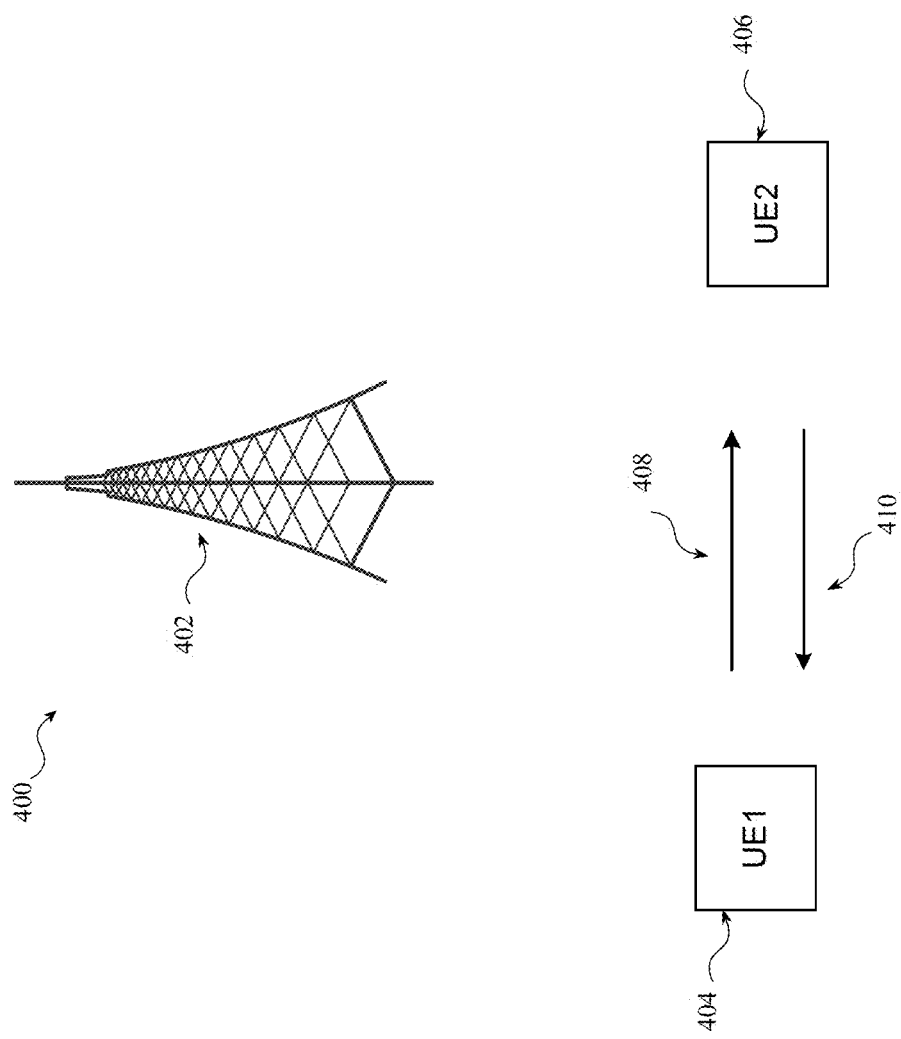
FIG. 4 illustrates a simplified block diagram of a wireless communication network that facilitates sidelink communications, according to yet another aspect of the disclosure.

FIG. 4 illustrates a simplified block diagram of a wireless communication network 400 that facilitates sidelink communications, according to one aspect of the disclosure. In some aspects, the wireless communication network 400 facilitates sidelink (SL) channel state information (CSI) reporting along with sending inter-UE coordination information. The wireless communication network 400 comprises a base station 402 and user equipments (UEs), UE1 404 and UE2 406. In other aspects, however, the wireless communication network 400 can comprise more UEs than illustrated above. In some aspects, the base station 402 is equivalent to an eNodeB in LTE systems, gNodeB in 5G new radio (NR) systems or a network device associated with any other generations (past, present or future) of cellular technologies. In some aspects, the UE1 404 and the UE2 406 may comprise a mobile phone, a tablet computer, an internet of things (IoT) device, a vehicle-to-everything (V2X) UE, etc. In some aspects, each of the UEs, that is, the UE1 404 and the UE2 406 are configured to communicate with the base station 402 over a communication medium (e.g., air). In some aspects, each of the UEs, that is, the UE1 404 and the UE2 406 are also configured to communicate with one another over sidelink (i.e., without going through the base station 402). In some aspects, each of the UEs, that is, the UE1 404 and the UE2 406 are configured to perform unicast, groupcast or broadcast communications with other UEs in the wireless communication network 400 over sidelink.

In inter-UE coordination, a transmit (Tx) UE relies on information from a receiving (Rx) UE to determine/modify the resources to be utilized for the Tx UE's transmission. In some aspects, a UE that is configured to perform data transmission is referred to as the Tx UE and a UE that is configured to perform data reception is referred to as the Rx UE. In this example, the UE1 404 comprises the Tx UE and the UE2 406 comprises the Rx UE. Therefore, in this example aspect, the UE1 404 is referred to as the Tx UE 404 and the UE2 406 is referred to as the Rx UE 406. However, in other aspects, the UE1 404 may comprise the Rx UE and the UE2 406 may comprise the Tx UE. In this aspect, the wireless communication network 400 facilitates Type-2 inter-UE coordination, where the Rx UE provides information on a resource conflict of current resources or reserved resources of the Tx UE, after TX UE performs sidelink data transmission on the current resources. In some aspects, based on the information of the resource conflict, the Tx UE may modify the resources (e.g., the reserved resources) to be utilized for future transmissions.

In Type-2 inter-UE coordination, the Tx UE 404 is configured to provide/send a sidelink transmission signal 408 to the Rx UE 406. In some aspects, the sidelink transmission signal 408 comprises a transmission of a sidelink data (or a sidelink data transmission). In some aspects, the sidelink transmission signal 408 further comprises a SL channel state information (CSI) request and a transmission of a SL channel state information reference signal (CSI-RS). In some aspects, the sidelink data transmission is provided to the Rx UE 406 via a physical sidelink shared channel (PSSCH). Further, the SL CSI request is provided to the Rx UE 406 in a sidelink control information (SCI) stage 2. Furthermore, the SL CSI-RS is provided to the Rx UE 406 via the PSSCH.

Upon receiving the sidelink transmission signal 408, the Rx UE 406 is configured to determine whether a current resource(s) or a reserved resource(s) associated with the Tx UE 404 has a collision associated therewith. In some aspects, the current resource comprises a resource that is utilized by the Tx UE 404 for the transmission of the sidelink data included within the sidelink transmission signal 408. Further, the reserved resource comprises a resource that is reserved by the Tx UE 404 for future transmission of sidelink data to the Rx UE 406 (or to different UE). In some aspects, the collision can correspond to a collision of the current resource or the reserved resource with another UE's reservation or a half-duplex conflict (with the UE's own resources reserved for other purposes). In some aspects, the Rx UE 406 is further configured to determine an SL CSI for the Tx UE 404, in response to processing the SL CSI request. Further, the Rx UE 406 is configured to send an inter-UE coordination signal 410 comprising a collision indicator indicative of a status of the collision of the current resource or the reserved resource (which constitutes the inter-UE coordination information) and a SL CSI report derived based on the determined SL CSI, to the Tx UE 404. In some aspects, the Rx UE 406 is configured to provide the inter-UE coordination signal 410 to the Tx UE 404 via physical layer signaling (e.g., PSFCH). In some aspects, the Rx UE 406 is configured to provide the inter-UE coordination signal 410 to the Tx UE 404, only when the collision is determined (i.e., the collision has occurred) for the current resource or the reserved resource. In such aspects, the inter-UE coordination signal comprises a sequence based transmission comprising a sequence (e.g., a code-domain resource) indicative of the collision. In such aspects, the presence of the sequence is indicative of the collision (i.e., indicating that the collision has occurred). Further, in such aspects, the sequence comprises a first value (i.e., a first sequence or a first cyclic shift value) and a second value (i.e., a second sequence or a second cyclic shift value) to provide the SL CSI report. In particular, the first sequence provides an indication to increase the SL CSI (or CQI) or MCS (of the Tx UE 404) and the second sequence provides an indication to decrease the SL CSI or the MCS. In such aspects, therefore, the Rx UE 406 is configured to provide the inter-UE coordination signal 410 based on a 1-bit indication (i.e., using 2 sequences or cyclic shift values). In some aspects, increasing or decreasing the SL CSI corresponds to increasing or decreasing the MCS of the Tx UE 404, respectively.

Alternately, in other aspects, the Rx UE 406 is configured to provide the inter-UE coordination signal 410 to the Tx UE 404, irrespective of whether the collision for the current resource or the reserved resource is determined or not determined. In other words, the Rx UE 406 is configured to provide the inter-UE coordination signal 410 to the Tx UE 404, both when the collision is determined (i.e., the collision has occurred) and when the collision is not determined (i.e., the collision has not occurred). In such aspects, the Rx UE 406 is configured to provide the inter-UE coordination signal 410 based on a 2-bit indication comprising 1 bit for the collision indicator and 1 bit for the SL CSI report. In some aspects, for the 2-bit indication, the inter-UE coordination signal 410 utilizes sequence based transmission. In particular, the inter-UE coordination signal 410 utilizes 4 different sequences (or 4 cyclic shift values), each sequence indicative of a value of the collision indicator and an increase or decrease of the SL CSI. For example, a first sequence for no collision/increase MCS, a second sequence for no collision/decrease MCS, a third sequence for collision/increase MCS and a fourth value for collision/decrease MCS.

Figure 5:
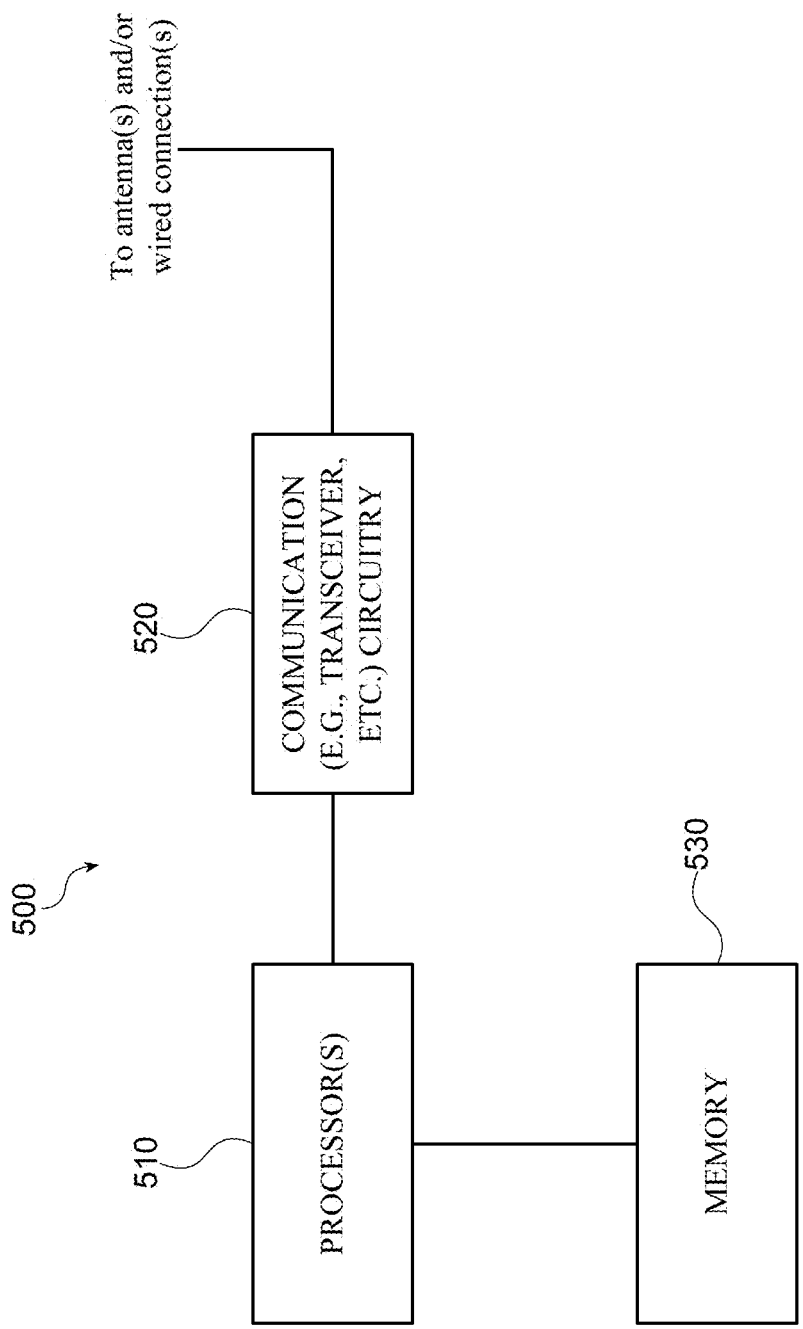
FIG. 5 illustrates a block diagram of an apparatus employable at a Base Station (BS), eNodeB, gNodeB or other network device, according to various aspects described herein.

Referring to FIG. 5, illustrated is a block diagram of an apparatus 500 employable at a Base Station (BS), eNodeB, gNodeB or other network device, according to various aspects described herein. In some aspects, the apparatus 500 may be included within the base station 102 in FIG. 1, the base station 302 in FIG. 3 and the base station 402 in FIG. 4. However, in other aspects, the apparatus 500 could be included within any base station associated with a wireless communication network. The apparatus 500 can include one or more processors (e.g., one or more baseband processors such as one or more of the baseband processors discussed in connection with FIG. 12 and/or FIG. 13) comprising processing circuitry 510 and associated interface(s) (e.g., one or more interface(s) discussed in connection with FIG. 13), transceiver circuitry 520 (e.g., which can comprise circuitry for one or more wired connections and/or part or all of RF circuitry 1206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or transceiver circuitry 520).

In particular, the term memory is intended to include an installation medium, e. g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In various aspects, apparatus 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, transceiver circuitry 520, and the memory 530 can be included in a single device, while in other aspects, they can be included in different devices, such as part of a distributed architecture. In some aspects, the one or more processors 510, the transceiver circuitry 520 and the memory circuit 530 may be implemented as part of a modem system on a single integrated circuit (IC). Alternately, in other aspects, the one or more processors 510, the transceiver circuitry 520 and the memory circuit 530 may be implemented on different ICs.

Figure 6:
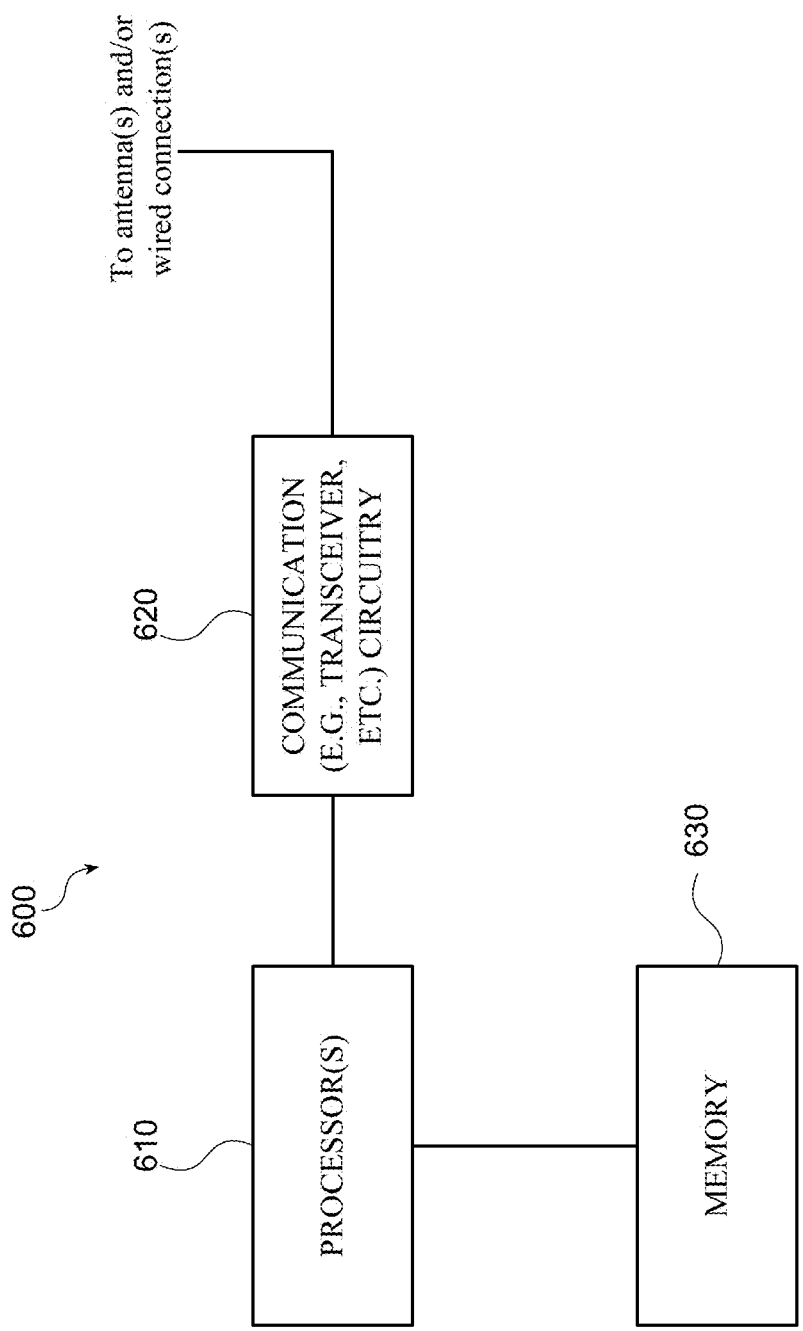
FIG. 6 illustrates a block diagram of an apparatus employable at a user equipment (UE) or other network device (e.g., IoT device), according to various aspects described herein.

Referring to FIG. 6, illustrated is a block diagram of an apparatus 600 employable at a user equipment (UE) or other network device (e.g., IoT device), according to various aspects described herein. In some aspects, the apparatus 600 may be included within the various UEs associated with FIG. 1, FIG. 3 and FIG. 4. However, in other aspects, the apparatus 600 could be included within any UE associated with a wireless communication network. Apparatus 600 can include one or more processors 610 (e.g., one or more baseband processors such as one or more of the baseband processors discussed in connection with FIG. 12 and/or FIG. 13) comprising processing circuitry and associated interface(s) (e.g., one or more interface(s) discussed in connection with FIG. 13), transceiver circuitry 620 (e.g., comprising part or all of RF circuitry 1206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 630 (which can comprise any of a variety of storage mediums and can store instructions and/or data associated with one or more of processor(s) 610 or transceiver circuitry 620). In particular, the term memory is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof.

In various aspects discussed herein, signals and/or messages can be generated and output for transmission, and/or transmitted messages can be received and processed. Depending on the type of signal or message generated, outputting for transmission (e.g., by processor(s) 610) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 610) can comprise one or more of: identifying physical resources associated with the signal/message, detecting the signal/message, resource element group deinterleaving, demodulation, descrambling, and/or decoding. In some aspects, the one or more processors 610, the transceiver circuitry 620 and the memory circuit 630 may be implemented as part of a modem system on a single integrated circuit (IC). Alternately, in other aspects, the one or more processors 610, the transceiver circuitry 620 and the memory circuit 630 may be implemented on different ICs.

Figure 7:
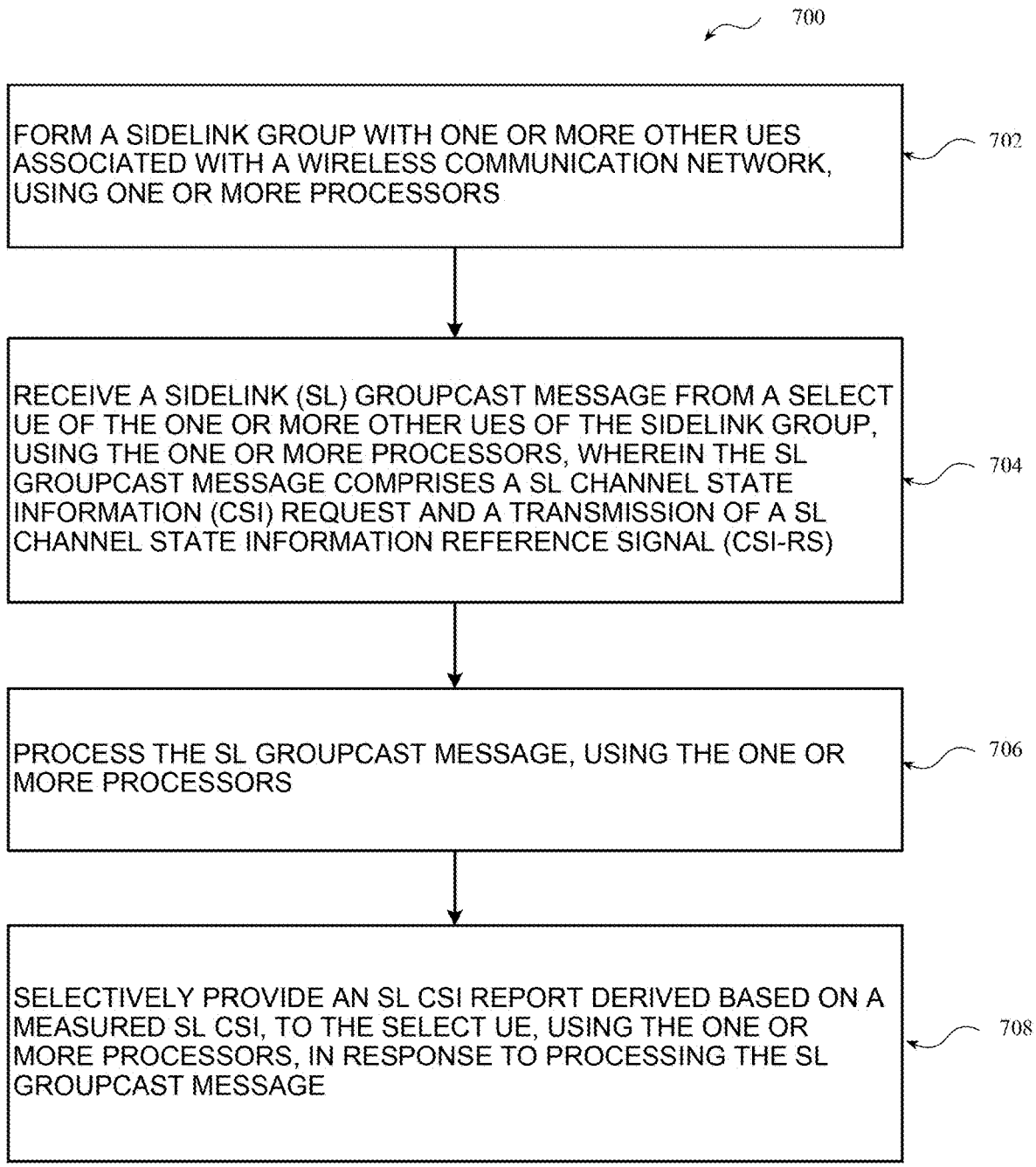
FIG. 7 illustrates a flowchart of a method for a UE associated with a wireless communication network, when the UE is configured to receive sidelink groupcast communications, according to one aspect of the disclosure.

FIG. 7 illustrates a flowchart of a method 700 for a UE associated with a wireless communication network, when the UE is configured to receive sidelink groupcast communications, according to one aspect of the disclosure. The method 700 is explained herein with reference to the apparatus 600 in FIG. 6. In some aspects, the apparatus 600 could be included within a receive (Rx) UE associated with the wireless communication network 100. In some aspects, the Rx UE comprises a UE that is configured to receive a sidelink data transmission from a different UE over sidelink. Although, any of the UEs within the wireless communication network 100 can comprise an Rx UE, in the example aspect of FIG. 1, the UE4 110 is configured as the Rx UE. Therefore, the method 700 is explained with reference to the UE4 110 of the wireless communication network 100 in FIG. 1. At 702, a sidelink group is formed by the UE (i.e., the UE4 110) with one or more other UEs (e.g., the UE2 106, UE3 108 and the UE1 104) associated with a wireless communication network, using one or more processors 610 associated with the UE. At 704, a sidelink (SL) groupcast message is received from a select UE (e.g., the UE1 104 that forms a Tx UE) of the one or more other UEs of the sidelink group, using the one or more processors 610. In some aspects, the SL groupcast message comprises a SL channel state information (CSI) request and a transmission of a SL channel state information reference signal (CSI-RS).

At 706, the SL groupcast message is processed, using the one or more processors 610. At 708, an SL CSI report (e.g., the SL CSI report 114 in FIG. 1) derived based on a measured SL CSI is selectively provided to the select UE, using the one or more processors 610, in response to processing the SL groupcast message. In some aspects, the SL CSI report is provided to the select UE (i.e., the Tx UE), when the select UE from which the SL groupcast message is received corresponds to the designated Tx UE in the paired association associated with any SL CSI reporting association of the one or more SL CSI reporting associations configured for the UE (i.e., the UE4 110), as explained above with respect to the semi-static SL CSI feedback determination procedure. In such aspects, the one or more processors 610 is further configured to determine the one or more SL CSI reporting associations configured for the UE, each SL CSI reporting association of the one or more SL CSI reporting associations comprising a paired association between the UE (i.e., the UE4 110) and another UE comprising any one UE of the one or more other UEs within the sidelink group (i.e., any one of the UE2 106, UE3 108 and the UE1 104), prior to providing the SL CSI report. In some aspects, a first UE of the paired association is designated as a transmit (Tx) UE forming a designated Tx UE and a second UE of the paired association is designated as a receive (Rx) UE forming a designated Rx UE. In some aspects, the designated Tx UE comprises a UE that needs to (or is configured to) receive an associated SL CSI report and the designated Rx UE comprises a UE that needs to (or is configured to) provide the associated SL CSI report. Alternately, in other aspects, the one or more processors 610 is configured to provide the SL CSI report to the select UE, when the measured SL CSI (that is measured at the one or more processors 610) is lesser than a CSI threshold and/or when a distance between the UE and the select UE is greater than a distance threshold, as explained above with respect to the dynamic SL CSI feedback determination procedure. Further, although not explained here, all the other features associated with the UE4 110 in FIG. 1 are also applicable to the method 700.

Figure 8:
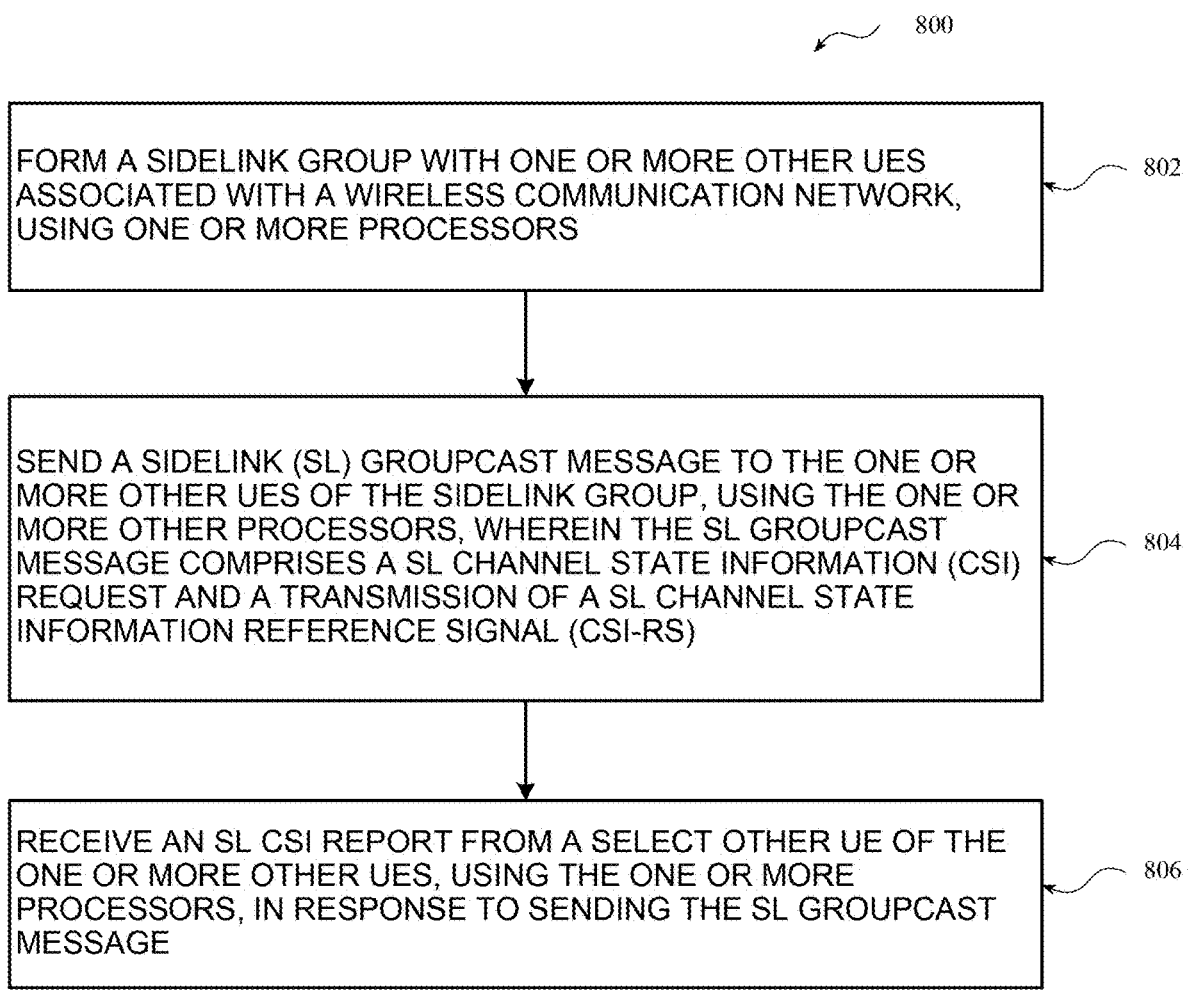
FIG. 8 illustrates a flowchart of a method for a UE associated with a wireless communication network, when the UE is configured to provide sidelink groupcast communications, according to one aspect of the disclosure.

FIG. 8 illustrates a flowchart of a method 800 for a UE associated with a wireless communication network, when the UE is configured to provide sidelink groupcast communications, according to one aspect of the disclosure. The method 800 is explained herein with reference to the apparatus 600 in FIG. 6. In some aspects, the apparatus 600 could be included within a transmit (Tx) UE associated with the wireless communication network 100. In some aspects, the Tx UE comprises a UE that is configured to perform a sidelink data transmission to a different UE over sidelink. Although, any of the UEs within the wireless communication network 100 can comprise a Tx UE, in the example aspect of FIG. 1, the UE1 104 is configured as the Tx UE. Therefore, the method 800 is explained with reference to the UE1 104 of the wireless communication network 100 in FIG. 1. At 802, a sidelink group is formed by the UE (i.e., the UE1 104) with one or more other UEs (e.g., the UE2 106, UE3 108 and the UE4 110) associated with a wireless communication network, using one or more processors 610 associated with the UE. At 804, a sidelink (SL) groupcast message (e.g., the SL groupcast message 112) is send to the one or more other UEs of the sidelink group that forms a set of Rx UEs, using the one or more other processors 610. In some aspects, the SL groupcast message comprises a SL channel state information (CSI) request and a transmission of an SL channel state information reference signal (CSI-RS).

At 806, an SL CSI report (e.g., SL CSI report 114 in FIG. 1) is received from a select Rx UE (e.g., the UE4 110) of the set of Rx UEs, using the one or more processors 610, in response to sending the SL groupcast message. In some aspects, the one or more processors 610 are configured to receive the SL CSI report from the select Rx UE, when the select Rx UE is configured with an SL CSI reporting association that comprises a paired association between the UE and the select Rx UE, and when the UE (i.e., the UE1 104) corresponds to a designated transmit (Tx) UE that is configured to receive an associated SL CSI report and the select Rx UE (i.e., the UE4 110) corresponds to a designated Rx UE that is configured to provide the associated SL CSI report, within the paired association comprised in the SL CSI reporting association configured for the select Rx UE, as explained above with respect to semi-static SL CSI feedback determination procedure. Alternately, in other aspects, the one or more processors 610 are configured to receive the SL CSI report from the select Rx UE, when an SL CSI measured at the select Rx UE is lesser than a CSI threshold and/or when a distance between the UE and the select Rx UE is greater than a distance threshold. In some aspects, the SL CSI report received at 806 may comprise one or more SL CSI reports received respectively from one or more select Rx UEs of the set of Rx UEs (for example, when the set of Rx UEs comprises a plurality of Rx UEs). Further, although not explained here, all the other features associated with the UE1 104 in FIG. 1 are also applicable to the method 800.

Figure 9A:
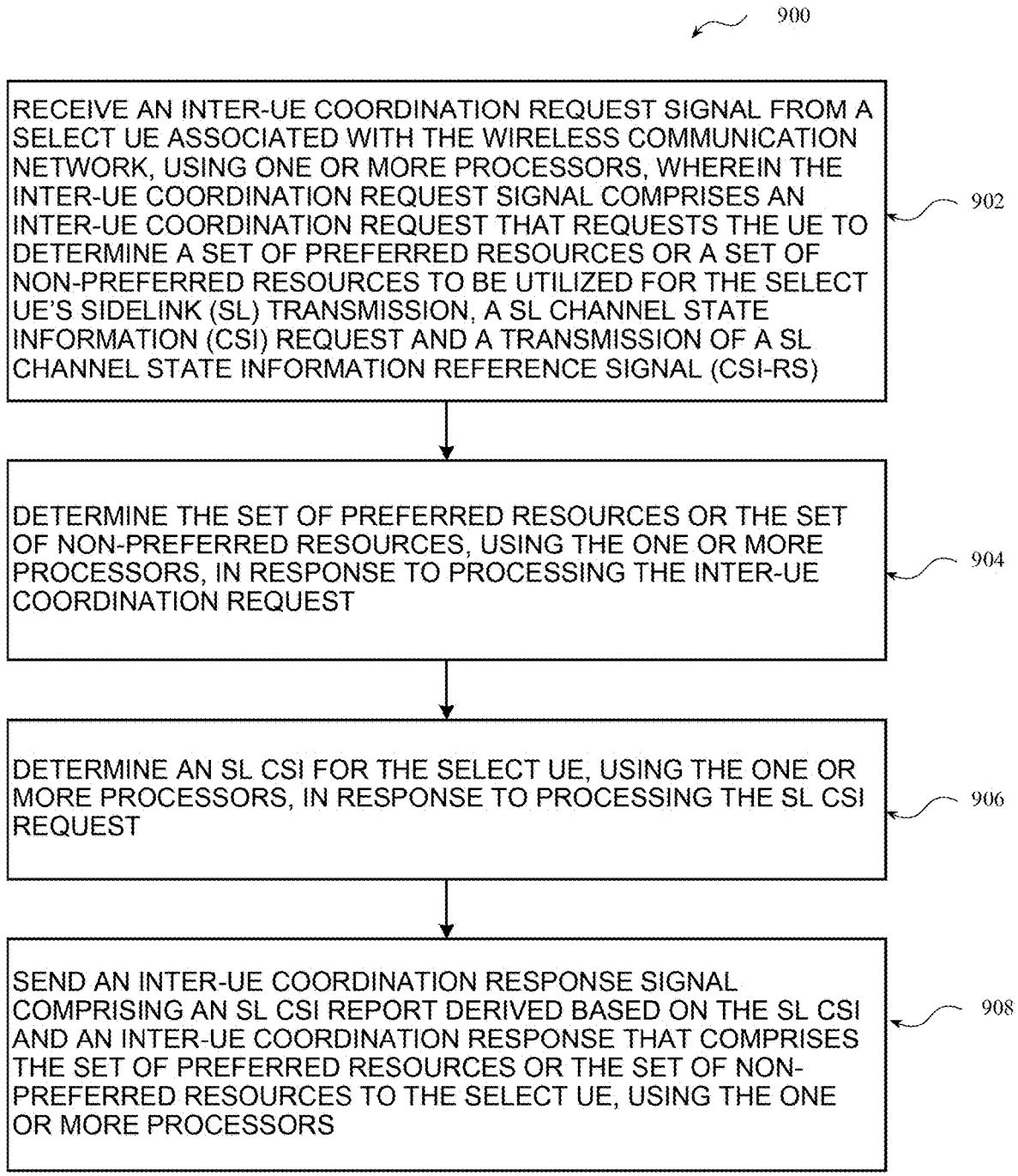
FIG. 9A illustrates a flowchart of a method for a receive (Rx) UE associated with a wireless communication network that facilitates Type-1 inter-UE coordination, according to one aspect of the disclosure.

FIG. 9A illustrates a flowchart of a method 900 for a UE associated with a wireless communication network that facilitates Type-1 inter-UE coordination, according to one aspect of the disclosure. The method 700 is explained herein with reference to the apparatus 600 in FIG. 6. In some aspects, the apparatus 600 could be included within a receive (Rx) UE associated with the wireless communication network 300. In some aspects, the Rx UE comprises a UE that is configured to receive a sidelink data transmission from a different UE over sidelink. Although, any of the UEs within the wireless communication network 300 can comprise an Rx UE, in the example aspect of FIG. 3, the UE2 306 is configured as the Rx UE. Therefore, the method 900 is explained with reference to the UE2 306 of the wireless communication network 300 in FIG. 3. At 902, an inter-UE coordination request signal (e.g., the inter-UE coordination request signal 308 in FIG. 3) is received from a select UE (e.g., the UE1 304 of FIG. 1) associated with the wireless communication network, using one or more processors 610. In some aspects, the inter-UE coordination request signal comprises an inter-UE coordination request (e.g., a Type-1 inter-UE coordination request) that requests the UE (i.e., the UE2 306) to determine a set of preferred resources or a set of non-preferred resources for a sidelink (SL) transmission (or for performing an SL transmission) from the select UE. In some aspects, the inter-UE coordination signal further comprises an SL channel state information (CSI) request and a transmission of an SL channel state information reference signal (CSI-RS).

At 904, the set of preferred resources or the set of non-preferred resources are determined using the one or more processors 610, in response to processing the inter-UE coordination request. At 906, an SL CSI for the select UE is determined, using the one or more processors 610, in response to processing the SL CSI request. At 908, an inter-UE coordination response signal (e.g., the inter-UE coordination response signal 310 in FIG. 3) comprising an SL CSI report derived based on the SL CSI (determined at 906) and an inter-UE coordination response that comprises the set of preferred resources or the set of non-preferred resources (determined at 904) is send to the select UE, using the one or more processors 610. In some aspects, when the inter-UE coordination response comprises the set of preferred resources, the one or more processors 610 is configured to send the inter-UE coordination response and the SL CSI report to the select UE via a sidelink control information (SCI) stage 2 format. Alternately, in other aspects, when the inter-UE coordination response comprises the set of non-preferred resources, the one or more processors 610 is configured to send the inter-UE coordination response to the select UE via physical sidelink shared channel (PSSCH) and send the SL CSI report to the select UE via a sidelink control information (SCI) stage 2 format. Further, in some aspects, the one or more processors 610 is configured to send the inter-UE coordination response signal (i.e., the inter-UE coordination response and the SL CSI report) to the select UE via a medium access control (MAC) control element (CE). Further, although not explained here, all the other features associated with the UE2 306 in FIG. 3 are also applicable to the method 900.

Figure 9B:
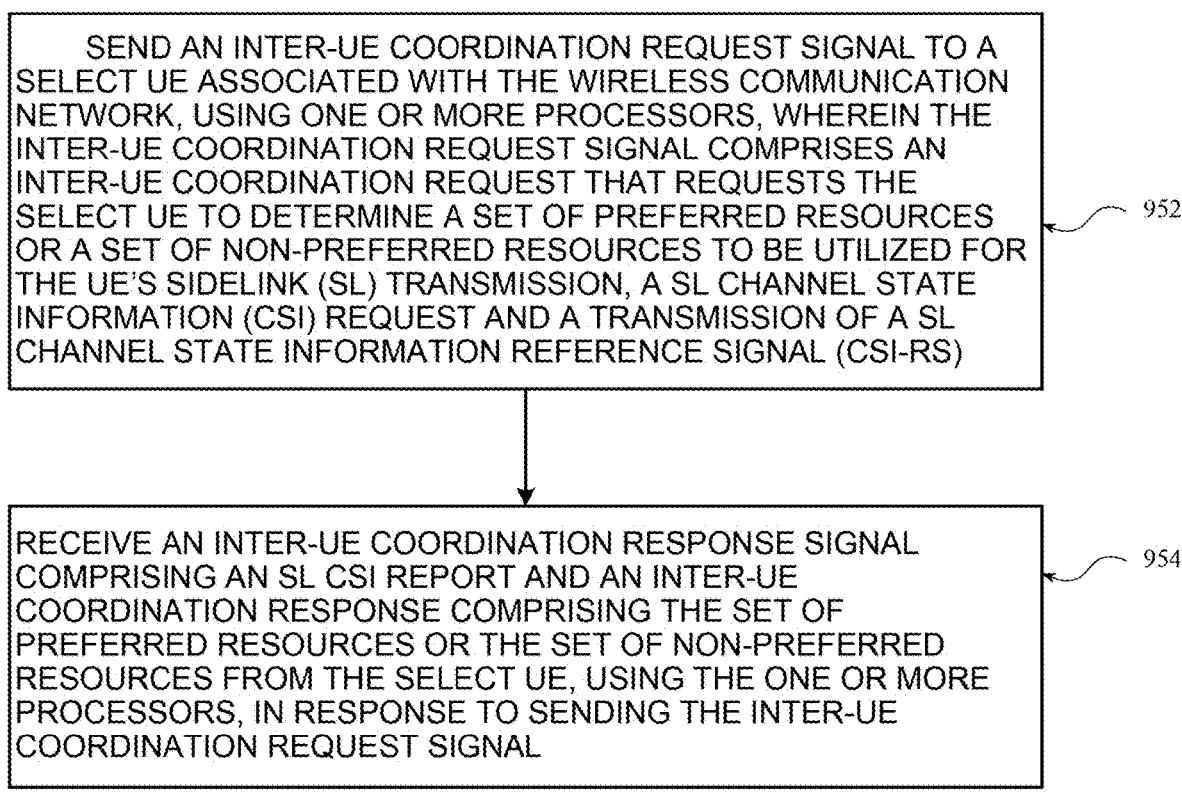
FIG. 9B illustrates a flowchart of a method for a transmit (Tx) UE associated with a wireless communication network that facilitates Type-1 inter-UE coordination, according to one aspect of the disclosure.

FIG. 9B illustrates a flowchart of a method 950 for a UE associated with a wireless communication network that facilitates Type-1 inter-UE coordination, according to another aspect of the disclosure. The method 950 is explained herein with reference to the apparatus 600 in FIG. 6. In some aspects, the apparatus 600 could be included within a transmit (Tx) UE associated with the wireless communication network 300. In some aspects, the Tx UE comprises a UE that is configured to transmit a sidelink data transmission to a different UE over sidelink. Although, any of the UEs within the wireless communication network 300 can comprise a Tx UE, in the example aspect of FIG. 3, the UE1 304 is configured as the Tx UE. Therefore, the method 950 is explained with reference to the UE1 304 of the wireless communication network 300 in FIG. 3. At 952, an inter-UE coordination request signal (e.g., the inter-UE coordination request signal 308 in FIG. 3) is send to a select UE (e.g., the UE2 306 in FIG. 3) associated with the wireless communication network, using one or more processors 610. In some aspects, the inter-UE coordination request signal comprises an inter-UE coordination request (e.g., a Type-1 inter-UE coordination request) that requests the select UE to determine a set of preferred resources or a set of non-preferred resources for a sidelink (SL) transmission (or for performing an SL transmission) from the UE (e.g., the UE's sidelink data transmission to the select UE or a different UE). In some aspects, the inter-UE coordination request signal further comprises an SL channel state information (CSI) request and a transmission of an SL channel state information reference signal (CSI-RS).

At 954, an inter-UE coordination response signal (e.g., the inter-UE coordination response signal 310 in FIG. 3) comprising an SL CSI report and an inter-UE coordination response comprising the set of preferred resources or the set of non-preferred resources is received from the select UE, using the one or more processors 610, in response to sending the inter-UE coordination request signal. In some aspects, when the inter-UE coordination response comprises the set of preferred resources, the one or more processors 610 is configured to receive the inter-UE coordination response and the SL CSI report from the select UE via a sidelink control information (SCI) stage 2 format. Alternately, in other aspects, when the inter-UE coordination response comprises the set of non-preferred resources, the one or more processors 610 are configured to receive the inter-UE coordination response via physical sidelink shared channel (PSSCH) and receive the SL CSI report via a sidelink control information (SCI) stage 2 format. Further, in some aspects, the one or more processors 610 is configured to receive the inter-UE coordination response signal (i.e., the inter-UE coordination response and the SL CSI report) via a medium access control (MAC) control element (CE). Further, although not explained here, all the other features associated with the UE1 304 in FIG. 3 are also applicable to the method 950.

Figure 10A:
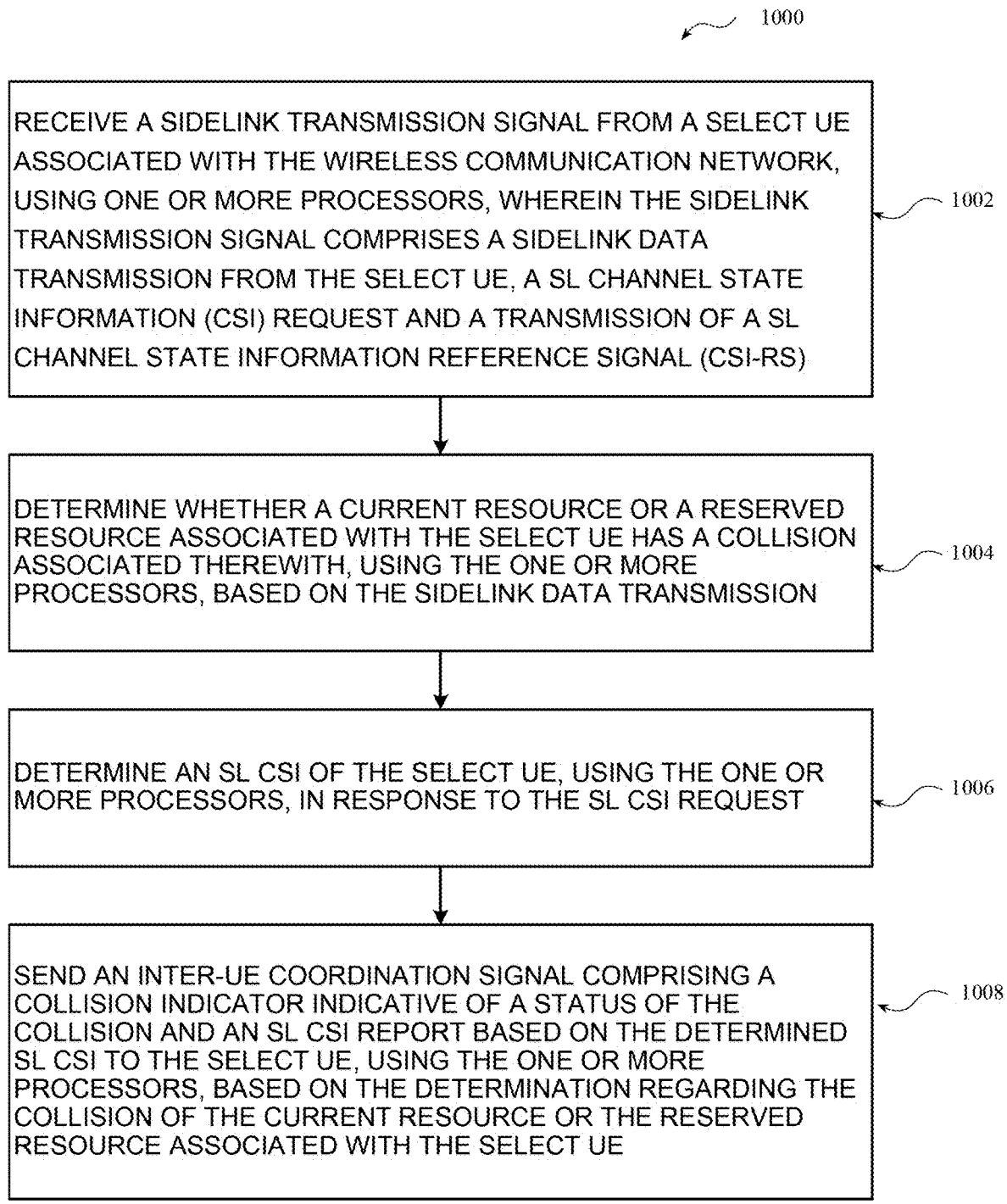
FIG. 10A illustrates a flowchart of a method for a receive (Rx) UE associated with a wireless communication network that facilitates Type-2 inter-UE coordination, according to one aspect of the disclosure.

FIG. 10A illustrates a flowchart of a method 1000 for a UE associated with a wireless communication network that facilitates Type-2 inter-UE coordination, according to one aspect of the disclosure. The method 1000 is explained herein with reference to the apparatus 600 in FIG. 6. In some aspects, the apparatus 600 could be included within a receive (Rx) UE associated with the wireless communication network 400. In some aspects, the Rx UE comprises a UE that is configured to receive a sidelink data transmission from a different UE over sidelink. Although, any of the UEs within the wireless communication network 400 can comprise an Rx UE, in the example aspect of FIG. 4, the UE2 406 is configured as the Rx UE. Therefore, the method 1000 is explained with reference to the UE2 406 of the wireless communication network 400 in FIG. 4. At 1002, a sidelink transmission signal (e.g., the sidelink transmission signal 408 in FIG. 4) is received from a select UE (e.g., the UE1 404) associated with the wireless communication network, using one or more processors 610. In some aspects, the sidelink transmission signal comprises a sidelink data transmission from the select UE, a SL channel state information (CSI) request and a transmission of an SL channel state information reference signal (CSI-RS).

At 1004, a determination whether a current resource or a reserved resource associated with the select UE has a collision associated therewith is performed using the one or more processors 610, based on the sidelink data transmission. At 1006, an SL CSI of the select UE is determined using the one or more processors 610, in response to the SL CSI request. At 1008, an inter-UE coordination signal (e.g., the inter-UE coordination signal 410 in FIG. 4) comprising a collision indicator indicative of a status of the collision and an SL CSI report derived based on the determined SL CSI is send to the select UE, using the one or more processors 610. In some aspects, the inter-UE coordination signal is send to the select UE, based on the determination regarding the collision of the current resource or the reserved resource associated with the select UE. In particular, in some aspects, the one or more processors 610 are configured to send the inter-UE coordination signal to the select UE, only when the collision is determined for the current resource or the reserved resource, or both.

In such aspects, the one or more processors 610 are configured to send the inter-UE coordination signal in a sequence based transmission comprising a sequence indicative of the collision. In such aspects, the sequence comprises a first sequence to provide an indication to increase the SL CSI and a second sequence to provide an indication to decrease the SL CSI. Alternately, in other aspects, the one or more processors are configured to send the inter-UE coordination signal to the select UE, irrespective of whether the collision for the current resource or the reserved resource is determined or not determined. In such aspects, the one or more processors are configured to send the inter-UE coordination signal based on a 2-bit indication comprising 1 bit for the collision indicator and 1 bit for the SL CSI report. In some aspects, the inter-UE coordination signal utilizes 4 different sequences (e.g., 4 code-domain sequences or 4 cyclic shift values) for the 2-bit indication, each sequence indicative of a value of the collision indicator and an increase or decrease of the SL CSI. Further, although not explained here, all the other features associated with the UE2 406 in FIG. 4 are also applicable to the method 1000.

Figure 10B:
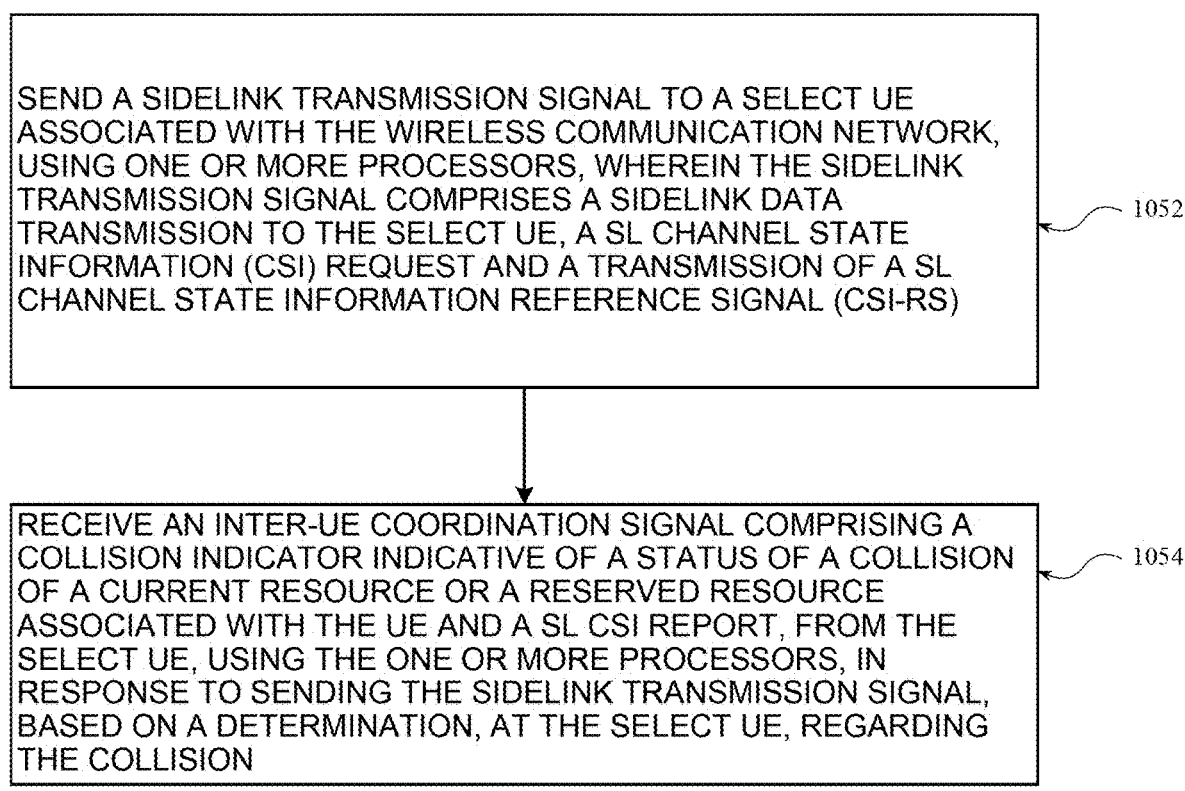
FIG. 10B illustrates a flowchart of a method for a transmit (Tx) UE associated with a wireless communication network that facilitates Type-2 inter-UE coordination, according to one aspect of the disclosure.

FIG. 10B illustrates a flowchart of a method 1050 for a UE associated with a wireless communication network that facilitates Type-2 inter-UE coordination, according to one aspect of the disclosure. The method 1050 is explained herein with reference to the apparatus 600 in FIG. 6. In some aspects, the apparatus 600 could be included within a transmit (Tx) UE associated with the wireless communication network 400. In some aspects, the Tx UE comprises a UE that is configured to send a sidelink data transmission to a different UE over sidelink. Although, any of the UEs within the wireless communication network 400 can comprise a Tx UE, in the example aspect of FIG. 4, the UE1 404 is configured as the Tx UE. Therefore, the method 1050 is explained with reference to the UE1 404 of the wireless communication network 400 in FIG. 4. At 1052, a sidelink transmission signal (e.g., the sidelink transmission signal 408 in FIG. 4) is send to a select UE (e.g., the UE2 406) associated with the wireless communication network, using one or more processors 610. In some aspects, the sidelink transmission signal comprises a sidelink data transmission to the select UE, a SL channel state information (CSI) request and a transmission of a SL channel state information reference signal (CSI-RS).

At 1054, an inter-UE coordination signal (e.g., the inter-UE coordination signal 410 in FIG. 4) comprising a collision indicator indicative of a status of a collision of a current resource or a reserved resource associated with the UE (i.e., the UE1 404) and an SL CSI report is received from the select UE, using the one or more processors 610, in response to sending the sidelink transmission signal. In some aspects, the inter-UE coordination signal is received at the UE, based on a determination, at the select UE, regarding the collision. In some aspects, the one or more processors 610 are configured to receive the inter-UE coordination signal from the select UE, only when the collision is determined for the current resource or the reserved resource at the select UE.

In such aspects, the one or more processors are configured to receive the inter-UE coordination signal in a sequence based transmission comprising a sequence indicative of the collision. In some aspects, the sequence comprises a first sequence to provide an indication to increase the SL CSI and wherein the sequence comprises a second sequence to provide an indication to decrease the SL CSI. Alternately, in other aspects, the one or more processors 610 are configured to receive the inter-UE coordination signal from the select UE, irrespective of whether the collision for the current resource or the reserved resource is determined or not determined. In such aspects, the one or more processors 610 are configured to receive the inter-UE coordination signal from the select UE based on a 2-bit indication comprising 1 bit for the collision indicator and 1 bit for the SL CSI report. Further, although not explained here, all the other features associated with the UE1 401 in FIG. 4 are also applicable to the method 1050.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or aspects of the disclosure herein. Also, one or more of the acts depicted herein may be carried out in one or more separate acts and/or phases.

Figure 11:
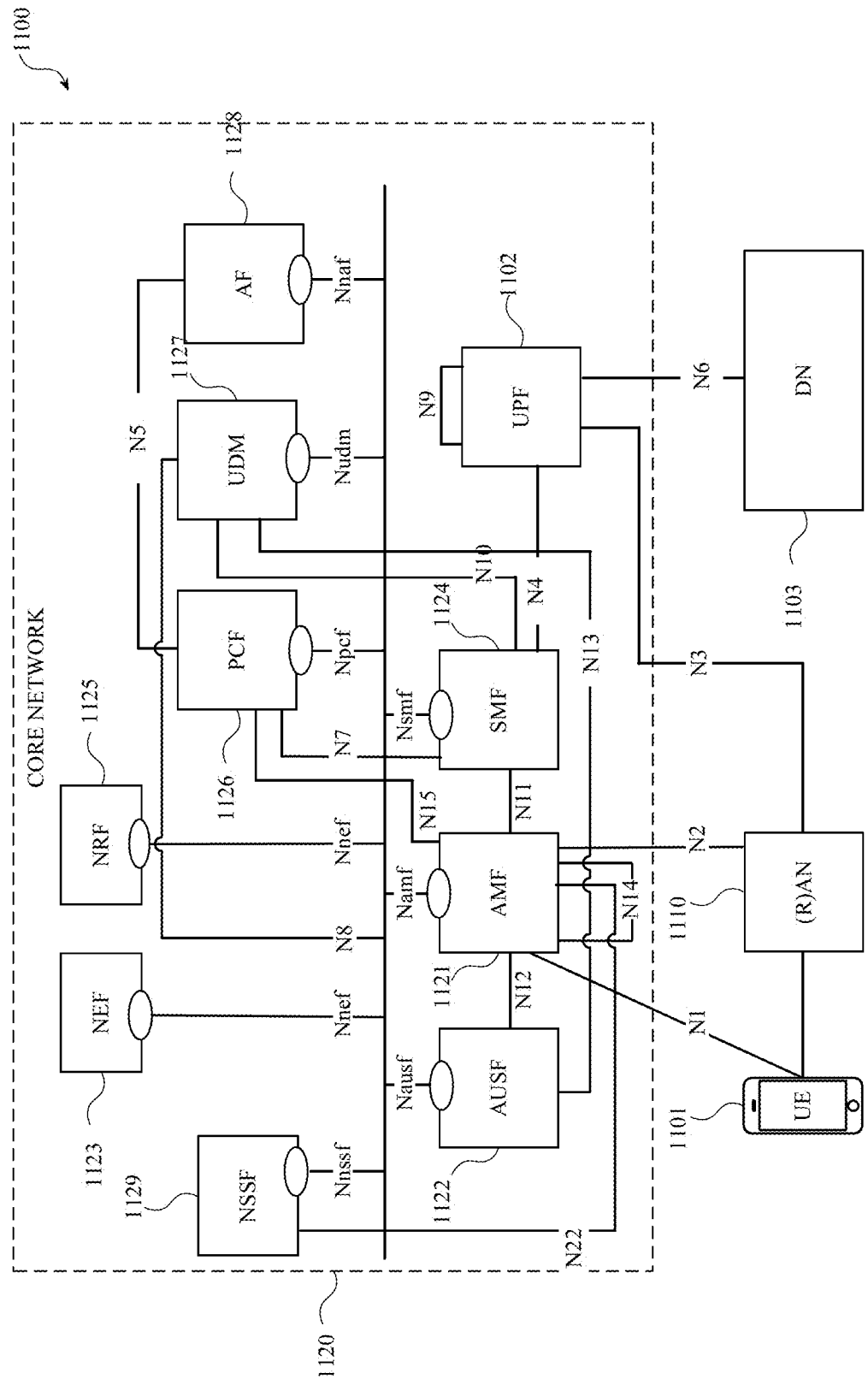
FIG. 11 illustrates an architecture of a system including a Core Network (CN), for example a Fifth Generation (5G) CN (5GC), in accordance with various aspects.

Aspects described herein can be implemented into a system using any suitably configured hardware and/or software. FIG. 11 illustrates an architecture of a system 1100 including a Core Network (CN) 1120, for example a Fifth Generation (5G) CN (5GC), in accordance with various aspects. The system 1100 is shown to include a UE 1101, which can be the same or similar to one or more other UEs discussed herein; a Third Generation Partnership Project (3GPP) Radio Access Network (Radio AN or RAN) or other (e.g., non-3GPP) AN, (R)AN, which can include one or more RAN nodes (e.g., Evolved Node B(s) (eNB(s)), next generation Node B(s) (gNB(s), and/or other nodes) or other nodes or access points; and a Data Network (DN), which can be, for example, operator services, Internet access or third party services; and a Fifth Generation Core Network (5GC) 1120. The 5GC 1120 can comprise one or more of the following functions and network components: an Authentication Server Function (AUSF) 1122; an Access and Mobility Management Function (AMF) 1121; a Session Management Function (SMF) 1124; a Network Exposure Function (NEF) 723; a Policy Control Function (PCF) 1126; a Network Repository Function (NRF) 1125; a Unified Data Management (UDM) 1127; an Application Function (AF) 1128; a User Plane (UP) Function (UPF) 1102; and a Network Slice Selection Function (NSSF) 1129.

The UPF 1102 can act as an anchor point for intra-RAT and inter-RAT mobility, an external Protocol Data Unit (PDU) session point of interconnect to DN 1103, and a branching point to support multi-homed PDU session. The UPF 1102 can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF 1102 can include an uplink classifier to support routing traffic flows to a data network. The DN 1103 can represent various network operator services, Internet access, or third-party services. DN 1103 can include, or be similar to, an application server. The UPF 1102 can interact with the SMF 1124 via an N4 reference point between the SMF 1124 and the UPF 1102.

The AUSF 1122 can store data for authentication of UE 1101 and handle authentication-related functionality. The AUSF 1122 can facilitate a common authentication framework for various access types. The AUSF 1122 can communicate with the AMF 1121 via an N12 reference point between the AMF 1121 and the AUSF 1122; and can communicate with the UDM 1127 via an N13 reference point between the UDM 1127 and the AUSF 1122. Additionally, the AUSF 1122 can exhibit an Nausf service-based interface.

The AMF 1121 can be responsible for registration management (e.g., for registering UE 1101, etc.), connection management, reachability management, mobility management, and lawful interception of AMF-related events, and access authentication and authorization. The AMF 1121 can be a termination point for the an N11 reference point between the AMF 1121 and the SMF 1124. The AMF 1121 can provide transport for SM messages between the UE 1101 and the SMF 1124, and act as a transparent proxy for routing SM messages. AMF 1121 can also provide transport for SMS messages between UE 1101 and a Short Message Service (SMS) Function (SMSF) (not shown in FIG. 7). AMF 1121 can act as Security Anchor Function (SEAF), which can include interaction with the AUSF 1122 and the UE 1101 and/or receipt of an intermediate key that was established as a result of the UE 1101 authentication process. Where Universal Subscriber Identity Module (USIM) based authentication is used, the AMF 1121 can retrieve the security material from the AUSF 1122. AMF 1121 can also include a Single-Connection Mode (SCM) function, which receives a key from the SEA that it uses to derive access-network specific keys. Furthermore, AMF 1121 can be a termination point of a RAN Control Plane (CP) interface, which can include or be an N2 reference point between the (R)AN 1110 and the AMF 1121; and the AMF 1121 can be a termination point of Non Access Stratum (NAS) (N1) signaling, and perform NAS ciphering and integrity protection.

AMF 1121 can also support NAS signaling with a UE 1101 over an Non-3GPP (N3) Inter Working Function (IWF) interface. The N3IWF can be used to provide access to untrusted entities. N3IWF can be a termination point for the N2 interface between the (R)AN 1110 and the AMF 1121 for the control plane, and can be a termination point for the N3 reference point between the (R)AN 1110 and the UPF 1102 for the user plane. As such, the AMF 1121 can handle N2 signaling from the SMF 1124 and the AMF 1121 for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 1101 and AMF 1121 via an N1 reference point between the UE 1101 and the AMF 1121, and relay uplink and downlink user-plane packets between the UE 1101 and UPF 1102. The N3IWF also provides mechanisms for IPsec tunnel establishment with the UE 1101. The AMF 1121 can exhibit an Namf service-based interface, and can be a termination point for an N14 reference point between two AMFs 1121 and an N17 reference point between the AMF 1121 and a 5G Equipment Identity Register (5G-EIR) (not shown in FIG. 11).

The UE 1101 can be registered with the AMF 1121 in order to receive network services. Registration Management (RM) is used to register or deregister the UE 1101 with the network (e.g., AMF 1121), and establish a UE context in the network (e.g., AMF 1121). The UE 1101 can operate in an RM-REGISTERED state or an RM-DEREGISTERED state. In the RM-DEREGISTERED state, the UE 1101 is not registered with the network, and the UE context in AMF 1121 holds no valid location or routing information for the UE 1101 so the UE 1101 is not reachable by the AMF 1121. In the RM-REGISTERED state, the UE 1101 is registered with the network, and the UE context in AMF 1121 can hold a valid location or routing information for the UE 1101 so the UE 1101 is reachable by the AMF 1121. In the RM-REGISTERED state, the UE 1101 can perform mobility Registration Update procedures, perform periodic Registration Update procedures triggered by expiration of the periodic update timer (e.g., to notify the network that the UE 1101 is still active), and perform a Registration Update procedure to update UE capability information or to re-negotiate protocol parameters with the network, among others.

The AMF 1121 can store one or more RM contexts for the UE 1101, where each RM context is associated with a specific access to the network. The RM context can be a data structure, database object, etc. that indicates or stores, inter alia, a registration state per access type and the periodic update timer. The AMF 1121 can also store a 5GC Mobility Management (MM) context that can be the same or similar to an (Enhanced Packet System (EPS))MM ((E)MM) context. In various aspects, the AMF 1121 can store a Coverage Enhancement (CE) mode B Restriction parameter of the UE 1101 in an associated MM context or RM context. The AMF 1121 can also derive the value, when needed, from the UE's usage setting parameter already stored in the UE context (and/or MM/RM context).

Connection Management (CM) can be used to establish and release a signaling connection between the UE 1101 and the AMF 1121 over the N1 interface. The signaling connection is used to enable NAS signaling exchange between the UE 1101 and the CN 1120, and comprises both the signaling connection between the UE and the AN (e.g., RRC connection or UE-N3IWF connection for non-3GPP access) and the N2 connection for the UE 1101 between the AN (e.g., RAN 1110) and the AMF 1121. The UE 1101 can operate in one of two CM states, CM-IDLE mode or CM-CONNECTED mode. When the UE 1101 is operating in the CM-IDLE state/mode, the UE 1101 may have no NAS signaling connection established with the AMF 1121 over the N1 interface, and there can be (R)AN 1110 signaling connection (e.g., N2 and/or N3 connections) for the UE 1101. When the UE 1101 is operating in the CM-CONNECTED state/mode, the UE 1101 can have an established NAS signaling connection with the AMF 1121 over the N1 interface, and there can be a (R)AN 1110 signaling connection (e.g., N2 and/or N3 connections) for the UE 1101. Establishment of an N2 connection between the (R)AN 1110 and the AMF 1121 can cause the UE 1101 to transition from CM-IDLE mode to CM-CONNECTED mode, and the UE 1101 can transition from the CM-CONNECTED mode to the CM-IDLE mode when N2 signaling between the (R)AN 1110 and the AMF 1121 is released.

The SMF 1124 can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 1101 and a data network (DN) 1103 identified by a Data Network Name (DNN). PDU sessions can be established upon UE 1101 request, modified upon UE 1101 and 5GC 1120 request, and released upon UE 1101 and 5GC 1120 request using NAS SM signaling exchanged over the N1 reference point between the UE 1101 and the SMF 1124. Upon request from an application server, the 5GC 1120 can trigger a specific application in the UE 1101. In response to receipt of the trigger message, the UE 1101 can pass the trigger message (or relevant parts/information of the trigger message) to one or more identified applications in the UE 1101. The identified application(s) in the UE 1101 can establish a PDU session to a specific DNN. The SMF 1124 can check whether the UE 1101 requests are compliant with user subscription information associated with the UE 1101. In this regard, the SMF 1124 can retrieve and/or request to receive update notifications on SMF 1124 level subscription data from the UDM 1127.

The SMF 1124 can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 1124 can be included in the system 1100, which can be between another SMF 1124 in a visited network and the SMF 1124 in the home network in roaming scenarios. Additionally, the SMF 1124 can exhibit the Nsmf service-based interface.

The NEF 1123 can provide means for securely exposing the services and capabilities provided by 3GPP network functions for third party, internal exposure/re-exposure, Application Functions (e.g., AF 1128), edge computing or fog computing systems, etc. In such aspects, the NEF 1123 can authenticate, authorize, and/or throttle the AFs. NEF 1123 can also translate information exchanged with the AF 1128 and information exchanged with internal network functions. For example, the NEF 1123 can translate between an AF-Service-Identifier and an internal 5GC information. NEF 1123 can also receive information from other network functions (NFs) based on exposed capabilities of other network functions. This information can be stored at the NEF 1123 as structured data, or at a data storage NF using standardized interfaces. The stored information can then be re-exposed by the NEF 1123 to other NFs and AFs, and/or used for other purposes such as analytics. Additionally, the NEF 1123 can exhibit an Nnef service-based interface.

The NRF 1125 can support service discovery functions, receive NF discovery requests from NF instances, and provide the information of the discovered NF instances to the NF instances. NRF 1125 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 1125 can exhibit the Nnrf service-based interface.

The PCF 1126 can provide policy rules to control plane function(s) to enforce them, and can also support unified policy framework to govern network behavior. The PCF 1126 can also implement an FE to access subscription information relevant for policy decisions in a UDR of the UDM 1127. The PCF 1126 can communicate with the AMF 1121 via an N15 reference point between the PCF 1126 and the AMF 1121, which can include a PCF 1126 in a visited network and the AMF 1121 in case of roaming scenarios. The PCF 1126 can communicate with the AF 1128 via an N5 reference point between the PCF 1126 and the AF 1128; and with the SMF 1124 via an N7 reference point between the PCF 1126 and the SMF 1124. The system 1100 and/or CN 1120 can also include an N24 reference point between the PCF 1126 (in the home network) and a PCF 1126 in a visited network. Additionally, the PCF 1126 can exhibit an Npcf service-based interface.

The UDM 1127 can handle subscription-related information to support the network entities' handling of communication sessions, and can store subscription data of UE 1101.

For example, subscription data can be communicated between the UDM 1127 and the AMF 1121 via an N8 reference point between the UDM 1127 and the AMF. The UDM 1127 can include two parts, an application Functional Entity (FE) and a Unified Data Repository (UDR) (the FE and UDR are not shown in FIG. 7). The UDR can store subscription data and policy data for the UDM 1127 and the PCF 1126, and/or structured data for exposure and application data (including Packet Flow Descriptions (PFDs) for application detection, application request information for multiple UEs 1101) for the NEF 1123. The Nudr service-based interface can be exhibited by the UDR 221 to allow the UDM 1127, PCF 1126, and NEF 1123 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different FEs can serve the same user in different transactions. The UDM-FE accesses subscription information stored in the UDR and performs authentication credential processing, user identification handling, access authorization, registration/mobility management, and subscription management. The UDR can interact with the SMF 1124 via an N10 reference point between the UDM 1127 and the SMF 1124. UDM 1127 can also support SMS management, wherein an SMS-FE implements similar application logic as discussed elsewhere herein. Additionally, the UDM 1127 can exhibit the Nudm service-based interface.

The AF 1128 can provide application influence on traffic routing, provide access to NEF 1123, and interact with the policy framework for policy control. 5GC 1120 and AF 1128 can provide information to each other via NEF 1123, which can be used for edge computing implementations. In such implementations, the network operator and third party services can be hosted close to the UE 1101 access point of attachment to achieve an efficient service delivery through the reduced end-to-end latency and load on the transport network. For edge computing implementations, the 5GC can select a UPF 1102 close to the UE 1101 and execute traffic steering from the UPF 1102 to DN 1103 via the N6 interface. This can be based on the UE subscription data, UE location, and information provided by the AF 1128. In this way, the AF 1128 can influence UPF (re)selection and traffic routing. Based on operator deployment, when AF 1128 is considered to be a trusted entity, the network operator can permit AF 1128 to interact directly with relevant NFs. Additionally, the AF 1128 can exhibit an Naf service-based interface.

The NSSF 1129 can select a set of network slice instances serving the UE 1101. The NSSF 1129 can also determine allowed Network Slice Selection Assistance Information (NSSAI) and the mapping to the subscribed Single NSSAIs (S-NSSAIs), as appropriate. The NSSF 1129 can also determine the AMF set to be used to serve the UE 1101, or a list of candidate AMF(s) 1121 based on a suitable configuration and possibly by querying the NRF 1125. The selection of a set of network slice instances for the UE 1101 can be triggered by the AMF 1121 with which the UE 1101 is registered by interacting with the NSSF 1129, which can lead to a change of AMF 1121. The NSSF 1129 can interact with the AMF 1121 via an N22 reference point between AMF 1121 and NSSF 1129; and can communicate with another NSSF 1129 in a visited network via an N31 reference point (not shown in FIG. 11). Additionally, the NSSF 1129 can exhibit an Nnssf service-based interface.

As discussed previously, the CN 1120 can include an SMSF, which can be responsible for SMS subscription checking and verification, and relaying SM messages to/from the UE 1101 to/from other entities, such as an SMS-Gateway Mobile services Switching Center (GMSC)/Inter-Working MSC (IWMSC)/SMS-router. The SMSF can also interact with AMF 1121 and UDM 1127 for a notification procedure that the UE 1101 is available for SMS transfer (e.g., set a UE not reachable flag, and notifying UDM 1127 when UE 1101 is available for SMS).

The CN 1120 can also include other elements that are not shown in FIG. 11, such as a Data Storage system/architecture, a 5G-EIR, a Security Edge Protection Proxy (SEPP), and the like. The Data Storage system can include a Structured Data Storage Function (SDSF), an Unstructured Data Storage Function (UDSF), and/or the like. Any NF can store and retrieve unstructured data into/from the UDSF (e.g., UE contexts), via N18 reference point between any NF and the UDSF (not shown in FIG. 11). Individual NFs can share a UDSF for storing their respective unstructured data or individual NFs can each have their own UDSF located at or near the individual NFs. Additionally, the UDSF can exhibit an Nudsf service-based interface (not shown in FIG. 11). The 5G-EIR can be an NF that checks the status of Permanent Equipment Identifier (PEI) for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 11 for clarity. In one example, the CN 1120 can include an Nx interface, which is an inter-CN interface between the MME (e.g., a non-5G MME) and the AMF 1121 in order to enable interworking between CN 1120 and a non-5G CN. Other example interfaces/reference points can include an N5g-EIR service-based interface exhibited by a 5G-EIR, an N27 reference point between the Network Repository Function (NRF) in the visited network and the NRF in the home network; and an N31 reference point between the NSSF in the visited network and the NSSF in the home network.

Figure 12:
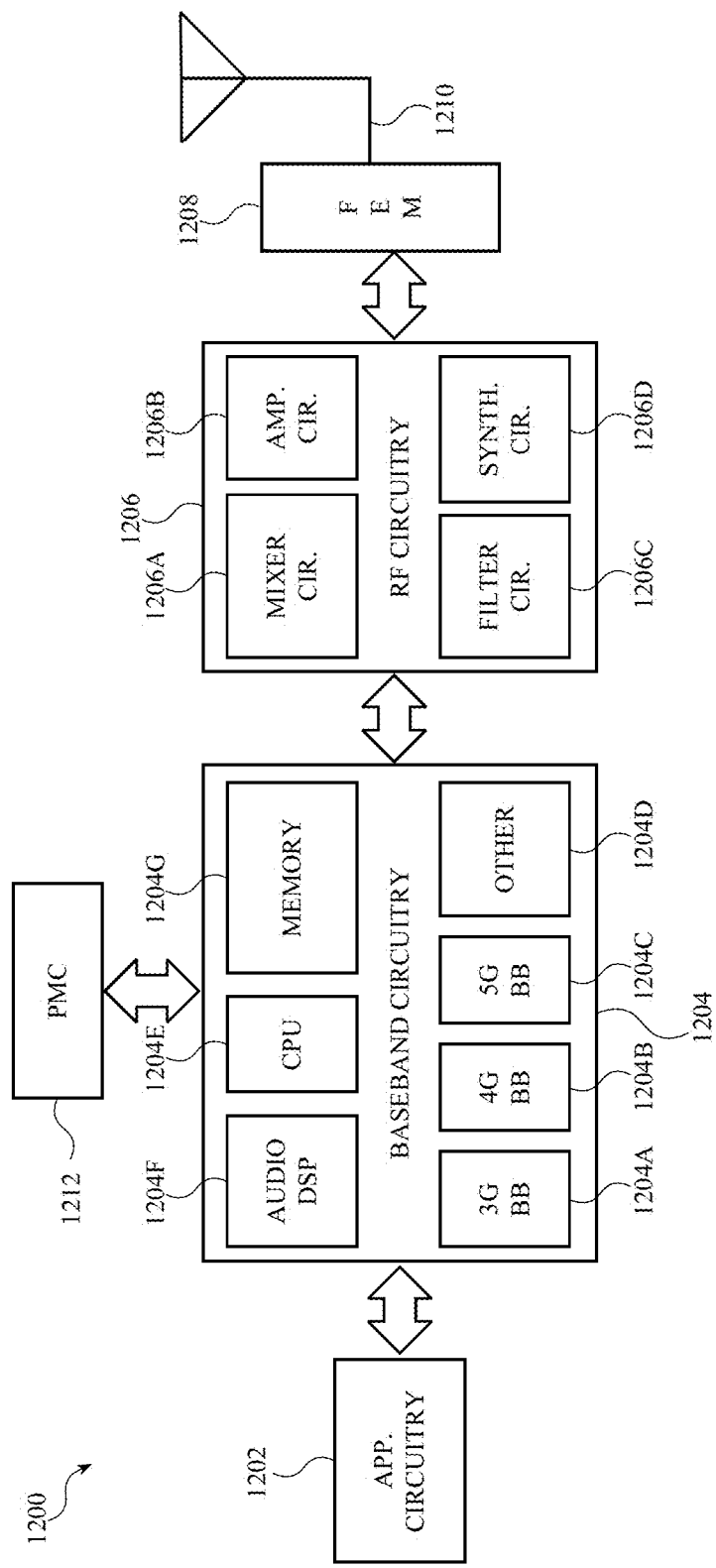
FIG. 12 illustrates example components of a device in accordance with some aspects.

FIG. 12 illustrates example components of a device 1200 in accordance with some aspects. In some aspects, the device 1200 can include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 can be included in a UE or a RAN node. In some aspects, the device 1200 can include fewer elements (e.g., a RAN node may not utilize application circuitry 1202, and instead include a processor/controller to process IP data received from a CN such as 5GC 720 or an Evolved Packet Core (EPC)). In some aspects, the device 1200 can include additional elements such as, for example, memory/storage, display, camera, sensor, or input/output (I/O) interface. In other aspects, the components described below can be included in more than one device (e.g., said circuitries can be separately included in more than one device for Cloud-RAN (C-RAN) implementations).

The application circuitry 1202 can include one or more application processors. For example, the application circuitry 1202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1200. In some aspects, processors of application circuitry 1202 can process IP data packets received from an EPC.

The baseband circuitry 1204 can include circuitry such as, but not limited to, one or more single-core or multi-core processors. The baseband circuitry 1204 can include one or more baseband processors or control logic to process baseband signals received from a receive signal path of the RF circuitry 1206 and to generate baseband signals for a transmit signal path of the RF circuitry 1206. Baseband processing circuitry 1204 can interface with the application circuitry 1202 for generation and processing of the baseband signals and for controlling operations of the RF circuitry 1206. For example, in some aspects, the baseband circuitry 1204 can include a third generation (3G) baseband processor 1204A, a fourth generation (4G) baseband processor 1204B, a fifth generation (5G) baseband processor 1204C, or other baseband processor(s) 1204D for other existing generations, generations in development or to be developed in the future (e.g., second generation (2G), sixth generation (6G), etc.). The baseband circuitry 1204 (e.g., one or more of the baseband processors 1204A-D) can handle various radio control functions that enable communication with one or more radio networks via the RF circuitry 1206. In other aspects, some or all of the functionality of baseband processors 1204A-D can be included in modules stored in the memory 1204G and executed via a Central Processing Unit (CPU) 1204E. The radio control functions can include, but are not limited to, signal modulation/demodulation, encoding/decoding, radio frequency shifting, etc. In some aspects, modulation/demodulation circuitry of the baseband circuitry 1204 can include Fast-Fourier Transform (FFT), precoding, or constellation mapping/demapping functionality. In some aspects, encoding/decoding circuitry of the baseband circuitry 1204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1204 can include one or more audio digital signal processor(s) (DSP) 1204F. The audio DSP(s) 1204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1204 and the application circuitry 1202 can be implemented together such as, for example, on a system on a chip (SOC).

In some aspects, the baseband circuitry 1204 can provide for communication compatible with one or more radio technologies. For example, in some aspects, the baseband circuitry 1204 can support communication with a NG-RAN, an evolved universal terrestrial radio access network (EU-TRAN) or other wireless metropolitan area networks (WMAN), a wireless local area network (WLAN), a wireless personal area network (WPAN), etc. Aspects in which the baseband circuitry 1204 is configured to support radio communications of more than one wireless protocol can be referred to as multi-mode baseband circuitry.

RF circuitry 1206 can enable communication with wireless networks using modulated electromagnetic radiation through a non-solid medium. In various aspects, the RF circuitry 1206 can include switches, filters, amplifiers, etc. to facilitate the communication with the wireless network. RF circuitry 1206 can include a receive signal path which can include circuitry to down-convert RF signals received from the FEM circuitry 1208 and provide baseband signals to the baseband circuitry 1204. RF circuitry 1206 can also include a transmit signal path which can include circuitry to up-convert baseband signals provided by the baseband circuitry 1204 and provide RF output signals to the FEM circuitry 1208 for transmission.

In some aspects, the receive signal path of the RF circuitry 1206 can include mixer circuitry 1206a, amplifier circuitry 1206b and filter circuitry 1206c. In some aspects, the transmit signal path of the RF circuitry 1206 can include filter circuitry 1206c and mixer circuitry 1206a. RF circuitry 1206 can also include synthesizer circuitry 1206d for synthesizing a frequency for use by the mixer circuitry 1206a of the receive signal path and the transmit signal path. In some aspects, the mixer circuitry 1206a of the receive signal path can be configured to down-convert RF signals received from the FEM circuitry 1208 based on the synthesized frequency provided by synthesizer circuitry 1206d. The amplifier circuitry 1206b can be configured to amplify the down-converted signals and the filter circuitry 1206c can be a low-pass filter (LPF) or band-pass filter (BPF) configured to remove unwanted signals from the down-converted signals to generate output baseband signals. Output baseband signals can be provided to the baseband circuitry 1204 for further processing. In some aspects, the output baseband signals can be zero-frequency baseband signals, although this is not a requirement. In some aspects, mixer circuitry 1206a of the receive signal path can comprise passive mixers, although the scope of the aspects is not limited in this respect.

In some aspects, the mixer circuitry 1206a of the transmit signal path can be configured to up-convert input baseband signals based on the synthesized frequency provided by the synthesizer circuitry 1206d to generate RF output signals for the FEM circuitry 1208. The baseband signals can be provided by the baseband circuitry 1204 and can be filtered by filter circuitry 1206c.

In some aspects, the mixer circuitry 1206a of the receive signal path and the mixer circuitry 1206a of the transmit signal path can include two or more mixers and can be arranged for quadrature downconversion and upconversion, respectively. In some aspects, the mixer circuitry 1206a of the receive signal path and the mixer circuitry 1206a of the transmit signal path can include two or more mixers and can be arranged for image rejection (e.g., Hartley image rejection). In some aspects, the mixer circuitry 1206a of the receive signal path and the mixer circuitry 1206a can be arranged for direct downconversion and direct upconversion, respectively. In some aspects, the mixer circuitry 1206a of the receive signal path and the mixer circuitry 1206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1206 can include analog-to-digital converter (ADC) and digital-to-analog converter (DAC) circuitry and the baseband circuitry 1204 can include a digital baseband interface to communicate with the RF circuitry 1206.

In some dual-mode aspects, a separate radio IC circuitry can be provided for processing signals for each spectrum, although the scope of the aspects is not limited in this respect.

In some aspects, the synthesizer circuitry 1206d can be a fractional-N synthesizer or a fractional N/N+1 synthesizer, although the scope of the aspects is not limited in this respect as other types of frequency synthesizers can be suitable. For example, synthesizer circuitry 1206d can be a delta-sigma synthesizer, a frequency multiplier, or a synthesizer comprising a phase-locked loop with a frequency divider.

The synthesizer circuitry 1206d can be configured to synthesize an output frequency for use by the mixer circuitry 1206a of the RF circuitry 1206 based on a frequency input and a divider control input. In some aspects, the synthesizer circuitry 1206d can be a fractional N/N+1 synthesizer.

In some aspects, frequency input can be provided by a voltage controlled oscillator (VCO), although that is not a requirement. Divider control input can be provided by either the baseband circuitry 1204 or the applications processor 1202 depending on the desired output frequency. In some aspects, a divider control input (e.g., N) can be determined from a look-up table based on a channel indicated by the applications processor 1202.

Synthesizer circuitry 1206d of the RF circuitry 1206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 1206d can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 1206 can include an IQ/polar converter.

FEM circuitry 1208 can include a receive signal path which can include circuitry configured to operate on RF signals received from one or more antennas 1210, amplify the received signals and provide the amplified versions of the received signals to the RF circuitry 1206 for further processing. FEM circuitry 1208 can also include a transmit signal path which can include circuitry configured to amplify signals for transmission provided by the RF circuitry 1206 for transmission by one or more of the one or more antennas 1210. In various aspects, the amplification through the transmit or receive signal paths can be done solely in the RF circuitry 1206, solely in the FEM 1208, or in both the RF circuitry 1206 and the FEM 1208.

In some aspects, the FEM circuitry 1208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1206). The transmit signal path of the FEM circuitry 1208 can include a power amplifier (PA) to amplify input RF signals (e.g., provided by RF circuitry 1206), and one or more filters to generate RF signals for subsequent transmission (e.g., by one or more of the one or more antennas 1210).

In some aspects, the PMC 1212 can manage power provided to the baseband circuitry 1204. In particular, the PMC 1212 can control power-source selection, voltage scaling, battery charging, or DC-to-DC conversion. The PMC 1212 can often be included when the device 1200 is capable of being powered by a battery, for example, when the device is included in a UE. The PMC 1212 can increase the power conversion efficiency while providing desirable implementation size and heat dissipation characteristics.

While FIG. 12 shows the PMC 1212 coupled only with the baseband circuitry 1204. However, in other aspects, the PMC 1212 may be additionally or alternatively coupled with, and perform similar power management operations for, other components such as, but not limited to, application circuitry 1202, RF circuitry 1206, or FEM 1208.

In some aspects, the PMC 1212 can control, or otherwise be part of, various power saving mechanisms of the device 1200. For example, if the device 1200 is in an RRC_Connected state, where it is still connected to the RAN node as it expects to receive traffic shortly, then it can enter a state known as Discontinuous Reception Mode (DRX) after a period of inactivity. During this state, the device 1200 can power down for brief intervals of time and thus save power.

If there is no data traffic activity for an extended period of time, then the device 1200 can transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1202 and processors of the baseband circuitry 1204 can be used to execute elements of one or more instances of a protocol stack. For example, processors of the baseband circuitry 1204, alone or in combination, can be used execute Layer 3, Layer 2, or Layer 1 functionality, while processors of the application circuitry 1204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 13:
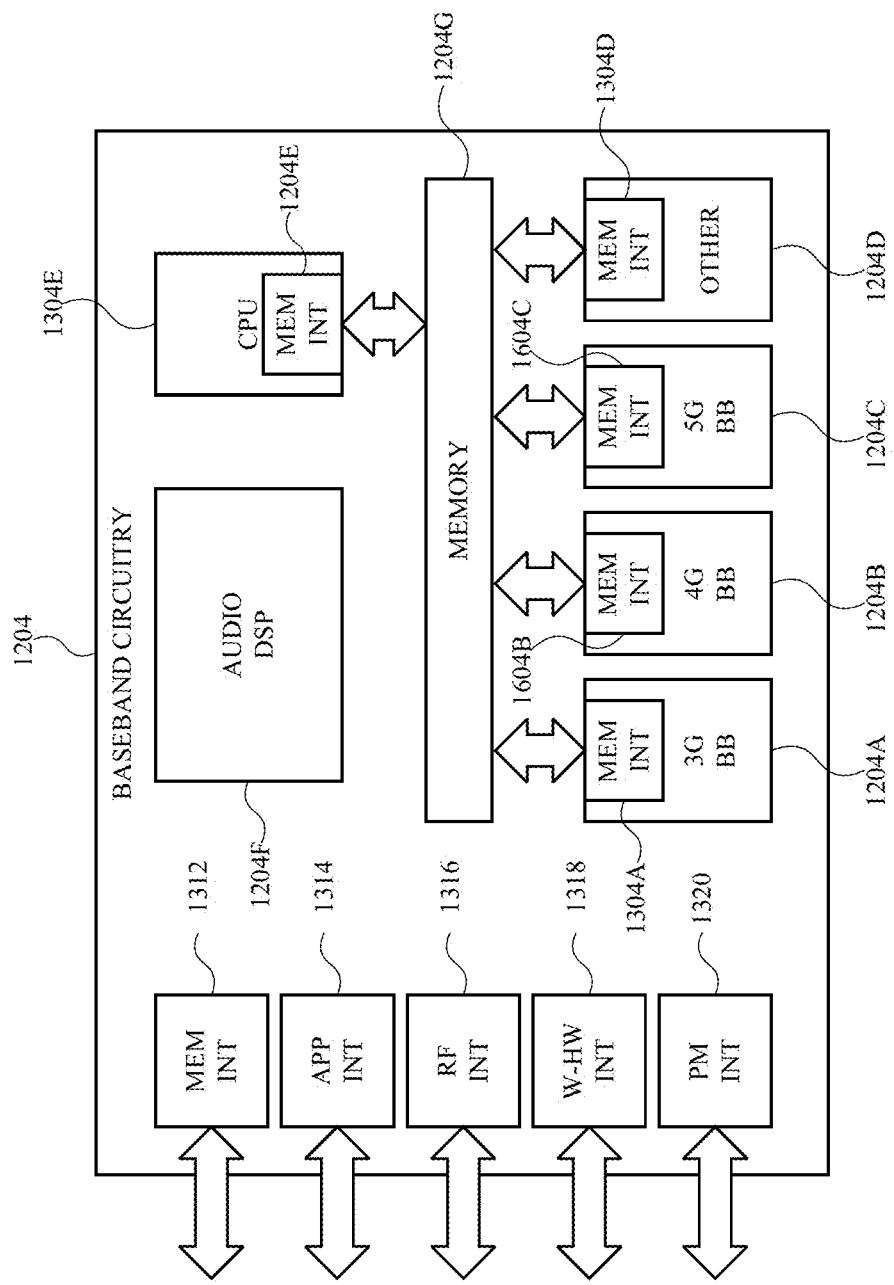
FIG. 13 illustrates example interfaces of baseband circuitry in accordance with some aspects.

FIG. 13 illustrates example interfaces of baseband circuitry in accordance with some aspects. As discussed above, the baseband circuitry 1204 of FIG. 2 can comprise processors 1204A-1204E and a memory 1204G utilized by said processors. Each of the processors 1204A-1204E can include a memory interface, 1304A-1304E, respectively, to send/receive data to/from the memory 1204G.

The baseband circuitry 1204 can further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 802 of FIG. 2), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212).

In various aspects, aspects discussed herein can facilitate techniques of inter-cell BM (Beam Management) via L1 (Layer 1) via one or more variations of a first set of techniques and/or a second set of techniques. The first set of techniques discussed herein can facilitate L1 inter-cell BM via SSB (Synchronization Signal Block). The second set of techniques discussed herein can facilitate L1 inter-cell BM via Synchronization CSI (Channel State Information)-RS (Reference Signal).

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a user equipment (UE) associated with a wireless communication network, the UE comprising one or more processors configured to form a sidelink group with one or more other UEs associated with the wireless communication network; receive a sidelink (SL) groupcast message from a select UE of the one or more other UEs of the sidelink group, the SL groupcast message comprising a SL channel state information (CSI) request and a transmission of a SL channel state information reference signal (CSI-RS); process the SL groupcast message; and selectively provide an SL CSI report derived based on a measured SL CSI, to the select UE, in response to processing the SL groupcast message.

Example 2 is a UE, including the subject matter of example 1, wherein the one or more processors are further configured to determine one or more SL CSI reporting associations configured for the UE, each SL CSI reporting association of the one or more SL CSI reporting associations comprising a paired association between the UE and another UE comprising any one UE of the one or more other UEs within the sidelink group, wherein a first UE of the paired association comprises a designated transmit (Tx) UE that is configured to receive an associated SL CSI report and a second UE of the paired association comprises a designated receive (Rx) UE that is configured to provide the associated SL CSI report.

Example 3 is a UE, including the subject matter of examples 1-2, including or omitting elements, wherein the one or more processors are configured to provide the SL CSI report to the select UE, when the select UE from which the SL groupcast message is received corresponds to the designated Tx UE of the paired association in any of the one or more SL CSI reporting associations configured for the UE.

Example 4 is a UE, including the subject matter of examples 1-3, including or omitting elements, wherein the one or more processors are not configured to provide the SL CSI report to the select UE, when the select UE from which the SL groupcast message is received does not correspond to the designated Tx UE of the paired association in any of the one or more SL CSI reporting associations configured for the UE.

Example 5 is a UE, including the subject matter of examples 1-4, including or omitting elements, wherein the UE and the another UE of the paired association within each SL CSI reporting association of the one or more SL CSI reporting associations comprise a set of UEs that have a largest distance from each other within the sidelink group.

Example 6 is a UE, including the subject matter of examples 1-5, including or omitting elements, wherein, within the paired association of each of the one or more SL CSI reporting associations, the designated Rx UE comprises a specific UE within the sidelink group that is farthest from the designated Tx UE.

Example 7 is a UE, including the subject matter of examples 1-6, including or omitting elements, wherein the one or more processors is configured to provide the SL CSI report to the select UE, when the measured SL CSI is lesser than a CSI threshold or when a distance between the UE and the select UE is greater than a distance threshold, or both.

Example 8 is a UE, including the subject matter of examples 1-7, including or omitting elements, wherein the one or more processors is configured not to provide the SL CSI report to the select UE, when the SL CSI is greater than the CSI threshold or when the distance between the UE and the select UE is lesser than the distance threshold, or both.

Example 9 is a UE, including the subject matter of examples 1-8, including or omitting elements, wherein the one or more processors is configured to determine the distance between the UE and the select UE, based on a Zone ID of the select UE.

Example 10 is a UE, including the subject matter of examples 1-9, including or omitting elements, wherein the one or more processors is configured to receive the Zone ID of the select UE in a sidelink control information (SCI) received from the select UE.

Example 11 is a UE, including the subject matter of examples 1-10, including or omitting elements, wherein the Zone ID may be indicated as part of SCI format 2-A, SCI format 2-B or SCI format 2-C.

Example 12 is a UE, including the subject matter of examples 1-11, including or omitting elements, wherein the SL CSI request is included in the SL groupcast message by setting a CSI request field of a sidelink control information (SCI) stage 2 associated with the select UE, wherein the SCI stage 2 can comprise an SCI format 2-A, an SCI format 2-B or an SCI format 2-C.

Example 13 is a UE, including the subject matter of examples 1-12, including or omitting elements, wherein the one or more processors is configured to provide the SL CSI report via a 1-bit indication that comprises providing a first value to indicate to the select UE to increase a modulation and coding scheme (MCS) and providing a second value to indicate to the select UE to decrease the MCS.

Example 14 is a UE, including the subject matter of examples 1-13, including or omitting elements, wherein the one or more processors is configured to provide the SL CSI report via a half-bit indication that comprises providing a first value to indicate to the select UE to decrease a modulation and coding scheme (MCS) and providing no value to indicate to the select UE to increase the MCS.

Example 15 is a UE, including the subject matter of examples 1-14, including or omitting elements, wherein the one or more processors is configured to provide the SL CSI report via more than 1-bit indication that comprises providing multiple values to the select UE, wherein each value of the multiple values provides multiple levels of indication related to a modulation and coding scheme (MCS) to the select UE.

Example 16 is a UE, including the subject matter of examples 1-15, including or omitting elements, wherein the one or more processors is configured to provide the SL CSI report via physical layer signaling.

Example 17 is a UE, including the subject matter of examples 1-16, including or omitting elements, wherein the SL CSI report comprises a sequence based SL CSI feedback comprising a predefined sequence that indicates to the select UE whether to increase or decrease a modulation and coding scheme (MCS).

Example 18 is a UE, including the subject matter of examples 1-17, including or omitting elements, wherein a resource for the sequence based SL CSI feedback is frequency division multiplexed (FDM) or code division multiplexed (CDM), or both with physical sidelink feedback channel (PSFCH) resources.

Example 19 is a UE, including the subject matter of examples 1-18, including or omitting elements, wherein the resource for the sequence based SL CSI feedback is shared by the one or more other UEs for providing corresponding sequence based SL CSI feedbacks from the one or more other UEs.

Example 20 is a UE, including the subject matter of examples 1-19, including or omitting elements, wherein the UE and the one or more other UEs within the sidelink group utilizes separate resources for sending corresponding sequence based CSI feedbacks.

Example 21 is a UE, including the subject matter of examples 1-20, including or omitting elements, wherein the sequence based SL CSI feedback is provided using same resources as physical sidelink feedback channel (PSFCH).

Example 22 is a UE, including the subject matter of examples 1-21, including or omitting elements, wherein the sequence based SL CSI feedback is provided based on a 2-bit information comprising 1 bit for hybrid automatic repeat request (HARQ) Ack/Nack and 1 bit for SL channel quality indicator (CQI).

Example 23 is a UE, including the subject matter of examples 1-22, including or omitting elements, wherein the sequence based SL CSI feedback is provided based on a 3-bit information comprising 1 bit for hybrid automatic repeat request (HARQ) Ack/Nack and 2 bits for SL channel quality indicator (CQ).

Example 24 is a processor for a user equipment (UE) associated with a wireless communication network, the processor configured to perform operations comprising forming a sidelink group with one or more other UEs associated with the wireless communication network; receiving a sidelink (SL) groupcast message from a select UE of the one or more other UEs of the sidelink group, the SL groupcast message comprising a SL channel state information (CSI) request and a transmission of a SL channel state information reference signal (CSI-RS); processing the SL groupcast message; and selectively providing an SL CSI report derived based on a measured SL CSI, to the select UE, in response to processing the SL groupcast message.

Example 25 is a processor, including the subject matter of example 24, wherein the operations further comprise determining one or more SL CSI reporting associations configured for the UE, each SL CSI reporting association of the one or more SL CSI reporting associations comprising a paired association between the UE and another UE comprising any one UE of the one or more other UEs within the sidelink group, wherein a first UE of the paired association comprises a designated transmit (Tx) UE that is configured to receive an associated SL CSI report and a second UE of the paired association comprises a designated receive (Rx) UE that is configured to provide the associated SL CSI report.

Example 26 is a processor, including the subject matter of examples 24-25, including or omitting elements, wherein the operations comprise providing the SL CSI report to the select UE, when the select UE from which the SL groupcast message is received corresponds to the designated Tx UE of the paired association in any of the one or more SL CSI reporting associations configured for the UE.

Example 27 is a processor, including the subject matter of examples 24-26, including or omitting elements, wherein the operations comprise not providing the SL CSI report to the select UE, when the select UE from which the SL groupcast message is received does not correspond to the designated Tx UE of the paired association in any of the one or more SL CSI reporting associations configured for the UE.

Example 28 is a processor, including the subject matter of examples 24-27, including or omitting elements, wherein the UE and the another UE of the paired association within each SL CSI reporting association of the one or more SL CSI reporting associations comprise a set of UEs that have a largest distance from each other within the sidelink group.

Example 29 is a processor, including the subject matter of examples 24-28, including or omitting elements, wherein, within the paired association of each of the one or more SL CSI reporting associations, the designated Rx UE comprises a specific UE within the sidelink group that is farthest from the designated Tx UE.

Example 30 is a processor, including the subject matter of examples 24-29, including or omitting elements, wherein the operations comprise providing the SL CSI report to the select UE, when the measured SL CSI is lesser than a CSI threshold or when a distance between the UE and the select UE is greater than a distance threshold, or both.

Example 31 is a processor, including the subject matter of examples 24-30, including or omitting elements, wherein the operations comprise not providing the SL CSI report to the select UE, when the SL CSI is greater than the CSI threshold or when the distance between the UE and the select UE is lesser than the distance threshold, or both.

Example 32 is a processor, including the subject matter of examples 24-31, including or omitting elements, wherein the operations comprise determining the distance between the UE and the select UE, based on a Zone ID of the select UE.

Example 33 is a processor, including the subject matter of examples 24-32, including or omitting elements, wherein the operations comprise receiving the Zone ID of the select UE in a sidelink control information (SCI) received from the select UE.

Example 34 is a processor, including the subject matter of examples 24-33, including or omitting elements, wherein the Zone ID may be indicated as part of SCI format 2-A, SCI format 2-B or SCI format 2-C.

Example 35 is a processor, including the subject matter of examples 24-34, including or omitting elements, wherein the SL CSI request is included in the SL groupcast message by setting a CSI request field of a sidelink control information (SCI) stage 2 associated with the select UE, wherein the SCI stage 2 can comprise an SCI format 2-A, an SCI format 2-B or an SCI format 2-C.

Example 36 is a processor, including the subject matter of examples 24-35, including or omitting elements, wherein the operations comprise providing the SL CSI report via a 1-bit indication that comprises providing a first value to indicate to the select UE to increase a modulation and coding scheme (MCS) and providing a second value to indicate to the select UE to decrease the MCS.

Example 37 is a processor, including the subject matter of examples 24-36, including or omitting elements, wherein the operations comprise providing the SL CSI report via a half-bit indication that comprises providing a first value to indicate to the select UE to decrease a modulation and coding scheme (MCS) and providing no value to indicate to the select UE to increase the MCS.

Example 38 is a processor, including the subject matter of examples 24-37, including or omitting elements, wherein the operations comprise providing the SL CSI report via more than 1-bit indication that comprises providing multiple values to the select UE, wherein each value of the multiple values provides multiple levels of indication related to a modulation and coding scheme (MCS) to the select UE.

Example 39 is a processor, including the subject matter of examples 24-38, including or omitting elements, wherein the operations comprise providing the SL CSI report via physical layer signaling.

Example 40 is a processor, including the subject matter of examples 24-39, including or omitting elements, wherein the SL CSI report comprises a sequence based SL CSI feedback comprising a predefined sequence that indicates to the select UE whether to increase or decrease a modulation and coding scheme (MCS).

Example 41 is a processor, including the subject matter of examples 24-40, including or omitting elements, wherein a resource for the sequence based SL CSI feedback is frequency division multiplexed (FDM) or code division multiplexed (CDM), or both with physical sidelink feedback channel (PSFCH) resources.

Example 42 is a processor, including the subject matter of examples 24-41, including or omitting elements, wherein the resource for the sequence based SL CSI feedback is shared by the one or more other UEs for providing corresponding sequence based SL CSI feedbacks from the one or more other UEs.

Example 43 is a processor, including the subject matter of examples 24-42, including or omitting elements, wherein the UE and the one or more other UEs within the sidelink group utilizes separate resources for sending corresponding sequence based CSI feedbacks.

Example 44 is a processor, including the subject matter of examples 24-43, including or omitting elements, wherein the sequence based SL CSI feedback is provided using same resources as physical sidelink feedback channel (PSFCH).

Example 45 is a processor, including the subject matter of examples 24-44, including or omitting elements, wherein the sequence based SL CSI feedback is provided based on a 2-bit information comprising 1 bit for hybrid automatic repeat request (HARQ) Ack/Nack and 1 bit for SL channel quality indicator (CQ).

Example 46 is a processor, including the subject matter of examples 24-45, including or omitting elements, wherein the sequence based SL CSI feedback is provided based on a 3-bit information comprising 1 bit for hybrid automatic repeat request (HARQ) Ack/Nack and 2 bits for SL channel quality indicator (CQ).

Example 47 is a method for a user equipment (UE) associated with a wireless communication network, the method comprising form a sidelink group with one or more other UEs associated with the wireless communication network, using one or more processors; receive a sidelink (SL) groupcast message from a select UE of the one or more other UEs of the sidelink group, using the one or more processors, the SL groupcast message comprising a SL channel state information (CSI) request and a transmission of a SL channel state information reference signal (CSI-RS); processing the SL groupcast message using the one or more processors; and selectively providing an SL CSI report derived based on a measured SL CSI, to the select UE, using the one or more processors, in response to processing the SL groupcast message.

Example 48 is a method, including the subject matter of example 47, further comprising determining, using the one or more processors, one or more SL CSI reporting associations configured for the UE, each SL CSI reporting association of the one or more SL CSI reporting associations comprising a paired association between the UE and another UE comprising any one UE of the one or more other UEs within the sidelink group, wherein a first UE of the paired association comprises a designated transmit (Tx) UE that is configured to receive an associated SL CSI report and a second UE of the paired association comprises a designated receive (Rx) UE that is configured to provide the associated SL CSI report.

Example 49 is a method, including the subject matter of examples 47-48, including or omitting elements, further comprising providing the SL CSI report to the select UE, using the one or more processors, when the select UE from which the SL groupcast message is received corresponds to the designated Tx UE of the paired association in any of the one or more SL CSI reporting associations configured for the UE.

Example 50 is a method, including the subject matter of examples 47-49, including or omitting elements, further comprising not providing the SL CSI report to the select UE, using the one or more processors, when the select UE from which the SL groupcast message is received does not correspond to the designated Tx UE of the paired association in any of the one or more SL CSI reporting associations configured for the UE.

Example 51 is a method, including the subject matter of examples 47-50, including or omitting elements, wherein the UE and the another UE of the paired association within each SL CSI reporting association of the one or more SL CSI reporting associations comprise a set of UEs that have a largest distance from each other within the sidelink group.

Example 52 is a method, including the subject matter of examples 47-51, including or omitting elements, wherein, within the paired association of each of the one or more SL CSI reporting associations, the designated Rx UE comprises a specific UE within the sidelink group that is farthest from the designated Tx UE.

Example 53 is a method, including the subject matter of examples 47-52, including or omitting elements, further comprising providing the SL CSI report to the select UE, using the one or more processors, when the measured SL CSI is lesser than a CSI threshold or when a distance between the UE and the select UE is greater than a distance threshold, or both.

Example 54 is a method, including the subject matter of examples 47-53, including or omitting elements, further comprising not providing the SL CSI report to the select UE, using the one or more processors, when the SL CSI is greater than the CSI threshold or when the distance between the UE and the select UE is lesser than the distance threshold, or both.

Example 55 is a method, including the subject matter of examples 47-54, including or omitting elements, further comprising determining the distance between the UE and the select UE, using the one or more processors, based on a Zone ID of the select UE.

Example 56 is a method, including the subject matter of examples 47-55, including or omitting elements, further comprising receiving the Zone ID of the select UE, using the one or more processors, in a sidelink control information (SCI) received from the select UE.

Example 57 is a method, including the subject matter of examples 47-56, including or omitting elements, wherein the Zone ID may be indicated as part of SCI format 2-A, SCI format 2-B or SCI format 2-C.

Example 58 is a method, including the subject matter of examples 47-57, including or omitting elements, wherein the SL CSI request is included in the SL groupcast message by setting a CSI request field of a sidelink control information (SCI) stage 2 associated with the select UE, wherein the SCI stage 2 can comprise an SCI format 2-A, an SCI format 2-B or an SCI format 2-C.

Example 59 is a method, including the subject matter of examples 47-58, including or omitting elements, further comprising providing the SL CSI report, using the one or more processors, via a 1-bit indication that comprises providing a first value to indicate to the select UE to increase a modulation and coding scheme (MCS) and providing a second value to indicate to the select UE to decrease the MCS.

Example 60 is a method, including the subject matter of examples 47-59, including or omitting elements, further comprising providing the SL CSI report, using the one or more processors, via a half-bit indication that comprises providing a first value to indicate to the select UE to decrease a modulation and coding scheme (MCS) and providing no value to indicate to the select UE to increase the MCS.

Example 61 is a method, including the subject matter of examples 47-60, including or omitting elements, further comprising providing the SL CSI report, using the one or more processors, via more than 1-bit indication that comprises providing multiple values to the select UE, wherein each value of the multiple values provides multiple levels of indication related to a modulation and coding scheme (MCS) to the select UE.

Example 62 is a method, including the subject matter of examples 47-61, including or omitting elements, further comprising providing the SL CSI report, using the one or more processors, via physical layer signaling.

Example 63 is a method, including the subject matter of examples 47-62, including or omitting elements, wherein the SL CSI report comprises a sequence based SL CSI feedback comprising a predefined sequence that indicates to the select UE whether to increase or decrease a modulation and coding scheme (MCS).

Example 64 is a method, including the subject matter of examples 47-63, including or omitting elements, wherein a resource for the sequence based SL CSI feedback is frequency division multiplexed (FDM) or code division multiplexed (CDM), or both with physical sidelink feedback channel (PSFCH) resources.

Example 65 is a method, including the subject matter of examples 47-64, including or omitting elements, wherein the resource for the sequence based SL CSI feedback is shared by the one or more other UEs for providing corresponding sequence based SL CSI feedbacks from the one or more other UEs.

Example 66 is a method, including the subject matter of examples 47-65, including or omitting elements, wherein the UE and the one or more other UEs within the sidelink group utilizes separate resources for sending corresponding sequence based CSI feedbacks.

Example 67 is a method, including the subject matter of examples 47-66, including or omitting elements, wherein the sequence based SL CSI feedback is provided using same resources as physical sidelink feedback channel (PSFCH).

Example 68 is a method, including the subject matter of examples 47-67, including or omitting elements, wherein the sequence based SL CSI feedback is provided based on a 2-bit information comprising 1 bit for hybrid automatic repeat request (HARQ) Ack/Nack and 1 bit for SL channel quality indicator (CQ).

Example 69 is a method, including the subject matter of examples 47-48, including or omitting elements, wherein the sequence based SL CSI feedback is provided based on a 3-bit information comprising 1 bit for hybrid automatic repeat request (HARQ) Ack/Nack and 2 bits for SL channel quality indicator (CQ).

Example 70 is a user equipment (UE) associated with a wireless communication network, the UE comprising one or more processors configured to form a sidelink group with one or more other UEs associated with the wireless communication network; send a sidelink (SL) groupcast message to the one or more other UEs of the sidelink group that forms a set of Rx UEs, the SL groupcast message comprising a SL channel state information (CSI) request and a transmission of a SL channel state information reference signal (CSI-RS); and receive an SL CSI report from a select Rx UE of the set of Rx UEs, in response to sending the SL groupcast message.

Example 71 is a UE, including the subject matter of example 70, wherein the one or more processors are configured to receive the SL CSI report from the select Rx UE, when the select Rx UE is configured with an SL CSI reporting association that comprises a paired association between the UE and the select Rx UE, and when the UE corresponds to a designated transmit (Tx) UE that is configured to receive an associated SL CSI report and the select Rx UE corresponds to a designated Rx UE that is configured to provide the associated SL CSI report, within the paired association comprised in the SL CSI reporting association configured for the select Rx UE.

Example 72 is a UE, including the subject matter of examples 70-71, including or omitting elements, wherein the one or more processors are configured to receive the SL CSI report from the select Rx UE, when an SL CSI measured at the select Rx UE is lesser than a CSI threshold or when a distance between the UE and the select Rx UE is greater than a distance threshold, or both.

Example 73 is a UE, including the subject matter of examples 70-72, including or omitting elements, wherein the one or more processors are configured to include the SL CSI request in the SL groupcast message by setting a CSI request field of a sidelink control information (SCI) stage 2 associated with the UE, wherein the SCI stage 2 can comprise an SCI format 2-A, an SCI format 2-B or an SCI format 2-C.

Example 74 is a UE, including the subject matter of examples 70-73, including or omitting elements, wherein the SL CSI report comprises one or more SL CSI reports received respectively from one or more select Rx UEs of the set of Rx UEs, when the set of Rx UEs comprises a plurality of Rx UEs.

Example 75 is a processor for a user equipment (UE) associated with a wireless communication network, the processor configured to perform operations comprising forming a sidelink group with one or more other UEs associated with the wireless communication network; sending a sidelink (SL) groupcast message to the one or more other UEs of the sidelink group that forms a set of Rx UEs, the SL groupcast message comprising a SL channel state information (CSI) request and a transmission of a SL channel state information reference signal (CSI-RS); and receiving an SL CSI report from a select Rx UE of the set of Rx UEs, in response to sending the SL groupcast message.

Example 76 is a processor, including the subject matter of example 75, wherein the operations comprise receiving the SL CSI report from the select Rx UE, when the select Rx UE is configured with an SL CSI reporting association that comprises a paired association between the UE and the select Rx UE, and when the UE corresponds to a designated transmit (Tx) UE that is configured to receive an associated SL CSI report and the select Rx UE corresponds to a designated Rx UE that is configured to provide the associated SL CSI report, within the paired association comprised in the SL CSI reporting association configured for the select Rx UE.

Example 77 is a processor, including the subject matter of examples 74-76, including or omitting elements, wherein the operations comprise receiving the SL CSI report from the select Rx UE, when an SL CSI measured at the select Rx UE is lesser than a CSI threshold or when a distance between the UE and the select Rx UE is greater than a distance threshold, or both.

Example 78 is a processor, including the subject matter of examples 74-77, including or omitting elements, wherein the operations comprise including the SL CSI request in the SL groupcast message by setting a CSI request field of a sidelink control information (SCI) stage 2 associated with the UE, wherein the SCI stage 2 can comprise an SCI format 2-A, an SCI format 2-B or an SCI format 2-C.

Example 79 is a processor, including the subject matter of examples 74-78, including or omitting elements, wherein the SL CSI report comprises one or more SL CSI reports received respectively from one or more select Rx UEs of the set of Rx UEs, when the set of Rx UEs comprises a plurality of Rx UEs.

Example 80 is a method for a user equipment (UE) associated with a wireless communication network, the method comprising form a sidelink group with one or more other UEs associated with the wireless communication network, using one or more processors; sending a sidelink (SL) groupcast message to the one or more other UEs of the sidelink group that forms a set of Rx UEs, using the one or more processors, the SL groupcast message comprising a SL channel state information (CSI) request and a transmission of a SL channel state information reference signal (CSI-RS); and receiving an SL CSI report from a select Rx UE of the set of Rx UEs, using the one or more processors, in response to sending the SL groupcast message.

Example 81 is a method, including the subject matter of example 80, comprising receiving the SL CSI report from the select Rx UE, when the select Rx UE is configured with an SL CSI reporting association that comprises a paired association between the UE and the select Rx UE, and when the UE corresponds to a designated transmit (Tx) UE that is configured to receive an associated SL CSI report and the select Rx UE corresponds to a designated Rx UE that is configured to provide the associated SL CSI report, within the paired association comprised in the SL CSI reporting association configured for the select Rx UE.

Example 82 is a method, including the subject matter of examples 80-81, including or omitting elements, comprising receiving the SL CSI report from the select Rx UE, when an SL CSI measured at the select Rx UE is lesser than a CSI threshold or when a distance between the UE and the select Rx UE is greater than a distance threshold, or both.

Example 83 is a method, including the subject matter of examples 80-82, including or omitting elements, further comprising including, using the one or more processors, the SL CSI request in the SL groupcast message by setting a CSI request field of a sidelink control information (SCI) stage 2 associated with the UE, wherein the SCI stage 2 can comprise an SCI format 2-A, an SCI format 2-B or an SCI format 2-C.

Example 84 is a method, including the subject matter of examples 80-83, including or omitting elements, wherein the SL CSI report comprises one or more SL CSI reports received respectively from one or more select Rx UEs of the set of Rx UEs, when the set of Rx UEs comprises a plurality of Rx UEs.

Example 85 is a user equipment (UE) associated with a wireless communication network, the UE comprising one or more processors configured to receive an inter-UE coordination request signal from a select UE associated with the wireless communication network, wherein the inter-UE coordination request signal comprises an inter-UE coordination request that requests the UE to determine a set of preferred resources or a set of non-preferred resources for a sidelink (SL) transmission from the select UE, a SL channel state information (CSI) request and a transmission of a SL channel state information reference signal (CSI-RS); determine the set of preferred resources or the set of non-preferred resources, in response to processing the inter-UE coordination request; determine an SL CSI for the select UE, in response to processing the SL CSI request; and send an inter-UE coordination response signal comprising an SL CSI report derived based on the SL CSI and an inter-UE coordination response that comprises the set of preferred resources or the set of non-preferred resources to the select UE.

Example 86 is a UE, including the subject matter of example 85, wherein, when the inter-UE coordination response comprises the set of preferred resources, the one or more processors are configured to send the inter-UE coordination response and the SL CSI report to the select UE via a sidelink control information (SCI) stage 2 format.

Example 87 is a UE, including the subject matter of examples 85-86, including or omitting elements, wherein, when the inter-UE coordination response comprises the set of non-preferred resources, the one or more processors are configured to send the inter-UE coordination response to the select UE via physical sidelink shared channel (PSSCH) and send the SL CSI report to the select UE via a sidelink control information (SCI) stage 2 format.

Example 88 is a UE, including the subject matter of examples 85-87, including or omitting elements, wherein one or more processors are configured to send the inter-UE coordination response signal to the select UE via a medium access control (MAC) control element (CE).

Example 89 is a processor for a user equipment (UE) associated with a wireless communication network, the processor configured to perform operations comprising receiving an inter-UE coordination request signal from a select UE associated with the wireless communication network, wherein the inter-UE coordination request signal comprises an inter-UE coordination request that requests the UE to determine a set of preferred resources or a set of non-preferred resources for a sidelink (SL) transmission from the select UE, a SL channel state information (CSI) request and a transmission of a SL channel state information reference signal (CSI-RS); determining the set of preferred resources or the set of non-preferred resources, in response to processing the inter-UE coordination request; determining an SL CSI for the select UE, in response to processing the SL CSI request; and sending an inter-UE coordination response signal comprising an SL CSI report derived based on the SL CSI and an inter-UE coordination response that comprises the set of preferred resources or the set of non-preferred resources to the select UE.

Example 90 is a processor, including the subject matter of example 89, when the inter-UE coordination response comprises the set of preferred resources, the operations comprise sending the inter-UE coordination response and the SL CSI report to the select UE via a sidelink control information (SCI) stage 2 format.

Example 91 is a processor, including the subject matter of examples 89-90, including or omitting elements, wherein, when the inter-UE coordination response comprises the set of non-preferred resources, the operations comprise sending the inter-UE coordination response to the select UE via physical sidelink shared channel (PSSCH) and sending the SL CSI report to the select UE via a sidelink control information (SCI) stage 2 format.

Example 92 is a processor, including the subject matter of examples 89-91, including or omitting elements, wherein the operations comprise sending the inter-UE coordination response signal to the select UE via a medium access control (MAC) control element (CE).

Example 93 is a method for a user equipment (UE) associated with a wireless communication network, the method comprising receiving an inter-UE coordination request signal from a select UE associated with the wireless communication network, using one or more processors, wherein the inter-UE coordination request signal comprises an inter-UE coordination request that requests the UE to determine a set of preferred resources or a set of non-preferred resources for a sidelink (SL) transmission from the select UE, a SL channel state information (CSI) request and a transmission of a SL channel state information reference signal (CSI-RS); determining the set of preferred resources or the set of non-preferred resources, using the one or more processors, in response to processing the inter-UE coordination request; determining an SL CSI for the select UE, using the one or more processors, in response to processing the SL CSI request; and sending an inter-UE coordination response signal comprising an SL CSI report derived based on the SL CSI and an inter-UE coordination response that comprises the set of preferred resources or the set of non-preferred resources to the select UE, using the one or more processors.

Example 94 is a method, including the subject matter of example 93, wherein, when the inter-UE coordination response comprises the set of preferred resources, the method comprises sending the inter-UE coordination response and the SL CSI report to the select UE via a sidelink control information (SCI) stage 2 format.

Example 95 is a method, including the subject matter of examples 93-94, including or omitting elements, wherein, when the inter-UE coordination response comprises the set of non-preferred resources, the method comprises sending the inter-UE coordination response to the select UE via physical sidelink shared channel (PSSCH) and sending the SL CSI report to the select UE via a sidelink control information (SCI) stage 2 format.

Example 96 is a method, including the subject matter of examples 93-95, including or omitting elements, comprising sending the inter-UE coordination response signal to the select UE via a medium access control (MAC) control element (CE).

Example 97 is a user equipment (UE) associated with a wireless communication network, the UE comprising one or more processors configured to send an inter-UE coordination request signal to a select UE associated with the wireless communication network, wherein the inter-UE coordination request signal comprises an inter-UE coordination request that requests the select UE to determine a set of preferred resources or a set of non-preferred resources for a sidelink (SL) transmission from the UE, a SL channel state information (CSI) request and a transmission of a SL channel state information reference signal (CSI-RS); and receive an inter-UE coordination response signal comprising an SL CSI report and an inter-UE coordination response comprising the set of preferred resources or the set of non-preferred resources from the select UE, in response to sending the inter-UE coordination request signal.

Example 98 is a UE, including the subject matter of example 97, wherein, when the inter-UE coordination response comprises the set of preferred resources, the one or more processors are configured to receive the inter-UE coordination response and the SL CSI report from the select UE via a sidelink control information (SCI) stage 2 format.

Example 99 is a UE, including the subject matter of examples 97-98, including or omitting elements, wherein, when the inter-UE coordination response comprises the set of non-preferred resources, the one or more processors are configured to receive the inter-UE coordination response via physical sidelink shared channel (PSSCH) and receiving the SL CSI report via a sidelink control information (SCI) stage 2 format.

Example 100 is a UE, including the subject matter of examples 97-99, including or omitting elements, wherein the one or more processors are configured to receive the inter-UE coordination response signal via a medium access control (MAC) control element (CE).

Example 101 is a method for a user equipment (UE) associated with a wireless communication network, the method comprising sending an inter-UE coordination request signal to a select UE associated with the wireless communication network, using one or more processors, wherein the inter-UE coordination request signal comprises an inter-UE coordination request that requests the select UE to determine a set of preferred resources or a set of non-preferred resources for a sidelink (SL) transmission from the UE, a SL channel state information (CSI) request and a transmission of a SL channel state information reference signal (CSI-RS); and receiving an inter-UE coordination response signal comprising an SL CSI report and an inter-UE coordination response comprising the set of preferred resources or the set of non-preferred resources from the select UE, using the one or more processors, in response to sending the inter-UE coordination request signal.

Example 102 is a method, including the subject matter of example 101, wherein, when the inter-UE coordination response comprises the set of preferred resources, the method comprises receiving the inter-UE coordination response and the SL CSI report from the select UE via a sidelink control information (SCI) stage 2 format.

Example 103 is a method, including the subject matter of examples 101-102, including or omitting elements, wherein, when the inter-UE coordination response comprises the set of non-preferred resources, the method comprises receiving the inter-UE coordination response via physical sidelink shared channel (PSSCH) and receiving the SL CSI report via a sidelink control information (SCI) stage 2 format.

Example 104 is a method, including the subject matter of examples 101-103, including or omitting elements, comprising receiving the inter-UE coordination response signal via a medium access control (MAC) control element (CE).

Example 105 is a processor for a user equipment (UE) associated with a wireless communication network, the processor configured to perform operations comprising sending an inter-UE coordination request signal to a select UE associated with the wireless communication network, wherein the inter-UE coordination request signal comprises an inter-UE coordination request that requests the select UE to determine a set of preferred resources or a set of non-preferred resources for a sidelink (SL) transmission from the UE, a SL channel state information (CSI) request and a transmission of a SL channel state information reference signal (CSI-RS); and receiving an inter-UE coordination response signal comprising an SL CSI report and an inter-UE coordination response comprising the set of preferred resources or the set of non-preferred resources from the select UE, in response to sending the inter-UE coordination request signal.

Example 106 is a processor, including the subject matter of example 105, wherein, when the inter-UE coordination response comprises the set of preferred resources, the operations comprise receiving the inter-UE coordination response and the SL CSI report from the select UE via a sidelink control information (SCI) stage 2 format.

Example 107 is a processor, including the subject matter of examples 105-106, including or omitting elements, wherein, when the inter-UE coordination response comprises the set of non-preferred resources, the operations comprise receiving the inter-UE coordination response via physical sidelink shared channel (PSSCH) and receiving the SL CSI report via a sidelink control information (SCI) stage 2 format.

Example 108 is a processor, including the subject matter of examples 105-107, including or omitting elements, wherein the operations comprise receiving the inter-UE coordination response signal via a medium access control (MAC) control element (CE).

Example 109 is a user equipment (UE) associated with a wireless communication network, the UE comprising one or more processors configured to receive a sidelink transmission signal from a select UE associated with the wireless communication network, wherein the sidelink transmission signal comprises a sidelink data transmission from the select UE, a SL channel state information (CSI) request and a transmission of a SL channel state information reference signal (CSI-RS); determine whether a current resource or a reserved resource associated with the select UE has a collision associated therewith, based on the sidelink data transmission; determine an SL CSI of the select UE, in response to the SL CSI request; and send an inter-UE coordination signal comprising a collision indicator indicative of a status of the collision and an SL CSI report derived based on the determined SL CSI to the select UE, based on the determination regarding the collision of the current resource or the reserved resource associated with the select UE.

Example 110 is a UE, including the subject matter of example 109, wherein the one or more processors are configured to send the inter-UE coordination signal to the select UE, only when the collision is determined for the current resource or the reserved resource.

Example 111 is a UE, including the subject matter of examples 109-110, including or omitting elements, wherein the one or more processors are configured to send the inter-UE coordination signal in a sequence based transmission comprising a sequence indicative of the collision Example 112 is a UE, including the subject matter of examples 109-111, including or omitting elements, wherein the sequence comprises a first sequence to provide an indication to increase the SL CSI and wherein the sequence comprises a second sequence to provide an indication to decrease the SL CSI.

Example 113 is a UE, including the subject matter of examples 109-112, including or omitting elements, wherein the one or more processors are configured to send the inter-UE coordination signal to the select UE, irrespective of whether the collision for the current resource or the reserved resource is determined or not determined.

Example 114 is a UE, including the subject matter of examples 109-113, including or omitting elements, wherein the one or more processors are configured to send the inter-UE coordination signal based on a 2-bit indication comprising 1 bit for the collision indicator and 1 bit for the SL CSI report.

Example 115 is a UE, including the subject matter of examples 109-114, including or omitting elements, wherein the inter-UE coordination signal utilizes 4 different sequences for the 2-bit indication, each sequence indicative of a value of the collision indicator and an increase or decrease of the SL CSI.

Example 116 is a processor for a user equipment (UE) associated with a wireless communication network, the processor configured to perform operations comprising receiving a sidelink transmission signal from a select UE associated with the wireless communication network, wherein the sidelink transmission signal comprises a sidelink data transmission from the select UE, a SL channel state information (CSI) request and a transmission of a SL channel state information reference signal (CSI-RS); determining whether a current resource or a reserved resource associated with the select UE has a collision associated therewith, based on the sidelink data transmission; determining an SL CSI of the select UE, in response to the SL CSI request; and sending an inter-UE coordination signal comprising a collision indicator indicative of a status of the collision and an SL CSI report derived based on the determined SL CSI to the select UE, based on the determination regarding the collision of the current resource or the reserved resource associated with the select UE.

Example 117 is a processor, including the subject matter of example 116, wherein the operations comprise sending the inter-UE coordination signal to the select UE, only when the collision is determined for the current resource or the reserved resource.

Example 118 is a processor, including the subject matter of examples 116-117, including or omitting elements, wherein the operations comprise sending the inter-UE coordination signal in a sequence based transmission comprising a sequence indicative of the collision.

Example 119 is a processor, including the subject matter of examples 116-118, including or omitting elements, wherein the sequence comprises a first sequence to provide an indication to increase the SL CSI and wherein the sequence comprises a second sequence to provide an indication to decrease the SL CSI.

Example 120 is a processor, including the subject matter of examples 116-119, including or omitting elements, wherein the operations comprise sending the inter-UE coordination signal to the select UE, irrespective of whether the collision for the current resource or the reserved resource is determined or not determined.

Example 121 is a processor, including the subject matter of examples 116-120, including or omitting elements, wherein the operations comprise sending the inter-UE coordination signal based on a 2-bit indication comprising 1 bit for the collision indicator and 1 bit for the SL CSI report.

Example 122 is a processor, including the subject matter of examples 116-121, including or omitting elements, wherein the inter-UE coordination signal utilizes 4 different sequences for the 2-bit indication, each sequence indicative of a value of the collision indicator and an increase or decrease of the SL CSI.

Example 123 is a method for a user equipment (UE) associated with a wireless communication network, the method comprising receiving a sidelink transmission signal from a select UE associated with the wireless communication network, using one or more processors, wherein the sidelink transmission signal comprises a sidelink data transmission from the select UE, a SL channel state information (CSI) request and a transmission of a SL channel state information reference signal (CSI-RS); determining whether a current resource or a reserved resource associated with the select UE has a collision associated therewith, using the one or more processors, based on the sidelink data transmission; determining an SL CSI of the select UE, using the one or more processors, in response to the SL CSI request; and sending an inter-UE coordination signal comprising a collision indicator indicative of a status of the collision and an SL CSI report derived based on the determined SL CSI to the select UE, using the one or more processors, based on the determination regarding the collision of the current resource or the reserved resource associated with the select UE.

Example 124 is a method, including the subject matter of example 123, further comprising sending the inter-UE coordination signal to the select UE, only when the collision is determined for the current resource or the reserved resource.

Example 125 is a method, including the subject matter of examples 123-124, including or omitting elements, further comprising sending the inter-UE coordination signal in a sequence based transmission comprising a sequence indicative of the collision.

Example 126 is a method, including the subject matter of examples 123-125, including or omitting elements, wherein the sequence comprises a first sequence to provide an indication to increase the SL CSI and wherein the sequence comprises a second sequence to provide an indication to decrease the SL CSI.

Example 127 is a method, including the subject matter of examples 123-126, including or omitting elements, further comprising sending the inter-UE coordination signal to the select UE, irrespective of whether the collision for the current resource or the reserved resource is determined or not determined.

Example 128 is a method, including the subject matter of examples 123-127, including or omitting elements, further comprising sending the inter-UE coordination signal based on a 2-bit indication comprising 1 bit for the collision indicator and 1 bit for the SL CSI report.

Example 129 is a method, including the subject matter of examples 123-128, including or omitting elements, wherein the inter-UE coordination signal utilizes 4 different sequences for the 2-bit indication, each sequence indicative of a value of the collision indicator and an increase or decrease of the SL CSI.

Example 130 is a user equipment (UE) associated with a wireless communication network, the UE comprising one or more processors configured to send a sidelink transmission signal to a select UE associated with the wireless communication network, wherein the sidelink transmission signal comprises a sidelink data transmission to the select UE, a SL channel state information (CSI) request and a transmission of a SL channel state information reference signal (CSI-RS); and receive an inter-UE coordination signal comprising a collision indicator indicative of a status of a collision of a current resource or a reserved resource associated with the UE and a SL CSI report, from the select UE, in response to sending the sidelink transmission signal, based on a determination, at the select UE, regarding the collision.

Example 131 is a UE, including the subject matter of example 130, wherein the one or more processors are configured to receive the inter-UE coordination signal from the select UE, only when the collision is determined for the current resource or the reserved resource at the select UE.

Example 132 is a UE, including the subject matter of examples 130-131, including or omitting elements, wherein the one or more processors are configured to receive the inter-UE coordination signal in a sequence based transmission comprising a sequence indicative of the collision.

Example 133 is a UE, including the subject matter of examples 130-132, including or omitting elements, wherein the sequence comprises a first sequence to provide an indication to increase the SL CSI and wherein the sequence comprises a second sequence to provide an indication to decrease the SL CSI.

Example 134 is a UE, including the subject matter of examples 130-133, including or omitting elements, wherein the one or more processors are configured to receive the inter-UE coordination signal from the select UE, irrespective of whether the collision for the current resource or the reserved resource is determined or not determined.

Example 135 is a UE, including the subject matter of examples 130-134, including or omitting elements, wherein the one or more processors are configured to receive the inter-UE coordination signal from the select UE based on a 2-bit indication comprising 1 bit for the collision indicator and 1 bit for the SL CSI report.

Example 136 is a processor for a user equipment (UE) associated with a wireless communication network, the processor configured to perform operations comprising sending a sidelink transmission signal to a select UE associated with the wireless communication network, wherein the sidelink transmission signal comprises a sidelink data transmission to the select UE, a SL channel state information (CSI) request and a transmission of a SL channel state information reference signal (CSI-RS); and receiving an inter-UE coordination signal comprising a collision indicator indicative of a status of a collision of a current resource or a reserved resource associated with the UE and a SL CSI report, from the select UE, in response to sending the sidelink transmission signal, based on a determination, at the select UE, regarding the collision.

Example 137 is a processor, including the subject matter of example 136, wherein the operations comprise receiving the inter-UE coordination signal from the select UE, only when the collision is determined for the current resource or the reserved resource at the select UE.

Example 138 is a processor, including the subject matter of examples 136-137, including or omitting elements, wherein the operations comprise receiving the inter-UE coordination signal in a sequence based transmission comprising a sequence indicative of the collision.

Example 139 is a processor, including the subject matter of examples 136-138, including or omitting elements, wherein the sequence comprises a first sequence to provide an indication to increase the SL CSI and wherein the sequence comprises a second sequence to provide an indication to decrease the SL CSI.

Example 140 is a processor, including the subject matter of examples 136-139, including or omitting elements, wherein the operations comprise receiving the inter-UE coordination signal from the select UE, irrespective of whether the collision for the current resource or the reserved resource is determined or not determined.

Example 141 is a processor, including the subject matter of examples 136-140, including or omitting elements, wherein the operations comprise receiving the inter-UE coordination signal from the select UE based on a 2-bit indication comprising 1 bit for the collision indicator and 1 bit for the SL CSI report.

Example 142 is a method for a user equipment (UE) associated with a wireless communication network, the method comprising sending a sidelink transmission signal to a select UE associated with the wireless communication network, using one or more processors, wherein the sidelink transmission signal comprises a sidelink data transmission to the select UE, a SL channel state information (CSI) request and a transmission of a SL channel state information reference signal (CSI-RS); and receiving an inter-UE coordination signal comprising a collision indicator indicative of a status of a collision of a current resource or a reserved resource associated with the UE and a SL CSI report, from the select UE, using the one or more processors, in response to sending the sidelink transmission signal, based on a determination, at the select UE, regarding the collision.

Example 143 is a method, including the subject matter of example 142, further comprising receiving the inter-UE coordination signal from the select UE, only when the collision is determined for the current resource or the reserved resource at the select UE.

Example 144 is a method, including the subject matter of examples 142-143, including or omitting elements, further comprising receiving the inter-UE coordination signal in a sequence based transmission comprising a sequence indicative of the collision.

Example 145 is a method, including the subject matter of examples 142-144, including or omitting elements, wherein the sequence comprises a first sequence to provide an indication to increase the SL CSI and wherein the sequence comprises a second sequence to provide an indication to decrease the SL CSI.

Example 146 is a method, including the subject matter of examples 142-145, including or omitting elements, further comprising receiving the inter-UE coordination signal from the select UE, irrespective of whether the collision for the current resource or the reserved resource is determined or not determined.

Example 147 is a method, including the subject matter of examples 142-146, including or omitting elements, further comprising receiving the inter-UE coordination signal from the select UE based on a 2-bit indication comprising 1 bit for the collision indicator and 1 bit for the SL CSI report.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The above description of illustrated aspects of the subject disclosure, including what is described in the Abstract, is not intended to be exhaustive or to limit the disclosed aspects to the precise forms disclosed. While specific aspects and examples are described herein for illustrative purposes, various modifications are possible that are considered within the scope of such aspects and examples, as those skilled in the relevant art can recognize.

What is claimed is:

1. A user equipment (UE) associated with a wireless communication network, the UE comprising:
one or more processors configured to:
form a sidelink group with one or more other UEs associated with the wireless communication network;
receive a sidelink (SL) groupcast message from a select UE of the one or more other UEs of the sidelink group, the SL groupcast message comprising a SL channel state information (CSI) request and a transmission of a SL channel state information reference signal (CSI-RS);
in response to receiving the SL groupcast message:
determine a designated transmit (Tx) UE of the one or more other UEs based on the designated Tx UE being a furthest distance from the UE relative to other UEs of the one or more other UEs; and
provide an SL CSI report, derived based on a measurement of the SL CSI-RS, to the designated transmit (Tx) UE.

2. The UE of claim 1,
wherein the one or more processors are further configured to determine a SL CSI reporting association,
wherein the SL CSI reporting association comprises:
a designated receive (Rx) UE that is configured to provide the SL CSI report, wherein the UE is the designated Rx UE; and
the designated transmit Tx UE that is configured to receive the SL CSI report, wherein the designated Tx UE is the select UE, or the designated Tx UE is another UE the one or more other UEs.

3. The UE of claim 2,
wherein the select UE is the designated Tx UE, and the one or more processors are configured to:
provide the SL CSI report to the select UE.

4. The UE of claim 3,
wherein the another UE is the designated Tx UE, and the one or more processors are configured to;
provide the SL CSI report to the another UE.

5. The UE of claim 1,
wherein the SL CSI request is included in the SL groupcast message by setting a CSI request field of a sidelink control information (SCI) stage 2 associated with the select UE,
wherein the SCI stage 2 comprises
an SCI format 2-A,
an SCI format 2-B or
an SCI format 2-C.

6. The UE of claim 1,
wherein the one or more processors are further configured to provide the SL CSI report when the measured SL CSI-RS satisfies a CSI threshold.

7. The UE of claim 1, wherein the one or more processors are further configured to
provide the SL CSI report when
the measured SL CSI-RS indicates that a distance between the UE and
the designated Tx UE is greater than a distance threshold.

8. A baseband processor of a user equipment (UE) comprising:
one or more processors configured to:
form a sidelink group with one or more other UEs;
receive a sidelink (SL) groupcast message from a select UE of the one or more other UEs of the sidelink group,
the SL groupcast message comprising
a SL channel state information (CSI) request and
a transmission of a SL channel state information reference signal (CSI-RS);
in response to receiving the SL groupcast message:
determine the select UE of the one or more other UEs based on the select UE being a furthest distance from the UE relative the one or more other UEs of the sidelink group; and
provide, to the select UE, an SL CSI report derived based on a measurement of the SL CSI-RS.

9. The baseband processor of claim 8, wherein the one or more processors is configured to
provide the SL CSI report to the select UE,
when the measured SL CSI is lesser than a CSI threshold or
when a distance between the UE and the select UE is greater than a distance threshold, or both.

10. The baseband processor of claim 9, wherein the one or more processors is configured
not to provide the SL CSI report to the select UE,
when the SL CSI is greater than the CSI threshold or
when the distance between the UE and the select UE is lesser than the distance threshold, or both.

11. The baseband processor of claim 9, wherein the one or more processors is configured to
determine the distance between the UE and
the select UE, based on a Zone ID of the select UE.

12. The baseband processor of claim 11, wherein the one or more processors is configured to
receive the Zone ID of the select UE in a sidelink control information (SCI) received from the select UE.

13. The baseband processor of claim 12,
wherein the Zone ID is indicated as part of
SCI format 2-A,
SCI format 2-B or
SCI format 2-C.

14. The baseband processor of claim 8,
wherein the SL CSI report comprises a 1-bit indication of
a first value to indicate to the select UE to increase a modulation and coding scheme (MCS) or
the SL CSI report comprises a half-bit indication of a second value to indicate to the select UE to increase the MCS.

15. The baseband processor of claim 8,
wherein the SL CSI report comprises
a half-bit indication with a first value to indicate to the select UE to decrease a modulation and coding scheme (MCS), or
the half-bit indication provides no value to indicate to the select UE to increase the MCS.

16. A method for a user equipment (UE), the method comprising:
receiving a sidelink (SL) groupcast message from a select UE of a sidelink group,
the SL groupcast message comprising
a SL channel state information (CSI) request and
a transmission of a SL channel state information reference signal (CSI-RS);
determining, in response to receiving the SL groupcast message, a distance between the UE and the select UE based on a Zone ID of the select UE, wherein the select UE is determined to be a furthest distance from the UE relative to the other UEs within the sidelink group; and
providing a SL CSI report, based on a measurement of the SL CSI-RS and the determined distance, to the select UE, in response to receiving the SL groupcast message.

17. The method of claim 16, further comprising
providing the SL CSI report to the select UE,
when the measured SL CSI-RS is lesser than a CSI threshold or
when the distance is greater than a distance threshold, or both.

18. The method of claim 16, further comprising
not providing the SL CSI report to the select UE,
when the measured SL CSI-RS is greater than a CSI threshold and
when the distance is lesser than a distance threshold.

19. The method of claim 16, further comprising
receiving the Zone ID of the select UE in a sidelink control information (SCI) message received from the select UE.

20. The method of claim 16,
wherein the SL CSI report comprises
a half-bit indication with a first value to indicate to the select UE to decrease a modulation and coding scheme (MCS), or
the half-bit indication provides no value to indicate to the select UE to increase the MCS.

* * * * *